United States Patent
Agiwal et al.

(10) Patent No.: US 12,457,646 B2
(45) Date of Patent: Oct. 28, 2025

(54) SYSTEM AND METHOD OF IDENTIFYING RANDOM ACCESS RESPONSE

(71) Applicant: Samsung Electronics Co., Ltd., Suwon-si (KR)

(72) Inventors: Anil Agiwal, Suwon-si (KR); Mangesh Abhimanyu Ingale, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 567 days.

(21) Appl. No.: 17/896,426

(22) Filed: Aug. 26, 2022

(65) Prior Publication Data
US 2022/0418006 A1 Dec. 29, 2022

Related U.S. Application Data

(63) Continuation of application No. 17/122,220, filed on Dec. 15, 2020, now Pat. No. 11,432,340, which is a
(Continued)

(30) Foreign Application Priority Data

| Jun. 7, 2017 | (IN) | ............................. 201711020022 |
| Jul. 19, 2017 | (IN) | ............................. 201711025575 |
| Nov. 9, 2017 | (IN) | ............................. 201711039948 |

(51) Int. Cl.
*H04L 5/00* (2006.01)
*H04W 48/14* (2009.01)
(Continued)

(52) U.S. Cl.
CPC ....... *H04W 74/0833* (2013.01); *H04L 5/0007* (2013.01); *H04L 5/001* (2013.01);
(Continued)

(58) Field of Classification Search
CPC ......... H04W 74/0833; H04W 72/0446; H04W 72/23; H04W 88/06; H04W 74/002;
(Continued)

(56) References Cited

U.S. PATENT DOCUMENTS

| 2009/0186613 A1 | 7/2009 | Ahn et al. |
| 2009/0201798 A1* | 8/2009 | Lee ..................... H04W 74/002 370/216 |

(Continued)

FOREIGN PATENT DOCUMENTS

| CN | 101911543 A | 12/2010 |
| CN | 101999219 A | 3/2011 |

(Continued)

OTHER PUBLICATIONS

European Office Action dated Jul. 24, 2023, issued in European Patent Application No. 21192742.1.
(Continued)

*Primary Examiner* — Jenee Holland
(74) *Attorney, Agent, or Firm* — Jefferson IP Law, LLP

(57) ABSTRACT

A communication method and system for converging a 5th-Generation (5G) communication system for supporting higher data rates beyond a 4th-Generation (4G) system with a technology for Internet of Things (IoT) is provided. The communication method and system include intelligent services based on the 5G communication technology and the IoT-related technology, such as smart home, smart building, smart city, smart car, connected car, health care, digital education, smart retail, security and safety services. A method includes transmitting a random access preamble on a physical random access channel (PRACH) transmission occasion from a base station, identifying a random access radio network temporary identifier (RA-RNTI) for receiving random access response (RAR) information based on a time
(Continued)

related parameter, a frequency related parameter and an uplink carrier related parameter, and receiving scheduling assignment information scheduling a physical downlink shared channel (PDSCH) on a physical downlink control channel (PDCCH) based on the identified RA-RNTI from the base station.

14 Claims, 36 Drawing Sheets

Related U.S. Application Data continuation of application No. 16/000,339, filed on Jun. 5, 2018, now Pat. No. 10,904,921.

(51) Int. Cl.
| | |
|---|---|
| *H04W 72/0446* | (2023.01) |
| *H04W 72/23* | (2023.01) |
| *H04W 74/00* | (2009.01) |
| *H04W 74/0833* | (2024.01) |
| *H04W 74/0838* | (2024.01) |
| *H04W 88/06* | (2009.01) |

(52) U.S. Cl.
CPC .......... *H04L 5/0044* (2013.01); *H04L 5/0053* (2013.01); *H04W 72/0446* (2013.01); *H04W 72/23* (2023.01); *H04W 74/0838* (2024.01); *H04W 88/06* (2013.01)

(58) Field of Classification Search
CPC ........... H04W 74/006; H04W 74/0838; H04W 48/14; H04L 5/0007; H04L 5/001; H04L 5/0044; H04L 5/0053; H04L 5/009
See application file for complete search history.

(56) References Cited

U.S. PATENT DOCUMENTS

| | | | |
|---|---|---|---|
| 2009/0259910 A1 | 10/2009 | Lee et al. | |
| 2010/0232363 A1* | 9/2010 | Hsu | H04L 1/0079 370/328 |
| 2010/0232364 A1* | 9/2010 | Hsu | H04W 74/085 370/328 |
| 2010/0296467 A1 | 11/2010 | Pelletier et al. | |
| 2012/0300714 A1 | 11/2012 | Ng et al. | |
| 2013/0029657 A1* | 1/2013 | Gao | H04W 74/0833 455/422.1 |
| 2013/0083739 A1 | 4/2013 | Yamada | |
| 2013/0195030 A1 | 8/2013 | Wittberg et al. | |
| 2013/0250888 A1 | 9/2013 | Lu | |
| 2014/0293915 A1 | 10/2014 | Pelletier et al. | |
| 2015/0215076 A1* | 7/2015 | Lee | H04L 47/34 370/329 |
| 2015/0271854 A1 | 9/2015 | Pelletier et al. | |
| 2015/0296542 A1 | 10/2015 | Heo et al. | |
| 2016/0057800 A1* | 2/2016 | Ingale | H04L 41/0686 370/216 |
| 2017/0019930 A1 | 1/2017 | Lee et al. | |
| 2017/0094688 A1 | 3/2017 | Lee et al. | |
| 2017/0150440 A1 | 5/2017 | Cave et al. | |
| 2017/0150523 A1 | 5/2017 | Patel et al. | |
| 2017/0202053 A1 | 7/2017 | Rune | |
| 2018/0220450 A1 | 8/2018 | Aiba et al. | |
| 2018/0242367 A1 | 8/2018 | Kim et al. | |
| 2020/0037297 A1 | 1/2020 | Pan et al. | |
| 2020/0045748 A1 | 2/2020 | Yan et al. | |
| 2022/0150955 A1* | 5/2022 | Kim | H04W 74/0833 |

FOREIGN PATENT DOCUMENTS

| | | |
|---|---|---|
| CN | 102440057 A | 5/2012 |
| CN | 102932950 A | 2/2013 |
| CN | 103597765 A | 2/2014 |
| CN | 106105366 A | 11/2016 |
| CN | 106559905 A | 4/2017 |
| EP | 2 271 139 A1 | 1/2011 |
| EP | 2 950 605 A1 | 12/2015 |
| EP | 3 089 542 A1 | 11/2016 |
| WO | 2013/112009 A1 | 8/2013 |
| WO | 2015/127424 A1 | 8/2015 |
| WO | 2015/137632 A1 | 9/2015 |
| WO | 2016-004994 A1 | 1/2016 |
| WO | 2017/030412 A1 | 2/2017 |
| WO | 2017/052319 A1 | 3/2017 |

OTHER PUBLICATIONS

Chinese Notice of Allowance dated Aug. 1, 2023, issued in Chinese Patent Application No. 201880037770.X.
Intel Corporation, 'NR random access procedure', R1-1706172, 3GPP TSG RAN WG1 #88bis, Spokane, USA Apr. 3, 2017.
Massimo Condoluci et al., 'Enhanced Radio Access and Data Transmission Procedures Facilitating Industry-Compliant Machine-Type Communications over LTE-Based 5G Networks', IEEE, pp. 56-63, Feb. 2016.
International Search Report dated Sep. 7, 2018, issued in International Application No. PCT/KR2018/006430.
Extended European Search Report dated Feb. 18, 2020, issued in a counterpart European Application No. 18814014.9-1215/3596993.
Extended European Search Report dated Oct. 15, 2021, issued in a counterpart European Application No. 21192742.1-1215.
Samsung: "On Demand SI: Further Details of MSG1 Approach", 3GPP Draft; R2-1704049_ON Demand SI_MSG1 Approach Details, 3rd Generation Partnership Project (3GPP), Mobile Competence Centre ; 650, Route Des Lucioles ; F-06921 Sophia-Antipolis Cedex ; France D2 vol. RAN WG2, No. XP051274662; May 14, 2017, Hangzhou, China.
Korean Office Action dated Jul. 5, 2022, issued in Korean Patent Application No. 10-2018-0065121.
Korean Notice of Allowance dated Jan. 13, 2023, issued in Korean Patent Application No. 10-2018-0065121.
Chinese Office Action dated Feb. 25, 2023, issued in Chinese Patent Application No. 201880037770.X.
European Office Action dated Jan. 18, 2023, issued in European Patent Application No. 21192742.1.

\* cited by examiner

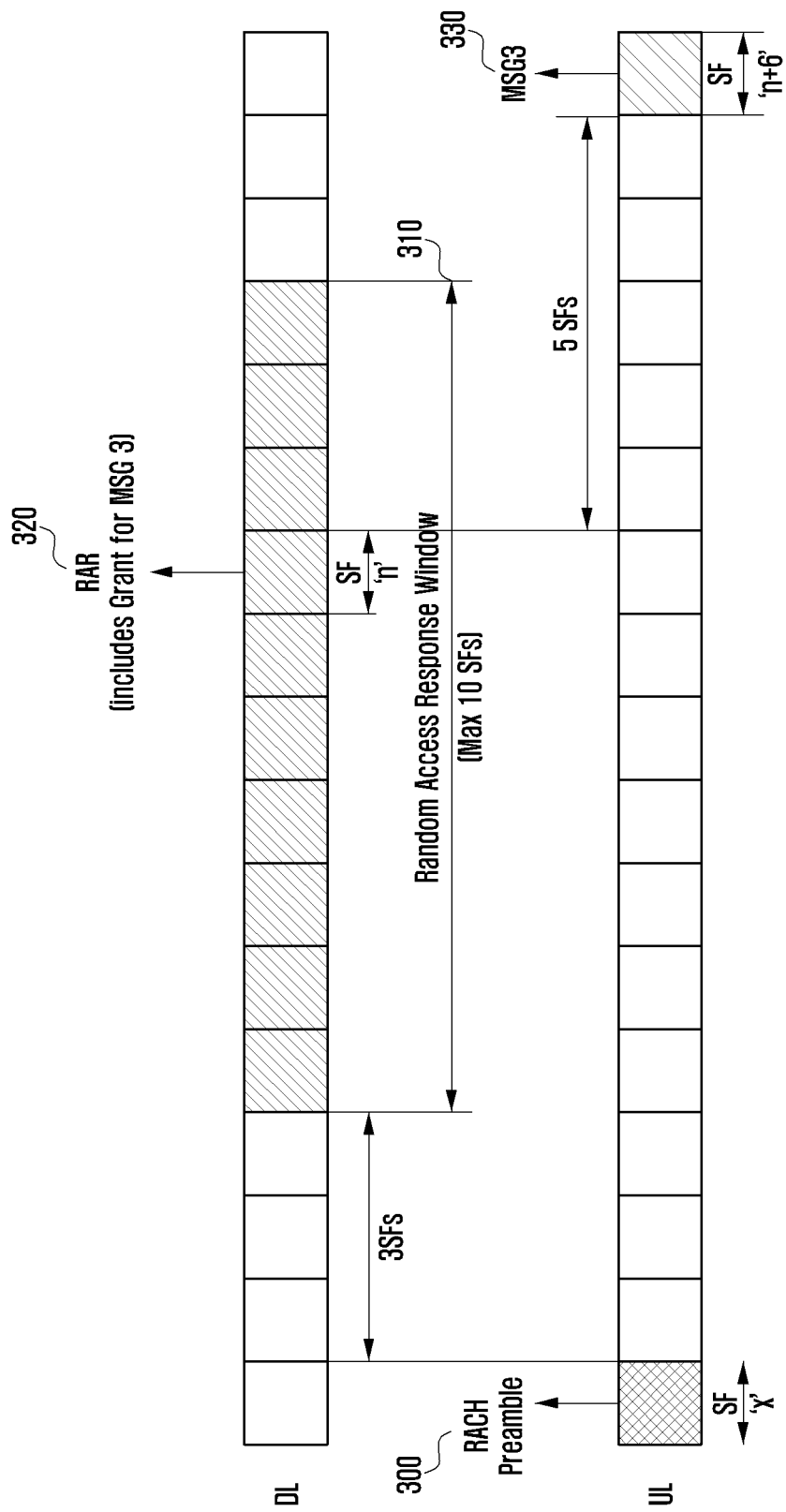

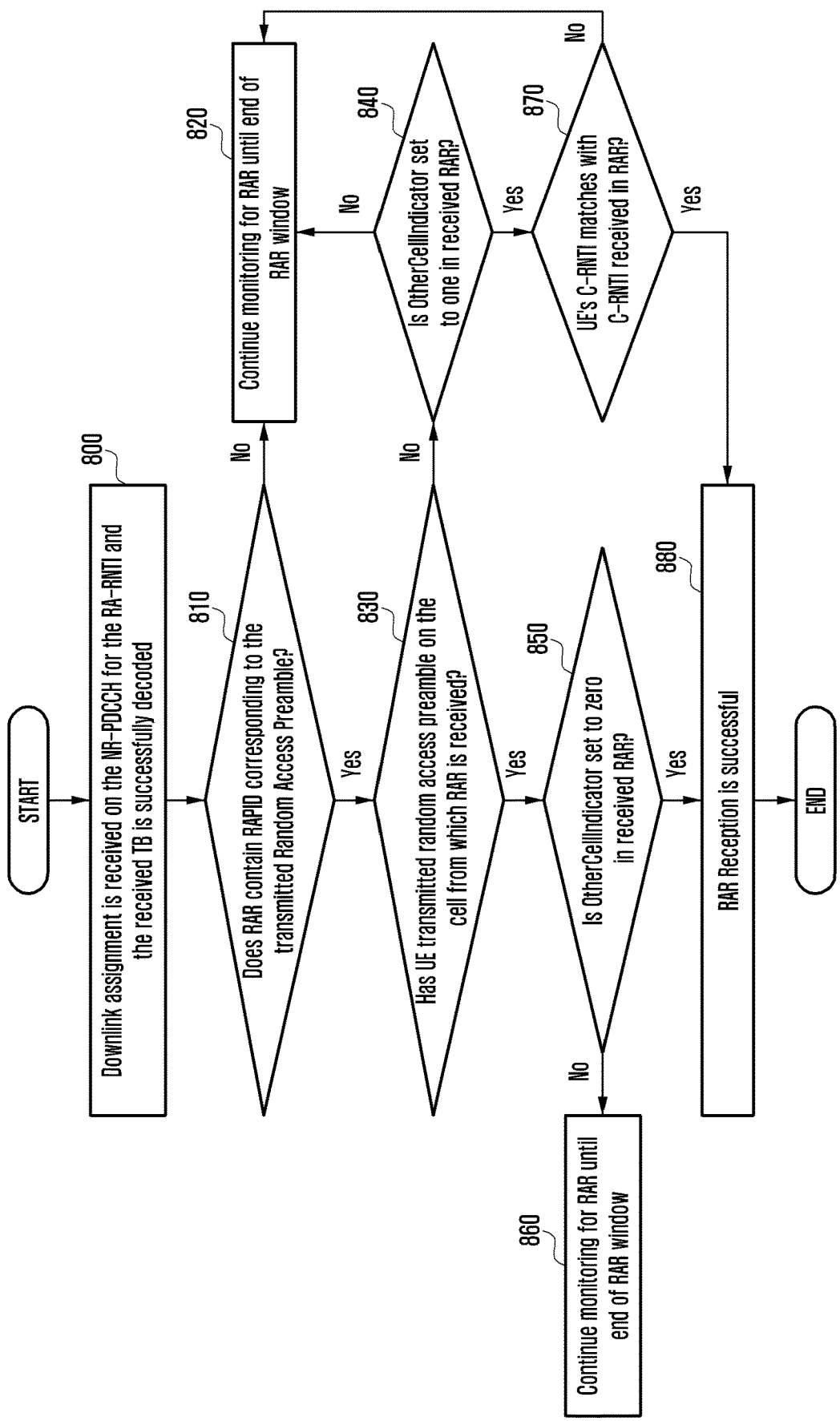

SYSTEM AND METHOD OF IDENTIFYING RANDOM ACCESS RESPONSE

CROSS-REFERENCE TO RELATED APPLICATION(S)

This application is a continuation application of prior application Ser. No. 17/122,220, filed on Dec. 15, 2020, which will be issued as U.S. Pat. No. 11,432,340 on Aug. 30, 2022; which is a continuation application of prior application Ser. No. 16/000,339, filed on Jun. 5, 2018, which has issued as U.S. Pat. No. 10,904,921 on Jan. 26, 2021; which is based on and claimed priority under 35 U.S.C. § 119(a) of an Indian Provisional patent application number 201711020022, filed on Jun. 7, 2017, in the Indian Patent Office, and of an Indian Provisional patent application number 201711025575, filed on Jul. 19, 2017, in the Indian Patent Office, and of an Indian Provisional patent application number 201711039948, filed on Nov. 9, 2017, in the Indian Patent Office, the disclosure of each of which is incorporated by reference herein in its entirety.

BACKGROUND

1. Field

The disclosure relates to a wireless communication system. More particularly, the disclosure relates to a method and apparatus for performing random access procedure.

2. Description of the Related Art

To meet the demand for wireless data traffic having increased since deployment of a fourth generation (4G) communication systems, efforts have been made to develop an improved fifth generation (5G) or pre-5G communication system. Therefore, the 5G or pre-5G communication system is also called a 'Beyond 4G Network' or a 'Post long-term evolution (LTE) System.' The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of everything (IoE), which is a combination of the IoT technology and the Big Data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described Big Data processing technology may also be considered to be as an example of convergence between the 5G technology and the IoT technology.

In the existing wireless communication system i.e. in LTE, random access (RA) procedure is used to achieve uplink time synchronization. RA procedure is used in LTE during initial access, handover, radio resource connection (RRC) connection re-establishment procedure, positioning purpose, scheduling request transmission, a secondary cell group (SCG) addition/modification and data or control information transmission in uplink by non-synchronized user equipment (UE) in RRC CONNECTED state. Recently a third generation partnership project (3GPP) standard group has initiated to develop new wireless communication system i.e. new radio (NR). In NR, a need exists for providing enhanced RA procedure in consideration of characteristics of NR.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above mentioned problems and/or disadvantages and to provide at least the advantages described below. Accordingly, an aspect of the disclosure is to provide an apparatus and method for performing random access procedure.

Additional aspects will be set forth in part in the description which follows and, in part, will be apparent from the description, or may be learned by practice of the presented embodiments.

In accordance with an aspect of the disclosure, a method in a wireless communication system is provided. The method includes transmitting a random access preamble on a physical random access channel (PRACH) transmission occasion from a base station, identifying a random access radio network temporary identifier (RA-RNTI) for receiving random access response (RAR) information based on an orthogonal frequency division multiplexing (OFDM) symbol related parameter, slot related parameter, a frequency related parameter, and an uplink carrier related parameter, and receiving scheduling assignment information scheduling a physical downlink shared channel (PDSCH) on a physical downlink control channel (PDCCH) based on the identified RA-RNTI from the base station.

In accordance with another aspect of the disclosure, a method in a wireless communication system is provided. The method includes receiving a random access preamble on a PRACH transmission occasion from a terminal, identifying a RA-RNTI for transmitting RAR information based on a OFDM symbol related parameter, slot related parameter, a frequency related parameter and an uplink carrier related parameter, generating scheduling assignment information scheduling a PDSCH and transmitting the scheduling assignment information on a PDCCH based on the identified RA-RNTI to the terminal.

In accordance with another aspect of the disclosure, a terminal in a wireless communication system is provided. The UE includes a transceiver, and a controller coupled with the transceiver and configured to control to, transmit a random access preamble on a PRACH transmission occasion from a base station, identify a RA-RNTI for receiving RAR information based on a OFDM symbol related parameter, a slot related parameter, a frequency related parameter and an uplink carrier related parameter, and receive scheduling assignment information scheduling a PDSCH on a PDCCH based on the identified RA-RNTI from the base station.

In accordance with another aspect of the disclosure, a base station in a wireless communication system is provided. The base station includes a transceiver, and a controller coupled with the transceiver and configured to control to, receive a random access preamble on a PRACH transmission occasion from a terminal, identify a RA-RNTI for transmitting RAR information based on a OFDM symbol related parameter, a slot related parameter, a frequency related parameter and an uplink carrier related parameter, generate scheduling assignment information scheduling a PDSCH, and transmit the scheduling assignment information on a PDCCH based on the identified RA-RNTI to the terminal.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 illustrates a random access response (RAR) window for receiving RARs in a random access (RA) procedure according to an embodiment of the disclosure;

FIG. 8 illustrates the UE operation in an embodiment of the disclosure to determine that the UE has successfully received the RAR corresponding to physical random access channel (PRACH) preamble transmitted by the UE as follows according to an embodiment of the disclosure;

Throughout the drawings, it should be noted that like reference numbers are used to depict the same or similar elements, features, and structures.

DETAILED DESCRIPTION

Figure 1:
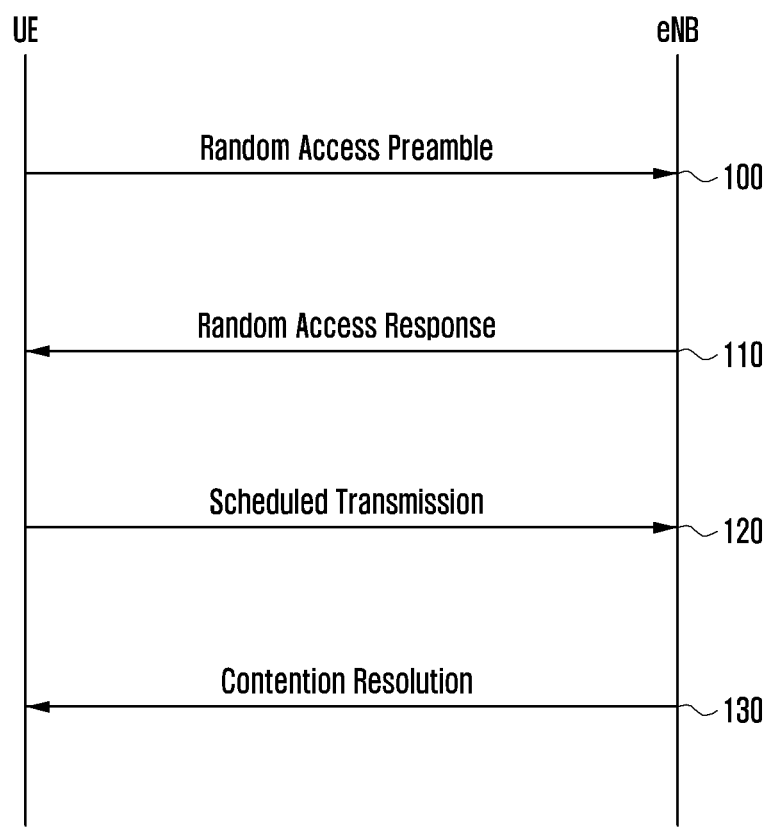
FIG. 1 illustrates a contention-based random access (CBRA) procedure according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In each drawing, the same or similar components may be denoted by the same reference numerals.

Each block of the flow charts and combinations of the flow charts may be performed by computer program instructions. Because these computer program instructions may be mounted in processors for a general computer, a special computer, or other programmable data processing apparatuses, these instructions executed by the processors for the computer or the other programmable data processing apparatuses create means performing functions described in block(s) of the flow charts. Because these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Because the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate a module, a segment, and/or a code including one or more executable instructions for executing a specific logical function(s). Further, functions mentioned in the blocks occur regardless of a sequence in some alternative embodiments. For example, two blocks that are consecutively illustrated may be simultaneously performed in fact or be performed in a reverse sequence depending on corresponding functions sometimes.

Herein, the term "unit" may include software and/or hardware components, such as a field-programmable gate array (FPGA) and/or an application-specific integrated circuit (ASIC). However, the meaning of "unit" is not limited to software and/or hardware. For example, a unit may be configured to be in a storage medium that may be addressed and may also be configured to reproduce one or more processor. Accordingly, a "unit" may include components such as software components, object oriented software components, class components, task components, processors, functions, attributes, procedures, subroutines, segments of program code, drivers, firmware, microcode, circuit, data, database, data structures, tables, arrays, and variables.

Functions provided in the components and the "units" may be combined with a smaller number of components and/or "units" or may further separated into additional components and/or "units."

In addition, components and units may also be implemented to reproduce one or more central processing units (CPUs) within a device or a security multimedia card.

The terms as used in the disclosure are provided to describe specific embodiments, and do not limit the scope of other embodiments. It is to be understood that singular forms include plural forms unless the context clearly dictates otherwise. Unless otherwise defined, the terms and words including technical or scientific terms used in the following description and claims may have the same meanings as generally understood by those skilled in the art. The terms as generally defined in dictionaries may be interpreted as having the same or similar meanings as the contextual meanings of related technology. Unless otherwise defined, the terms should not be interpreted as ideally or excessively formal meanings. When needed, even the terms as defined in the disclosure may not be interpreted as excluding embodiments of the disclosure.

Herein, a base station performs resource allocation to a terminal. Examples of the base station may include a base station, a Node B, an evolved Node B (eNB), a wireless access unit, a base station controller, a node on a network, etc. Examples of the terminal may include a user equipment (UE), a mobile station (MS), a cellular phone, a smart phone, a computer, a multimedia system performing a communication function, etc.

Herein, a downlink (DL) is a radio transmission path of a signal from a base station to a UE and an uplink (UL) is a radio transmission path of a signal from the UE to the base station.

The embodiments of the disclosure may be applied to other communication systems having similar technical backgrounds or channel forms.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system is being developed to meet the growing demand for high speed data services, support ultra-reliability and low latency applications.

The fifth generation wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive multiple-input multiple-output (MIMO), full dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced mobile broadband (eMBB), massive machine type communication (m-MTC), ultra-reliable low latency communication (URLL) etc. The eMBB requires multiple Gigabytes (Gbps) of data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the existing wireless communication system (e.g., long term evolution (LTE)), a random access (RA) procedure is used to achieve uplink time synchronization. The RA procedure is used in LTE during initial access, handover, a radio resource connection (RRC) re-establishment procedure, positioning purpose, scheduling request transmission, a secondary cell group (SCG) addition/modification and data or control information transmission in uplink by non-synchronized UE in RRC CONNECTED state. In LTE two types of RA procedure are defined: contention-based and contention-free.

FIG. 1 illustrates a contention-based random access (CBRA) procedure according to an embodiment of the disclosure.

Referring to FIG. 1, the contention-based RA procedure includes 4 operation. In operation 100 (RA Preamble Transmission), a UE selects one of the available 64-Ncf contention based RA preambles. Ncf is the number of RA preambles reserved for contention free access. The contention based RA preambles can be optionally partitioned into two groups. If two groups are configured, the UE selects the group based on size of message 3 it can transmit. The initial RA preamble transmission power is set based on open loop estimation after compensating for path loss.

In operation 110 (RA Response (RAR)), an eNB transmits the RAR on physical downlink shared channel (PDSCH) addressed to RA-radio network temporary identifier (RNTI). The RA-RNTI identifies the time-frequency slot in which RA preamble was detected by eNB. The RAR conveys a RA preamble identifier, timing alignment information, a temporary cell-RNTI (C-RNTI) and UL grant for message 3. The RAR may also include back off indicator to instruct a UE to back off for period of time before retrying RA attempt. The RAR is transmitted in RAR window.

FIG. 3 illustrates a random access response (RAR) window for receiving RARs in a RA procedure according to an embodiment of the disclosure.

Referring to FIG. 3, a RAR window 310 starts at subframe 'x+3' for RA preamble 300 transmitted in subframe 'x' to receive a RAR 320. A RAR window size is configurable.

In operation 120 (Scheduled UL Transmission on UL shared channel (SCH)), scheduled UL transmission is used to transmit message such as radio resource connection (RRC) Connection Request, RRC Connection Re-establishment request, RRC handover confirm, scheduling request message, etc. It also includes the UE identity (i.e. cell-radio network temporary identifier (C-RNTI) or SAE-temporary mobile subscriber identity (S-TMSI) or a random number). A hybrid automatic request repeat (HARQ) is used for this transmission. Referring to FIG. 3, this is commonly referred as MSG3 330.

In operation 130 (Contention Resolution Message), the contention resolution message uses HARQ and is addressed to C-RNTI (if included in message 3) or temporary C-RNTI (UE identity included in message 3 is included this case). On successful decoding of this message, HARQ feedback is only sent by UE which detects its own UE ID (or C-RNTI).

Figure 2:
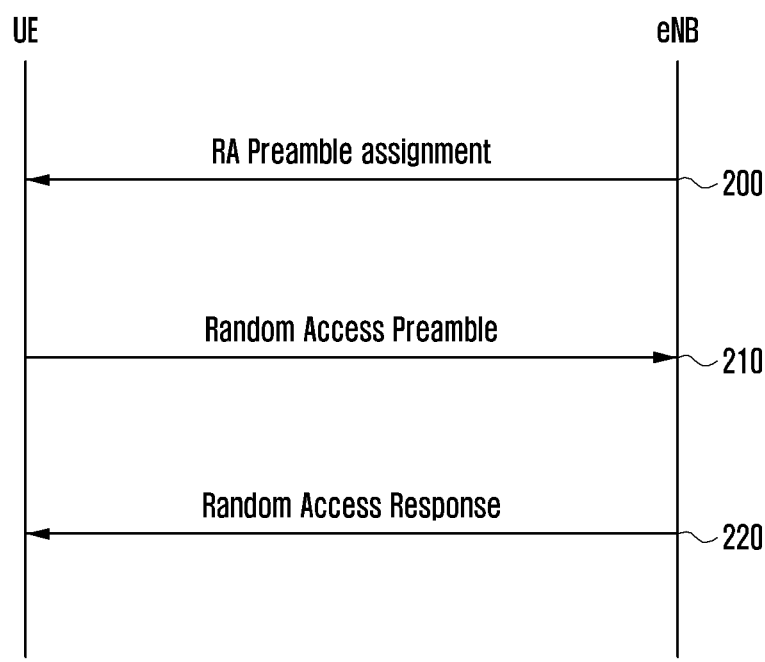
FIG. 2 illustrates a contention-free random access (CFRA) procedure according to an embodiment of the disclosure.

FIG. 2 illustrates a contention-free RA (CFRA) procedure according to an embodiment of the disclosure.

Referring to FIG. 2, a CFRA procedure is used for scenarios such as handover where low latency is required, timing advance establishment for S Cell, etc. The differences of the contention-free RA from the contention-based RA are as follows:

eNB assigns to UE non-contention RA preamble in dedicated signaling in operation 200.
 UE transmits the assigned non-contention RA preamble in operation 210.
 ENB transmits the RAR on PDSCH addressed to RA-RNTI. RAR conveys RA preamble identifier and Timing alignment information. RAR may also include UL grant. RAR is transmitted in RAR window similar to contention based RA procedure. Contention free RA procedure terminates after receiving the RAR in operation 220.

When a UE is configured with carrier aggregation, RA procedure can be performed on primary cell (PCell) as well as secondary cell (SCell). In case of SCell only CFRA procedure is used. RA procedure for SCell is only initiated by network. When performing RA procedure on the PCell, a UE transmits the random access channel (RACH) preamble on PCell and receives the corresponding RAR on PCell. When performing CFRA on the SCell, UE transmits the RACH preamble on SCell and receives the corresponding RAR on PCell. It is to be noted that RACH configuration (RACH resources and parameters) is cell specific. PCell and SCell have their own RACH configuration.

Consider two cells, Cell 1 (Frequency F1) and Cell 2 (F2). UE 1 is configured with carrier aggregation (CA) where Cell 1 is PCell and Cell 2 is SCell. UE 1 is assigned a dedicated preamble P1 for RACH transmission on SCell. UE 1 transmits RACH preamble P1 in RACH resource (e.g. time index (t_id) of RACH resource: 5, Index (f_id) of frequency resource: 0) on SCell i.e. Cell 2. RACH resource in time domain is randomly selected from RACH configuration of cell 2. UE 1 waits for RAR on cell 1 during RAR window. For receiving RAR, UE 1 monitors for physical downlink control channel (PDCCH) masked with RA-RNTI: 6 (1+t_id+10*f_id). Another UE (called UE2) transmits RACH preamble P1 in RACH resource (e.g. time index (t_id) of RACH resource: 5, Index (f_id) of frequency resource: 0) on PCell i.e. Cell 1. RACH resource is randomly selected from RACH configuration of cell 1. UE 2 waits for RAR on cell 1 during RAR window. For receiving RAR, UE 2 monitors for PDCCH masked with RA-RNTI: 6 (1+t_id+10*f_id). In this scenario, following cases can happen:

In Case 1, Preamble P1 may be received by eNB on both cell 1 and cell 2. In this case, RAR is transmitted over cell 1 by eNB. RAR is received by both UE1 and UE2. Both consider RAR reception as successful. However, TA value can be different for UE1 and UE2. So each UE should process different RAR. UE1 and UE2 cannot distinguish the RAR as random access preamble identifier (RAPID) and RA-RNTI is same for both UEs, even if two RARs are transmitted.

In Case 2, Preamble P1 may be received by eNB on cell 1 and not on cell 2. In this case, RAR is transmitted over cell 1 by eNB. RAR is received by both UE1 and UE2. Both consider RAR reception as successful. However, RAR is not meant for UE 2; still it considers RAR reception successful.

In Case 3, Preamble P1 may be received by eNB on cell 2 and not on cell 1, In this case, RAR is transmitted over cell 1 by eNB. RAR is received by both UE1 and UE2. Both considers RAR reception as successful. However, RAR is not meant for UE1; still it considers RAR reception successful.

So enhancement of RA procedure is needed to enable UEs to correctly identify the RAR.

Identification of Random Access Response

Method 1

In one method of the disclosure it is proposed to add one bit indicator (referred as 'OtherCellIndicator') in random access response (RAR). 'OtherCellIndicator' may be added in the medium access control (MAC) header (i.e. MAC subheader for RAR) or MAC payload (i.e. MAC RAR).

The 'OtherCellIndicator' is set to one in RAR, if cell is transmitting this RAR for a RACH preamble (or MSG 1) received on another cell. From UE perspective, if the 'OtherCellIndicator' is set to one in RAR received from a cell, then it means that this RAR corresponds to RACH preamble (or MSG1) transmitted on another cell. The 'OtherCellIndicator' is set to zero in RAR, if cell is transmitting this RAR for a RACH preamble received on this cell. From UE perspective, if the 'OtherCellIndicator' is set to zero in RAR received from a cell, then it means that this RAR corresponds to RACH preamble (or MSG1) transmitted on this cell. In an alternate embodiment, instead of including 'OtherCellIndicator' set to zero, 'OtherCellIndicator' field may not be included in RAR, if this RAR is for a RACH preamble received on this cell In an alternate embodiment of this method, 'Type' field in MAC subheader corresponding to RAR may indicate whether the RAR received from a cell corresponds to RACH preamble (or MSG1) transmitted on another cell or the cell from which RAR is received.

Figure 4A:
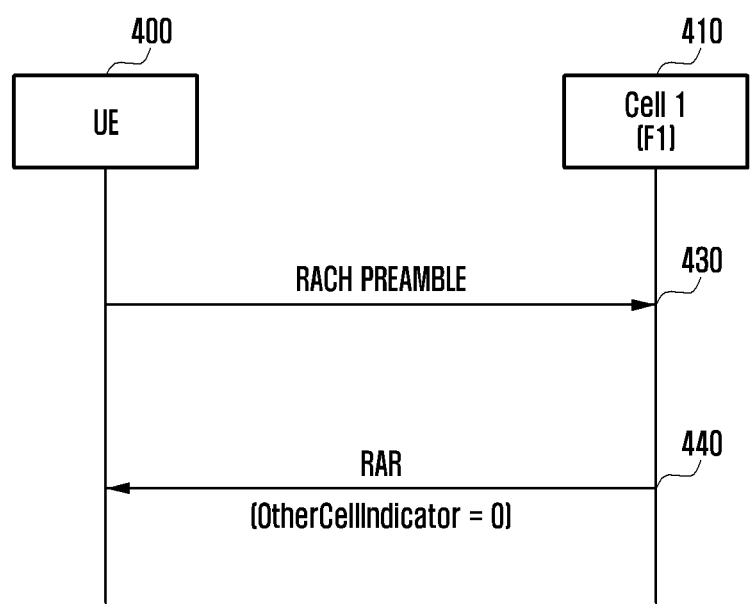
FIGS. 4A and 4B illustrate example methods of receiving RARs according to various embodiments of the disclosure.
Figure 4B:
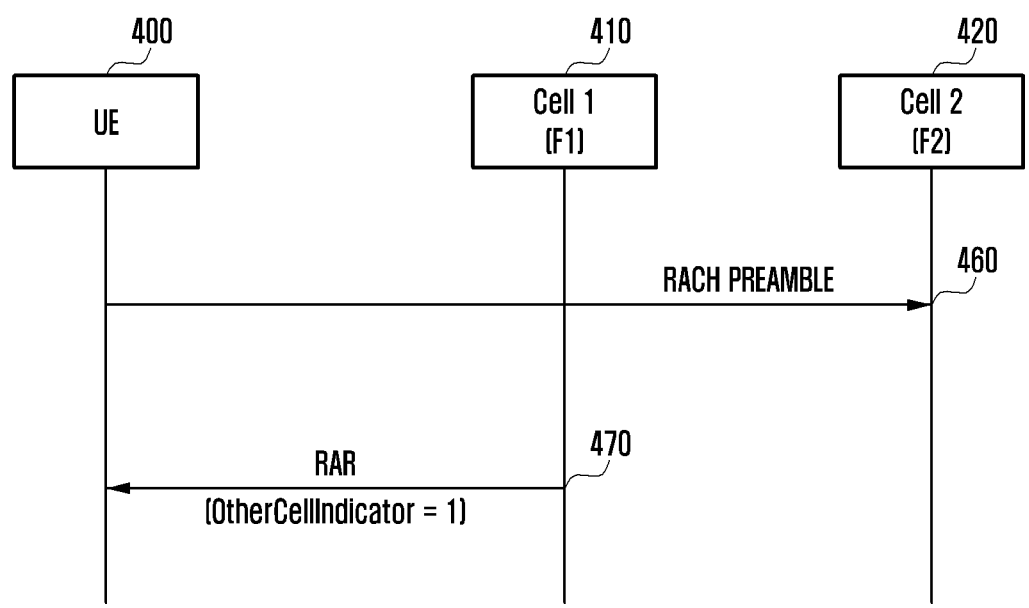

FIGS. 4A and 4B illustrate example methods of receiving RARs according to various embodiments of the disclosure.

Referring to FIG. 4A, a UE 400 transmits RACH preamble to cell 1 410 in operation 430. Cell 1 410 transmits the RAR corresponding to RACH preamble received from the UE 400 in operation 440. Since the RAR transmitted by cell 1 410 corresponds to RACH preamble received from UE (400) on same cell, cell 1 410 sets 'OtherCellIndicator' to zero. In an alternate embodiment, instead of including 'OtherCellIndicator' set to zero, cell 1 410 may not include 'OtherCellIndicator' field in RAR. In an alternate embodiment of this method, cell 1 410 may set 'Type' field in MAC subheader to a value which indicate that this RAR corresponds to RACH preamble (or MSG1) transmitted on this cell.

Referring to FIG. 4B, a UE 400 transmits RACH preamble to cell 2 420 in operation 460. Cell 1 410 transmits the RAR corresponding to RACH preamble received from the UE 400 on cell 1 410 in operation 470. One example of this scenario is the carrier aggregation, where the UE 400 is configured with Cell 2 420 as SCell and Cell 1 410 as PCell. In this case, RACH preamble is transmitted on SCell and the corresponding RAR is received by UE from PCell. Since the RAR transmitted by cell 1 410 corresponds to RACH preamble received from UE 400 on different cell, cell 1 410 sets 'OtherCellIndicator' to one. In an alternate embodiment of this method, cell 1 410 may set 'Type' field in MAC subheader to a value which indicate that this RAR corresponds to RACH preamble (or MSG1) transmitted on another cell.

Figure 5:
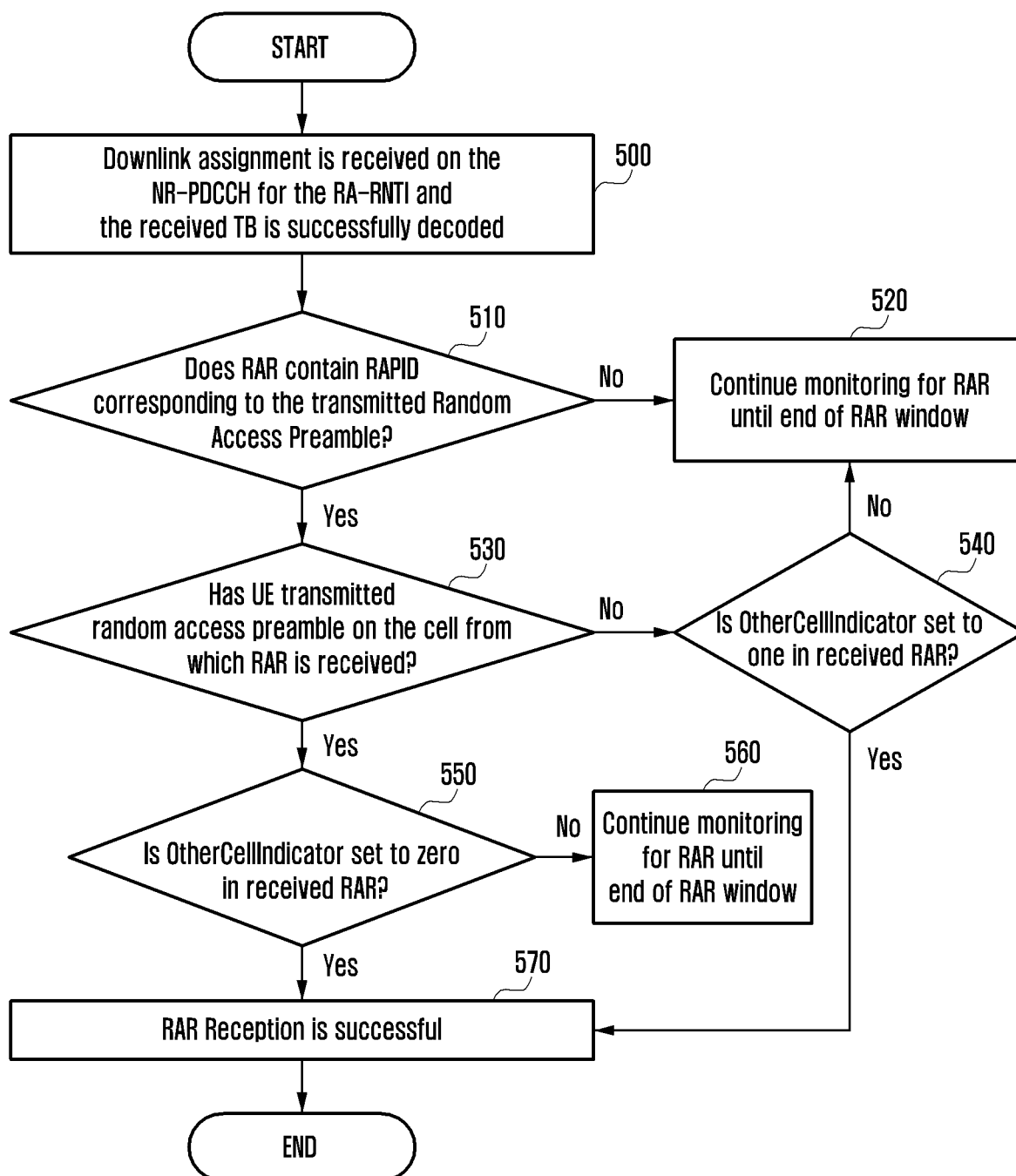
FIG. 5 illustrates a method by a user equipment (UE) to determine successfully receiving a RAR corresponding to a physical random access channel (PRACH) preamble that is transmitted by the UE according to an embodiment of the disclosure.

FIG. 5 illustrates a method by a user equipment (UE) to determine successfully receiving a RAR corresponding to a physical random access channel (PRACH) preamble that is transmitted by the UE according to an embodiment of the disclosure.

Referring to FIG. 5, when a downlink assignment has been received on the new radio-PDCCH (NR-PDCCH) for the RA-RNTI and the received transport block (TB) is successfully decoded in operation 500, the UE identifies whether the RAR contains RAPID corresponding to the transmitted random access preamble or not in operation 510. If the Random Access Response contains a Random Access Preamble identifier corresponding to the transmitted Random Access Preamble, the UE identifies whether the UE has transmitted random access preamble on the cell from which UE has received this RAR in operation 530. If the received RAR does not contain RAPID corresponding to the transmitted random access preamble, the UE shall continue monitoring for RAR until the end of RAR window in operation 520.

If the UE has transmitted random access preamble on the cell which UE has received this RAR, the UE identifies whether OtherCellIndicator is set to zero in received RAR or not in operation 550 and the UE shall consider this Random Access Response reception successful in operation 570 if the OtherCellIndicator is set to zero. If the UE identifies that it has transmitted random access preamble on other cell, the UE identifies whether the OtherCellIndicator is set to one in received RAR in operation 540. If the OtherCellIndicator is set to one, the UE shall consider this RAR reception is successful in operation 570. In the operation 540 if the UE identifies that the OtherCellIndicator is not set to one, the UE shall continue monitoring for RAR until the end of the RAR window in operation 560. In the operation 550 if the UE identifies that the OtherCellIndicator is not set to zero, the UE shall continue monitoring for RAR until the end of the RAR window in operation 560.

Figure 6:
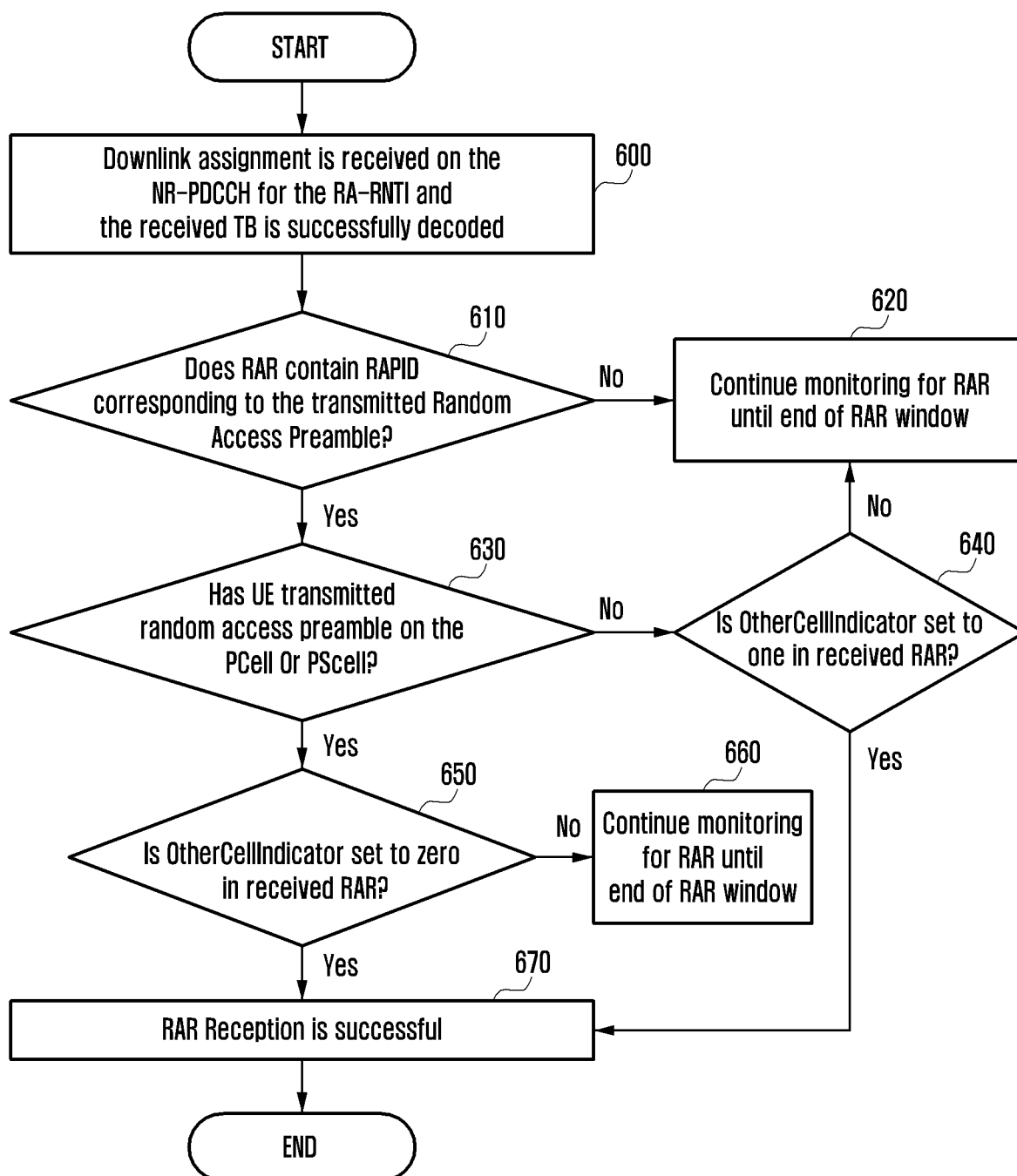
FIG. 6 illustrates a method by a UE to determine successfully receiving a RAR corresponding to a PRACH preamble that is transmitted by the UE according to an embodiment of the disclosure.

FIG. 6 illustrates a method by a UE to determine successfully receiving a RAR corresponding to a PRACH preamble that is transmitted by the UE according to an embodiment of the disclosure.

Referring to FIG. 6, when a downlink assignment has been received on the NR-PDCCH for the RA-RNTI and the received TB is successfully decoded in operation 600, the UE identifies whether the RAR contains RAPID corresponding to the transmitted random access preamble or not in operation 610. If the Random Access Response contains a Random Access Preamble identifier corresponding to the transmitted Random Access Preamble, the UE identifies whether the UE has transmitted random access preamble on PCell or PSCell in operation 630. If the received RAR does not contain RAPID corresponding to the transmitted random access preamble, the UE shall continue monitoring for RAR until the end of RAR window in operation 620.

If the UE has transmitted random access preamble on the PCell or Primary SCell (PSCell), the UE identifies whether OtherCellIndicator is set to zero in received RAR or not in operation 650 and the UE shall consider this Random Access Response reception successful in operation 670 if the OtherCellIndicator is set to zero. If the UE identifies that it has not transmitted random access preamble on PCell or primary secondary cell (PSCell), the UE identifies whether the OtherCellIndicator is set to one in received RAR in operation 640. If the OtherCellIndicator is set to one, the UE shall consider this RAR reception is successful in operation 670. In the operation 640 if the UE identifies that the OtherCellIndicator is not set to one, the UE shall continue monitoring for RAR until the end of the RAR window in operation 660. In the operation 650 if the UE identifies that the OtherCellIndicator is not set to zero, the UE shall continue monitoring for RAR until the end of the RAR window in operation 660.

In alternate embodiment of this method, OtherCellIndicator can be included in NR-PDCCH (i.e. in downlink control information (DCI)) instead of RAR. In another embodiment, cell info (e.g. frequency or carrier info) can be included in RAR when OtherCellIndicator is set to one. The UE operation in this case to determine that it has successfully received the RAR corresponding to PRACH preamble transmitted by it as follows.

When a downlink assignment has been received on the NR-PDCCH for the RA-RNTI and the received TB is successfully decoded, if the Random Access Response contains a Random Access Preamble identifier corresponding to the transmitted Random Access Preamble, and if the UE has transmitted random access preamble on PCell or PSCell and if OtherCellIndicator is set to zero in received RAR, the UE shall consider this Random Access Response reception successful.

If UE has transmitted random access preamble on SCell other than PSCell and OtherCellIndicator is set to one in received RAR and if carrier info received in RAR matches with carrier on which UE has transmitted RACH preamble, the UE shall consider this Random Access Response reception successful.

The UE operation in an embodiment of the proposed disclosure to determine that it has successfully received the RAR corresponding to PRACH preamble transmitted by it as follows.

When a downlink assignment has been received on the NR-PDCCH for the RA-RNTI and the received TB is successfully decoded, if the Random Access Response contains a Random Access Preamble identifier corresponding to the transmitted Random Access Preamble and if the UE has transmitted random access preamble on the cell from which UE has received this RAR and if OtherCellIndicator is set to zero in received RAR, the UE shall consider this Random Access Response reception successful.

If the UE has transmitted random access preamble on the cell other than the cell from which UE has received this RAR and if OtherCellIndicator is set to one in received RAR and if carrier info received in RAR matches with carrier on which UE has transmitted RACH preamble, the UE shall consider this Random Access Response reception successful.

Method 2

In another method of the disclosure it is proposed to add one bit indicator (referred as 'OtherCellIndicator') in random access response (RAR). 'OtherCellIndicator' may be added in the MAC header (i.e. MAC subheader for RAR) or MAC payload (i.e. MAC RAR).

The 'OtherCellIndicator' is set to one in RAR, if cell is transmitting this RAR for a RACH preamble (or MSG 1) received on another cell. From UE perspective, if the 'OtherCellIndicator' is set to one in RAR received from a cell, then it means that this RAR corresponds to RACH preamble (or MSG1) transmitted on another cell. The 'OtherCellIndicator' is set to zero in RAR, if cell is transmitting this RAR for a RACH preamble received on this cell. From UE perspective, if the 'OtherCellIndicator' is set to zero in RAR received from a cell, then it means that this RAR corresponds to RACH preamble (or MSG1) transmitted on this cell. In an alternate embodiment, instead of including 'OtherCellIndicator' set to zero, 'OtherCellIndicator' field may not be included in RAR, if this RAR is for a RACH preamble received on this cell In an alternate embodiment of this method, 'Type' field in MAC subheader corresponding to RAR may indicate whether the RAR received from a cell corresponds to RACH preamble (or MSG1) transmitted on another cell or the cell from which RAR is received.

In alternate embodiment of this method, OtherCellIndicator can be included in NR-PDCCH (i.e. in DCI) instead of RAR.

Additionally, it is propose that in addition to RAPID and RA-RNTI checking, UE which has transmitted RACH preamble on another cell, also checks for its C-RNTI in RAR. If cell is transmitting RAR for a RACH preamble (or MSG 1) received on another cell then it also includes UE's C-RNTI in RAR. Since the RAR for RACH preamble (or MSG 1) received on another cell is allowed only in case of contention-free RACH, network knows the C-RNTI of UE which has transmitted the RACH preamble.

Figure 7A:
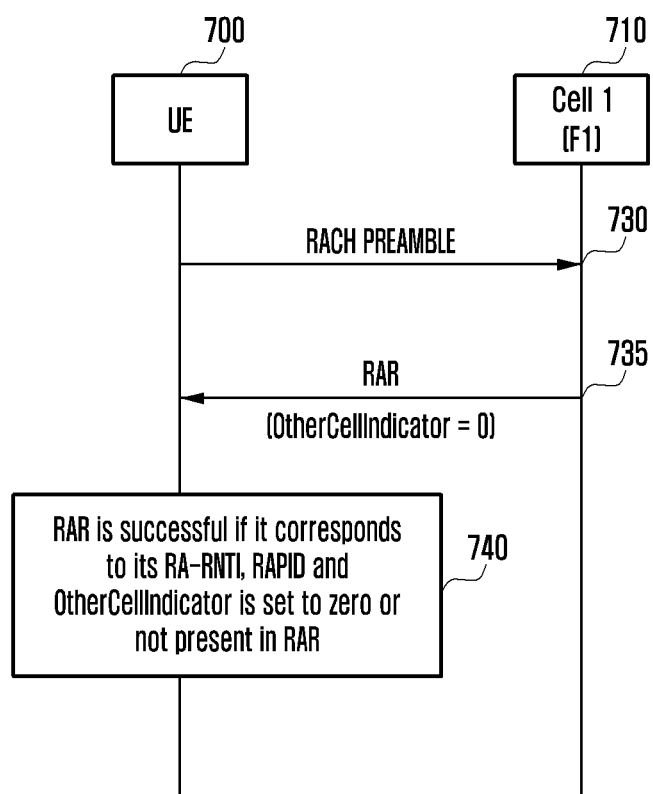
FIGS. 7A and 7B illustrate example methods of receiving RARs according to various embodiments of the disclosure.
Figure 7B:
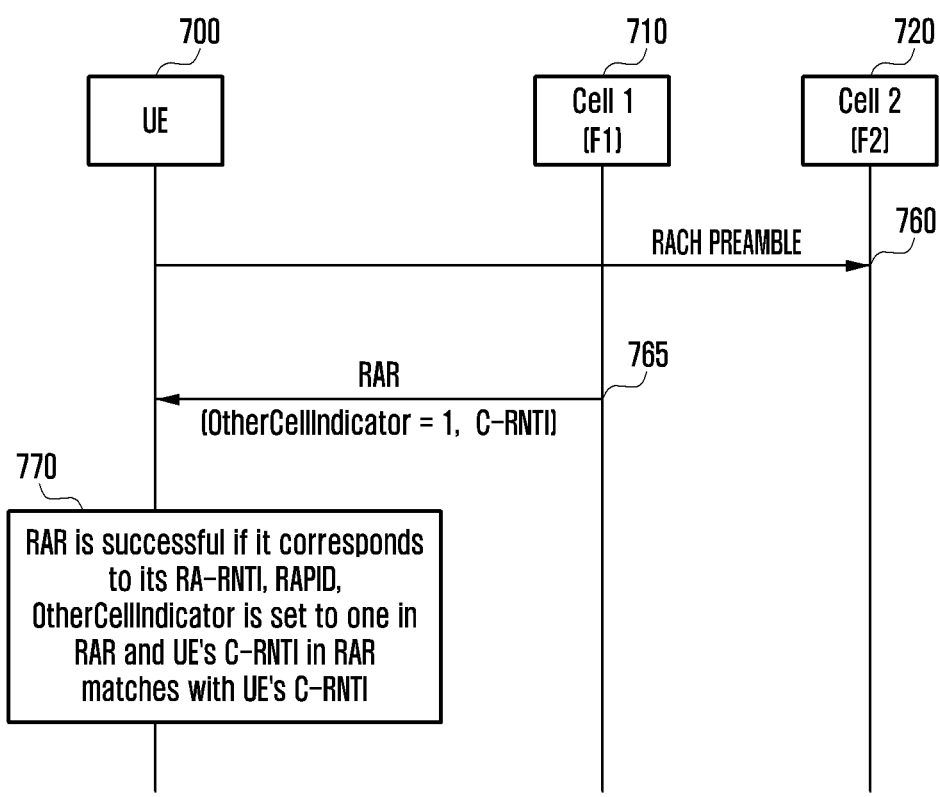

FIGS. 7A and 7B illustrate example methods of receiving RARs according to various embodiments of the disclosure.

Referring to FIG. 7A, a UE 700 transmits RACH preamble to cell 1 710 in operation 730. The Cell 1 710 transmits the RAR corresponding to RACH preamble received from UE 700 in operation 735. Since the RAR transmitted by cell 1 710 corresponds to RACH preamble received from the UE 700 on same cell, cell 1 710 sets 'OtherCellIndicator' to zero. In an alternate embodiment, instead of including 'OtherCellIndicator' set to zero, cell 1 710 may not include 'OtherCellIndicator' field in RAR. In an alternate embodiment of this method, cell 1 710 may set 'Type' field in MAC subheader to a value which indicate that this RAR corresponds to RACH preamble (or MSG1) transmitted on this cell. The UE 700 considers RAR reception successful if it corresponds to its RA-RNTI, RAPID and 'OtherCellIndicator' set to zero or not present in RAR. In case of contention based RACH temporary C-RNTI is also included in RAR in this case. In case of contention free RACH, UE's C-RNTI may not be included in this case. Therefore, the UE 700 can determine the RAR is received successfully if the RAR corresponds UE's RA-RNTI, RAPID and OtherCellIndicator set to 0 or not present in the RAR in operation 740.

Referring to FIG. 7B, a UE 700 transmits RACH preamble to cell 2 720 in operation 760. Cell 1 710 transmits the RAR corresponding to RACH preamble received from the UE 700 on cell 1 710 in operation 765. One example of this scenario is the carrier aggregation, where the UE 700 is configured with Cell 2 720 as SCell and Cell 1 710 as PCell. In this case, RACH preamble is transmitted on SCell and the corresponding RAR is received by UE from PCell. Since the RAR transmitted by cell 1 710 corresponds to RACH preamble received from the UE 700 on different cell, cell 1 710 sets 'OtherCellIndicator' to one. In an alternate embodiment of this method, cell 1 710 may set 'Type' field in MAC subheader to a value which indicate that this RAR corresponds to RACH preamble (or MSG1) transmitted on another cell. Cell 1 710 also includes UE's C-RNTI in RAR. RACH preamble and/or RACH resource on which RACH preamble is received by Cell 2 720 is assigned to the UE 700, so UE's C-RNTI is known to network (or gNB or cell 2). Therefore, the UE 700 can determine the RAR is received successfully if the RAR corresponds UE's RA-RNTI, RAPID, OtherCellIndicator set to 1 and received C-RNTI which matches with UE's C-RNTI in operation 770.

FIG. 8 illustrates the UE operation in an embodiment of the disclosure to determine that the UE has successfully received the RAR corresponding to physical random access channel (PRACH) preamble transmitted by the UE as follows according to an embodiment of the disclosure.

Referring to FIG. 8, when a downlink assignment has been received on the NR-PDCCH for the RA-RNTI and the received TB is successfully decoded in operation 800, the UE identifies whether the RAR contains RAPID corresponding to the transmitted random access preamble or not in operation 810. If the Random Access Response contains a Random Access Preamble identifier corresponding to the transmitted Random Access Preamble, the UE identifies whether the UE has transmitted random access preamble on the cell from which UE has received this RAR in operation 830. If the received RAR does not contain RAPID corresponding to the transmitted random access preamble, the UE shall continue monitoring for RAR until the end of RAR window in operation 820.

If the UE has transmitted random access preamble on the cell which UE has received this RAR, the UE identifies whether OtherCellIndicator is set to zero in received RAR or not in operation 850 and the UE shall consider this Random Access Response reception successful in operation 880 if the OtherCellIndicator is set to zero. If the UE identifies that it has transmitted random access preamble on other cell, then the UE identifies whether the OtherCellIndicator is set to one in received RAR in step 840. If the OtherCellIndicator is set to one, the UE identifies whether UE's C-RNTI matches with C-RNTI received in RAR in operation 870. If the UE's C-RNTI matches with the received C-RNTI, the UE shall consider this RAR reception is successful in operation 880. If the UE's C-RNTI does not match with the received C-RNTI, the UE shall continue monitoring for RAR until the end of RAR window in operation 820. In the operation 840 if the UE identifies that the OtherCellIndicator is not set to one, the UE continues monitoring for RAR until the end of the RAR window in operation 860. In the operation 850 if the UE identifies that the OtherCellIndicator is not set to zero, the UE continues monitoring for RAR until the end of the RAR window in operation 860.

Figure 9:
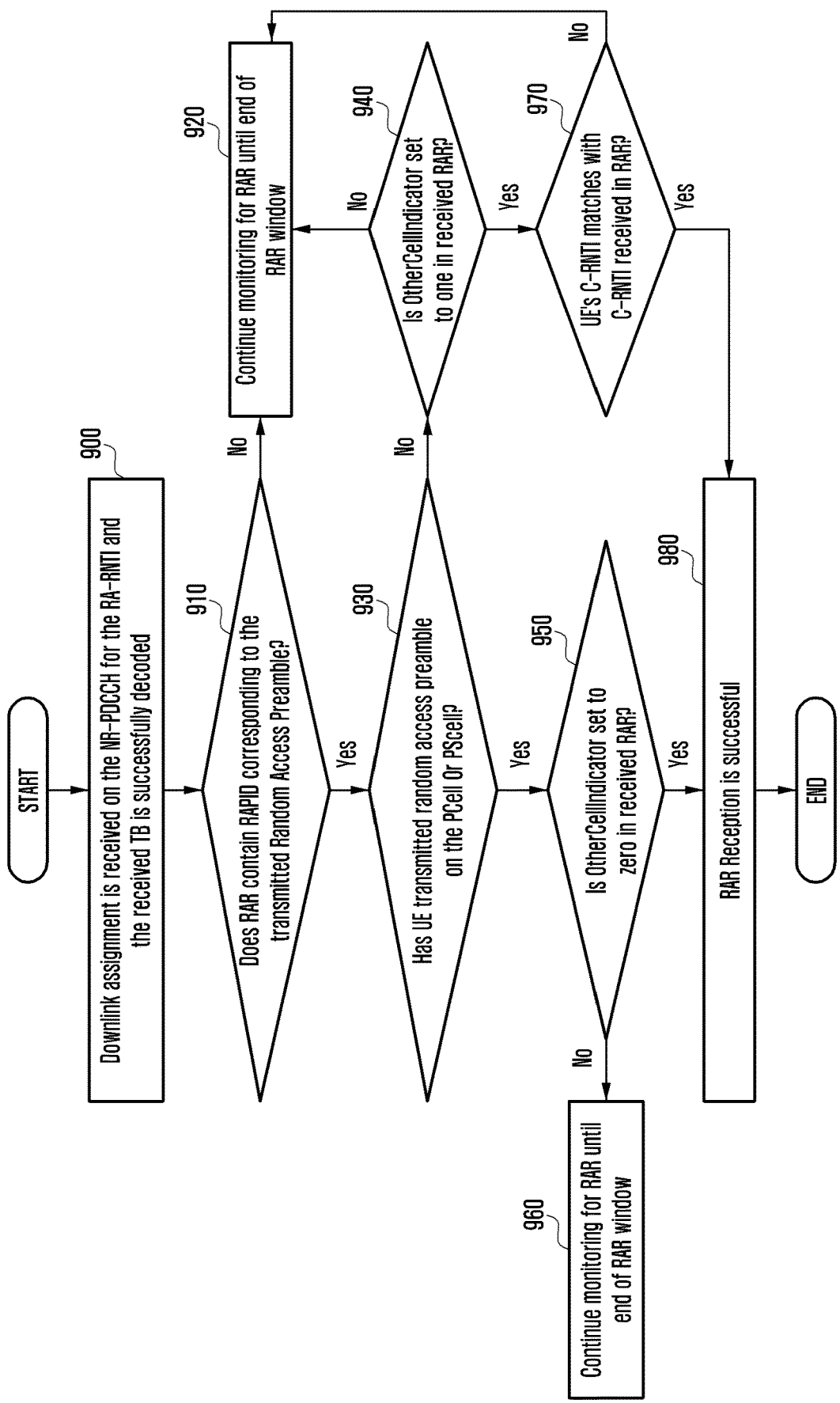
FIG. 9 illustrates a method by a UE to determine successfully receiving a RAR corresponding to a PRACH preamble that is transmitted by the UE according to an embodiment of the disclosure.

FIG. 9 illustrates a method by a UE to determine successfully receiving a RAR corresponding to a PRACH preamble that is transmitted by the UE according to an embodiment of the disclosure.

Referring to FIG. 9, when a downlink assignment has been received on the NR-PDCCH for the RA-RNTI and the received TB is successfully decoded in operation 900, the UE identifies whether the RAR contains RAPID corresponding to the transmitted random access preamble or not in operation 910. If the Random Access Response contains a Random Access Preamble identifier corresponding to the transmitted Random Access Preamble, the UE identifies whether the UE has transmitted random access preamble on PCell or PSCell in operation 930. If the received RAR does not contain RAPID corresponding to the transmitted random access preamble, the UE shall continue monitoring for RAR until the end of RAR window in operation 920.

If the UE has transmitted random access preamble on PCell or PSCell, the UE identifies whether OtherCellIndicator is set to zero in received RAR or not in operation 850 and the UE shall consider this Random Access Response reception successful in operation 970 if the OtherCellIndicator is set to zero. If the UE identifies that it has not transmitted random access preamble on PCell or PSCell, then the UE identifies whether the OtherCellIndicator is set to one in received RAR in operation 940. If the OtherCellIndicator is set to one, the UE identifies whether UE's C-RNTI matches with C-RNTI received in RAR in operation 970. If the UE's C-RNTI matches with the received C-RNTI, the UE shall consider this RAR reception is successful in operation 980. If the UE's C-RNTI does not match with the received C-RNTI, the UE shall continue monitoring for RAR until the end of RAR window in operation 920. In the operation 940 if the UE identifies that the OtherCellIndicator is not set to one, the UE continues monitoring for RAR until the end of the RAR window in operation 960. In the operation 950 if the UE identifies that the OtherCellIndicator is not set to zero, the UE continues monitoring for RAR until the end of the RAR window in operation 960.

Method 3

In this method, it is proposed that in addition to RAPID and RA-RNTI checking, UE which has transmitted RACH preamble on another cell, also checks for its C-RNTI in RAR. If cell is transmitting RAR for a RACH preamble (or MSG 1) received on another cell then it also includes UE's C-RNTI in RAR. Since the RAR for RACH preamble (or MSG 1) received on another cell is allowed only in case of contention free RACH, network knows the C-RNTI of UE which has transmitted the RACH preamble.

Figure 10A:
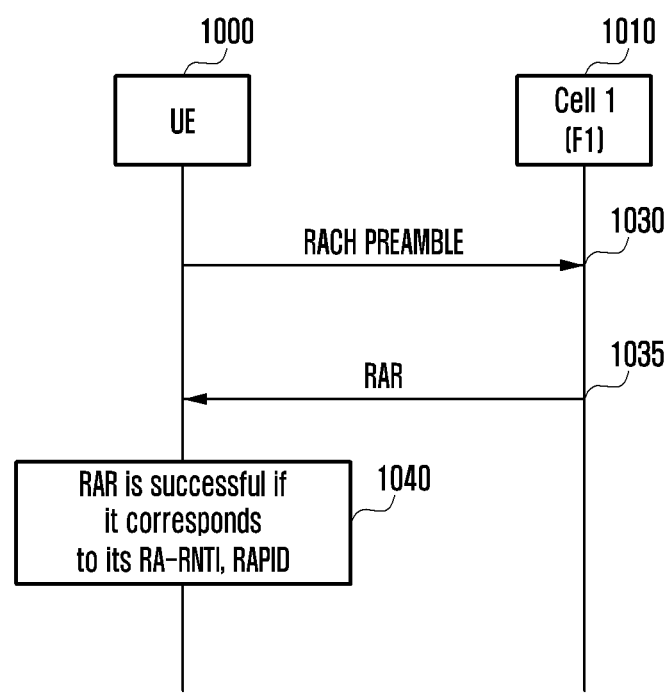
FIGS. 10A and 10B illustrate example methods of receiving RARs according to various embodiments of the disclosure.
Figure 10B:
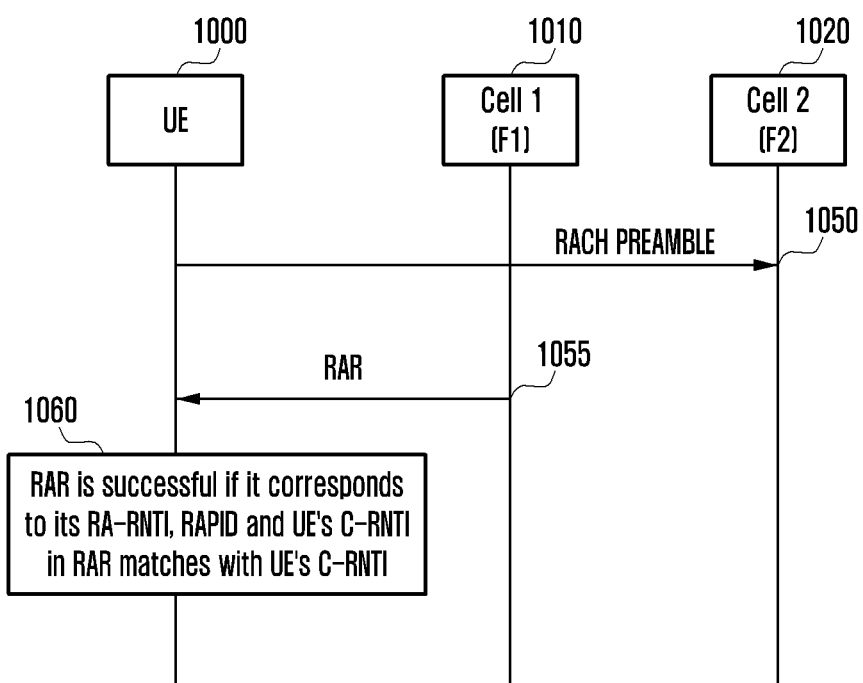

FIGS. 10A and 10B illustrate example methods of receiving RARs according to various embodiments of the disclosure.

Referring to FIG. 10A, a UE 1000 transmits RACH preamble to cell 1 1010 in operation 1030. Cell 1 1010 transmits the RAR corresponding to RACH preamble received from the UE 1000 in operation 1035. In case of contention based RACH temporary C-RNTI is included in RAR. In case of contention free RACH, UE's C-RNTI may not be included in this case. Therefore, in operation 1040, the UE 1000 can determine the RAR is received successfully if the RAR corresponds UE's RA-RNTI, RAPID.

Referring to FIG. 10B, a UE 1000 transmits RACH preamble to cell 2 1020 in operation 1050. Cell 1 1055 transmits the RAR corresponding to RACH preamble received from the UE 1000 on cell 1 in operation 1055. One example of this scenario is the carrier aggregation, where the UE 1000 is configured with Cell 2 1020 as SCell and Cell 1 1010 as PCell. In this case, RACH preamble is transmitted on SCell and the corresponding RAR is received by UE from PCell. Cell 1 1010 also includes UE's C-RNTI in RAR. RACH preamble and/or RACH resource on which RACH preamble is received by Cell 2 1020 is assigned to UE, so UE's C-RNTI is known to network (or gNB or cell 2). Therefore, the UE 1000 can determine the RAR is received successfully if the RAR corresponds UE's RA-RNTI, RAPID, OtherCellIndicator set to 1 and received C-RNTI which matches with UE's C-RNTI in operation 1060.

Figure 11:
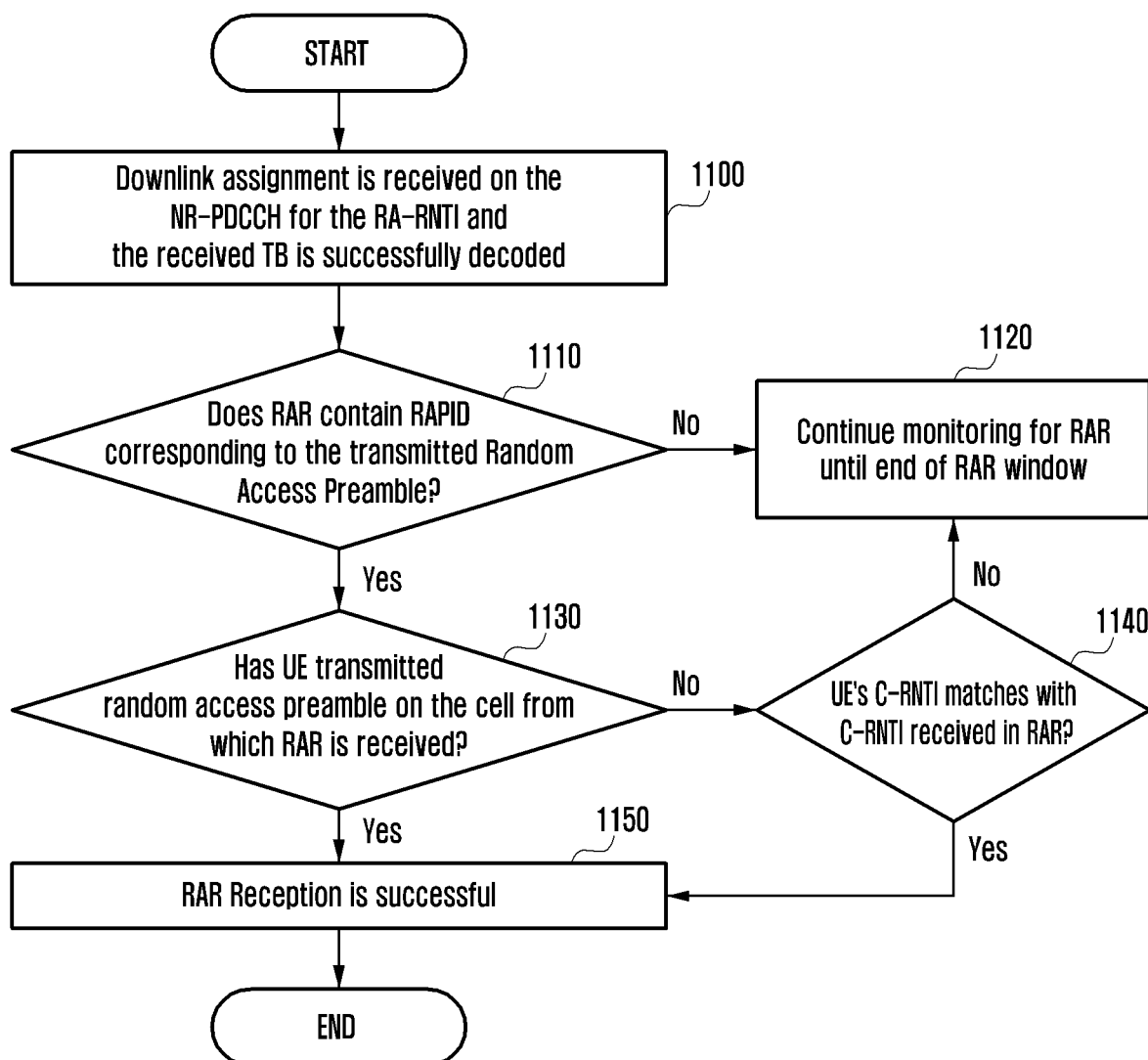
FIG. 11 illustrates a method by a UE to determine successfully receiving a RAR corresponding to a PRACH preamble that is transmitted by the UE according to an embodiment of the disclosure.

FIG. 11 illustrates a method by a UE to determine successfully receiving a RAR corresponding to a PRACH preamble that is transmitted by the UE according to an embodiment of the disclosure.

Referring to FIG. 11, when a downlink assignment has been received on the NR-PDCCH for the RA-RNTI and the received TB is successfully decoded in operation 1100, a UE identifies whether the RAR contains RAPID corresponding to the transmitted random access preamble or not in operation 1110. If the Random Access Response contains a Random Access Preamble identifier corresponding to the transmitted Random Access Preamble, the UE identifies whether the UE has transmitted random access preamble on the cell from which UE has received this RAR in operation 1130. If the received RAR does not contain RAPID corresponding to the transmitted random access preamble, the UE shall continue monitoring for RAR until the end of RAR window in step 1120.

After operation 1130, the UE shall consider this Random Access Response reception successful if the UE has transmitted random access preamble on the cell from which RAR is received. If the UE has transmitted random access preamble on the cell other than the cell from which UE has received this RAR, the UE identifies whether UE's C-RNTI matches with C-RNTI in RAR in operation 1140. If UE's C-RNTI matches with C-RNTI received in RAR, the UE shall consider this Random Access Response reception successful in operation 1150. If UE's C-RNTI does not match with C-RNTI received in RAR the UE shall continue monitoring for RAR until the end of RAR window in operation 1120.

Figure 12:
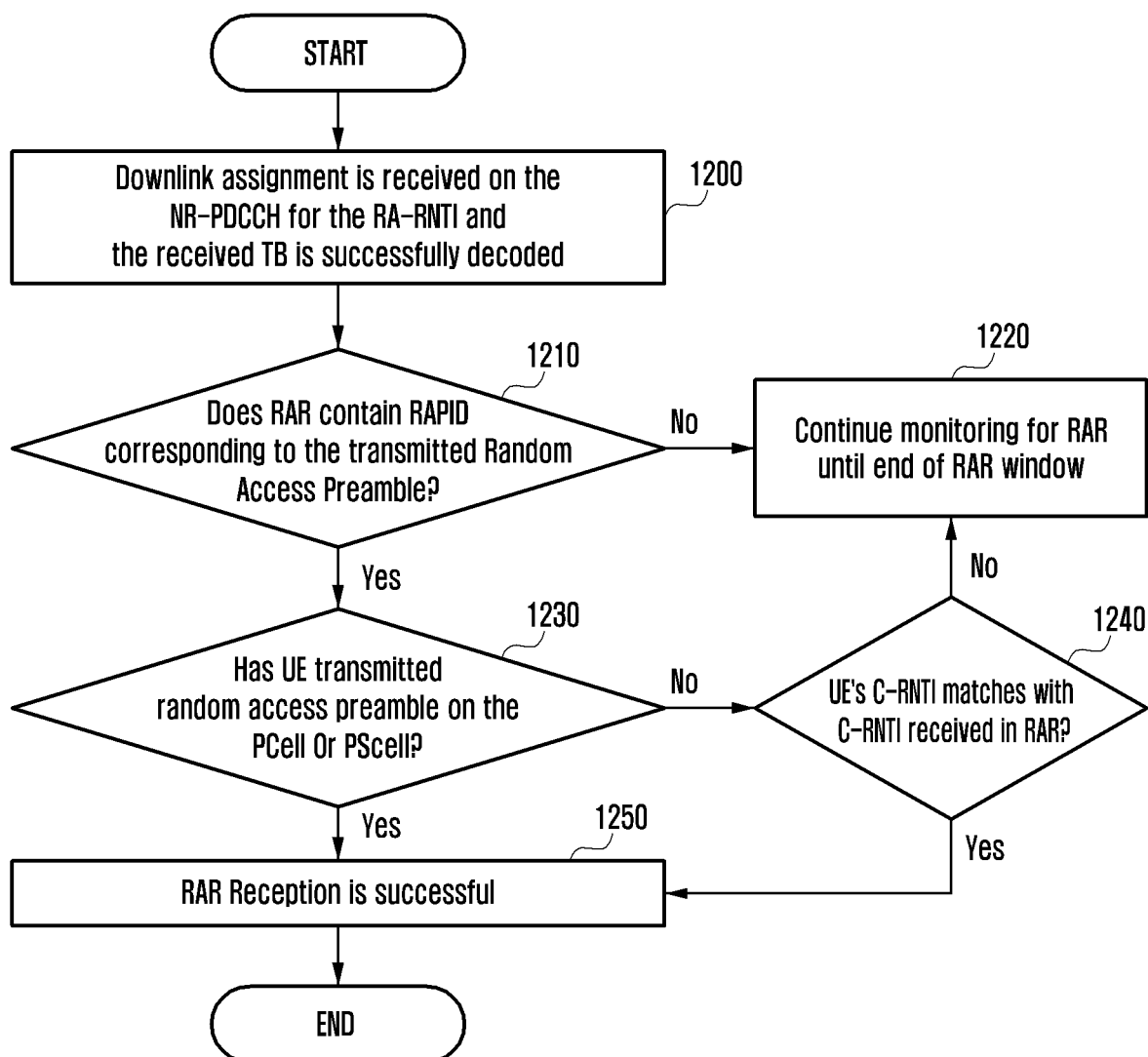
FIG. 12 illustrates a method by a UE to determine successfully receiving a RAR corresponding to PRACH preamble transmitted by the UE according to an embodiment of the disclosure.

FIG. 12 illustrates a method by a UE to determine successfully receiving a RAR corresponding to PRACH preamble transmitted by the UE according to an embodiment of the disclosure.

Referring to FIG. 12, when a downlink assignment has been received on the NR-PDCCH for the RA-RNTI and the received TB is successfully decoded in operation 1200, a UE identifies whether the RAR contains RAPID corresponding to the transmitted random access preamble or not in operation 1210. If the Random Access Response contains a Random Access Preamble identifier corresponding to the transmitted Random Access Preamble, the UE identifies whether the UE has transmitted random access preamble on PCell or PSCell in operation 1130. If the received RAR does not contain RAPID corresponding to the transmitted random access preamble, the UE shall continue monitoring for RAR until the end of RAR window in operation 1220.

After operation 1230 the UE shall consider this Random Access Response reception successful if the UE has transmitted random access preamble on PCell or PSCell. If UE has transmitted random access preamble on SCell other than PSCell or PCell, the UE identifies whether UE's C-RNTI matches with C-RNTI in RAR in operation 1240. If UE's C-RNTI matches with C-RNTI received in RAR, the UE shall consider this Random Access Response reception successful in operation 1250. If UE's C-RNTI does not match with C-RNTI received in RAR the UE shall continue monitoring for RAR until the end of RAR window in operation 1220.

Method 4

In this method, it is proposed that in addition to RAPID and RA-RNTI checking, UE which performs CFRA also checks for its C-RNTI in RAR. If cell is transmitting RAR for a RACH preamble (or MSG 1) which was dedicatedly assigned to UE then it also includes UE's C-RNTI in RAR.

Figure 13A:
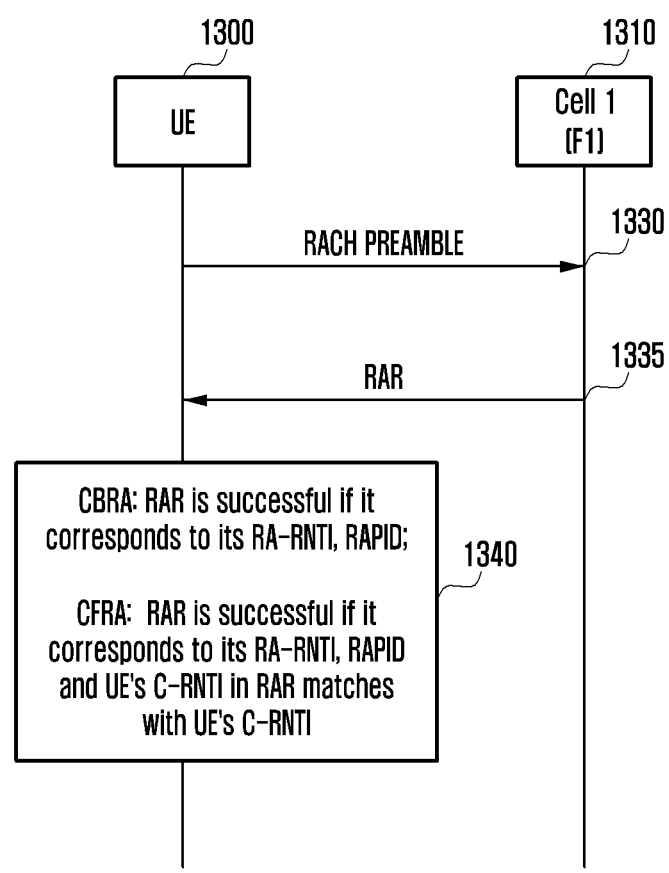
FIGS. 13A and 13B illustrate example methods of receiving RARs according to various embodiments of the disclosure.
Figure 13B:
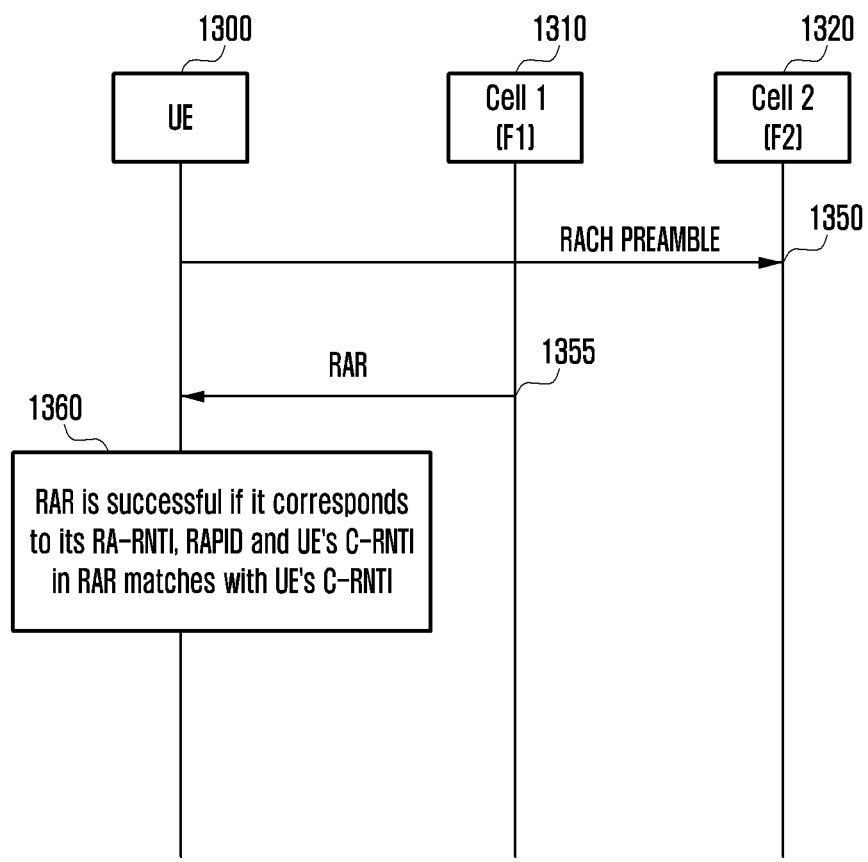

FIGS. 13A and 13B illustrate example methods of receiving RARs according to various embodiments of the disclosure.

Referring to FIG. 13A, a UE 1300 transmits RACH preamble to cell 1 1310 in operation 1330. Cell 1 1310 transmits the RAR corresponding to RACH preamble received from the UE 1300 in operation 1335. In case of contention based RACH temporary C-RNTI is included in RAR. In case of contention free RACH, UE's C-RNTI is included. In operation 1340, the UE 1300 determines the RAR is received successfully if the RAR corresponds to UE's RA-RNTI, RAPID in case of CBRA. The UE 1300 also determines the RAR is received successfully if the RAR corresponds to UE's RA-RNTI, RAPID and received C-RNTI which matches with UE's C-RNTI in case of CFRA.

Referring to FIG. 13B, a UE 1300 transmits RACH preamble to cell 1320 in operation 1350. Cell 1 1310 transmits the RAR corresponding to RACH preamble received from the UE 1300 on cell 1 1310 in operation 1355. One example of this scenario is the carrier aggregation, where the UE 1300 is configured with Cell 2 1320 as S Cell and Cell 1 1310 as PCell. In this case, RACH preamble is transmitted on SCell and the corresponding RAR is received by UE from PCell. Cell 1 1310 also includes UE's C-RNTI in RAR. RACH preamble and/or RACH resource on which RACH preamble is received by Cell 2 is assigned to UE, so UE's C-RNTI is known to network (or gNB or cell 2). Therefore, the UE 1300 can determine the RAR is received successfully if the RAR corresponds UE's RA-RNTI, RAPID and received C-RNTI which matches with UE's C-RNTI in operation 1360.

Figure 14A:
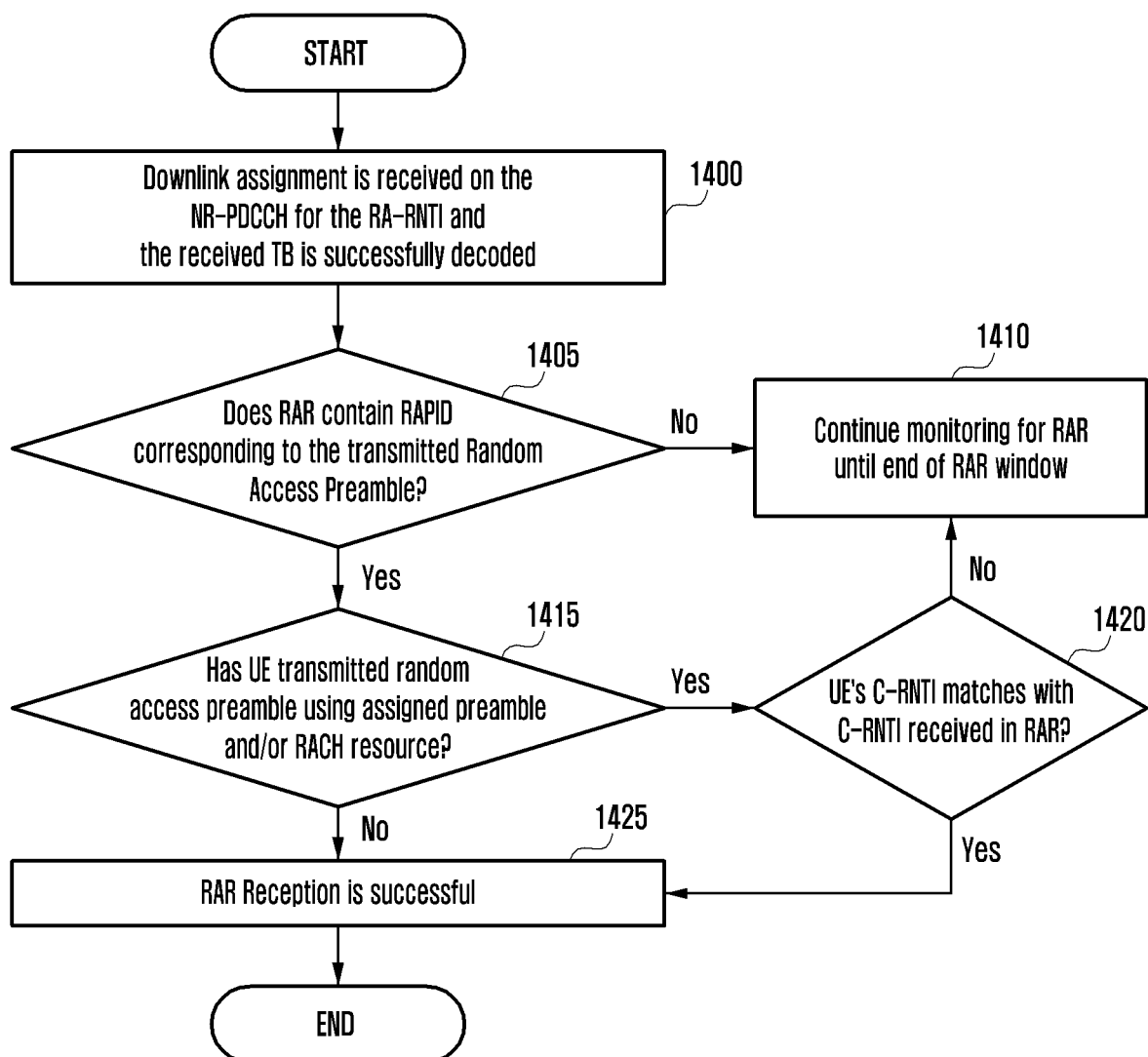
FIG. 14A illustrates a method by a UE to determine successfully receiving a RAR corresponding to a PRACH preamble that is transmitted by the UE according to an embodiment of the disclosure.

FIG. 14A illustrates a method by a UE to determine successfully receiving a RAR corresponding to a PRACH preamble that is transmitted by the UE according to an embodiment of the disclosure.

Referring to FIG. 14A, when a downlink assignment has been received on the NR-PDCCH for the RA-RNTI and the received TB is successfully decoded in operation 1400, a UE identifies whether the RAR contains RAPID corresponding to the transmitted random access preamble or not in operation 1405. If the Random Access Response contains a Random Access Preamble identifier corresponding to the transmitted Random Access Preamble, the UE identifies whether the UE has transmitted random access preamble using assigned preamble and/or RACH resource in operation 1415. If the received RAR does not contain RAPID corresponding to the transmitted random access preamble, the UE shall continue monitoring for RAR until the end of RAR window in operation 1410. If the UE has not transmitted random access preamble using assigned preamble and/or RACH resource, the UE shall consider this Random Access Response reception successful in operation 1425.

After operation 1415 if the UE has transmitted random access preamble using assigned preamble and/or RACH resource, the UE identifies that UE's C-RNTI matches with C-RNTI received in RAR in operation 1420. If UE's C-RNTI matches with C-RNTI received in RAR, the UE shall consider this Random Access Response reception successful in 1425. If UE's C-RNTI does not match with C-RNTI received in RAR, the UE shall continue monitoring for RAR until the end of RAR window in operation 1410.

Method 5

In this method, it is proposed a UE which performs CFRA considers RAR is successfully received if PDCCH is addressed to its C-RNTI and decoded TB includes RAR. If cell is transmitting RAR for a RACH preamble (or MSG 1) which was dedicatedly assigned to UE then it transmits PDCCH addressed to UE's C-RNTI and including RAR in the corresponding TB.

Figure 14B:
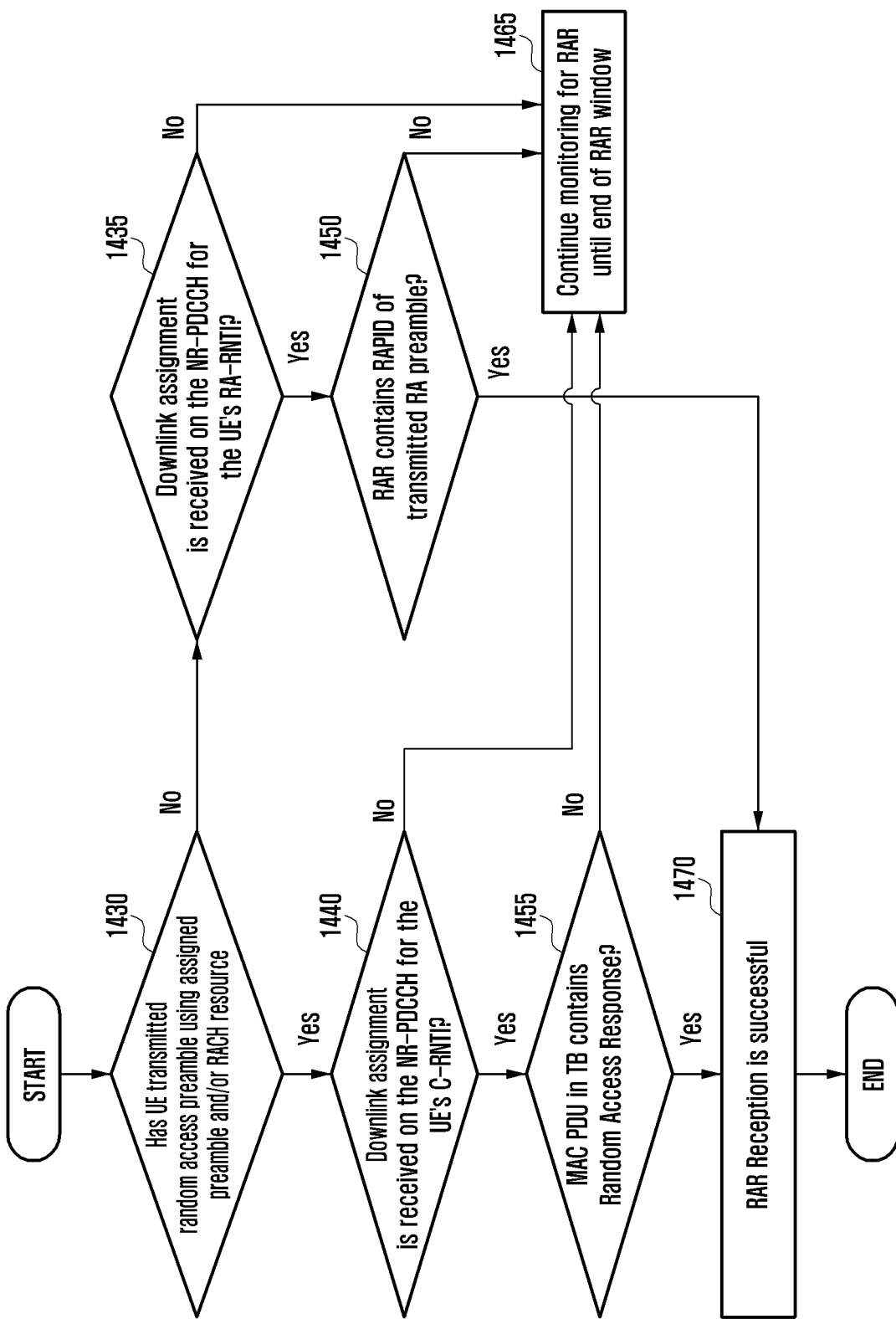
FIG. 14B illustrates a method by a UE to determine successfully receiving a RAR corresponding to a PRACH preamble that is transmitted by the UE according to an embodiment of the disclosure.

FIG. 14B illustrates a method by a UE to determine successfully receiving a RAR corresponding to a PRACH preamble that is transmitted by the UE according to an embodiment of the disclosure.

Referring to FIG. 14B, in operation 1430, a UE identifies that the UE has transmitted random access preamble using assigned preamble and/or RACH resource. If the UE has transmitted random access preamble using assigned preamble and/or RACH resource, the UE identifies that a downlink assignment has been received on the NR-PDCCH for the C-RNTI and the received TB is successfully decoded in operation 1440. If the UE did not transmit random access preamble using assigned preamble and/or RACH resource, the UE identifies that a downlink assignment has been received on the NR-PDCCH for the RA-RNTI and the received TB is successfully decoded in operation 1435.

If the downlink assignment was not received on the NR-PDCCH for the RA-RNTI and the received TB is successfully decoded in operation 1435, the UE shall continue monitoring for RAR until the end of RAR window in operation 1465. If a downlink assignment has been received on the NR-PDCCH for the RA-RNTI and the received TB is successfully decoded, the UE identifies whether RAR contains RAPID of transmitted RA preamble in operation 1450. If the RAR contains corresponding RAPID, the UE shall consider the RAR reception successful in 1470. If RAR does not contain corresponding RAPID, the UE shall continue monitoring for RAR until the end of RAR window in operation 1465.

If the downlink assignment has been received on the NR-PDCCH for the C-RNTI and the received TB is successfully decoded in operation 1440, the UE identifies whether MAC packet data unit (PDU) in the TB contains RAR in operation 1455. If the downlink assignment was not received on the NR-PDCCH for the C-RNTI, the UE shall continue monitoring for RAR until the end of RAR window in operation 1465. If the MAC PDU in the TB contains the RAR the UE shall consider the RAR reception successful in 1470. If the MAC PDU in the TB does not contain the RAR the UE shall continue monitoring for RAR until the end of RAR window in operation 1465.

In an embodiment, it is proposed that a UE which performs CFRA considers RAR is successfully received if it receives PDCCH addressed to its C-RNTI after transmitting PRACH preamble. The PDCCH may indicate DL or UL assignment.

RAR MAC PDU Design

The gNB transmits RAR MAC PDU in response to PRACH preamble(s) received from one or more UE(s).

RAR MAC PDU Design 1

Figure 15:
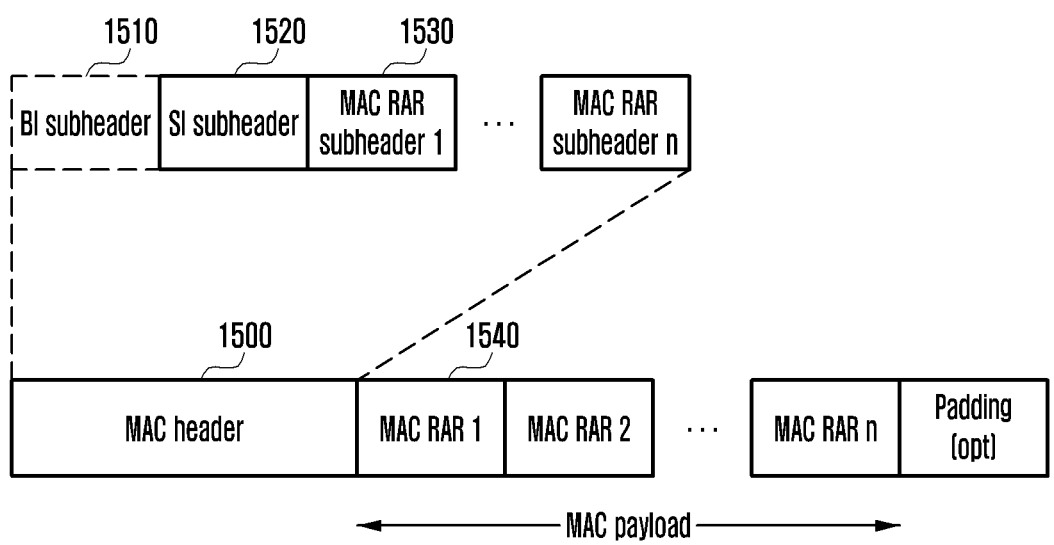
FIG. 15 illustrates a RAR media access control (MAC) protocol data unit (PDU) structure according to an embodiment of the disclosure.

FIG. 15 illustrates a RAR MAC PDU structure according to an embodiment of the disclosure.

Referring to FIG. 15, a RAR MAC PDU consists of a MAC header 1500 and zero or more MAC Random Access Responses (MAC RAR) and optionally padding. The MAC header is of variable size. A MAC PDU header consists of one or more MAC PDU subheaders; each subheader corresponding to a MAC RAR 1540 except for the Backoff Indicator subheader 1510 and system information (SI) request acknowledgement (ACK) subheader 1520. In an embodiment, a Backoff Indicator subheader and SI request ACK subheader, if included, may be included in beginning of MAC PDU Header. In an embodiment, SI request ACK subheader may not be there. In an embodiment there can be more than one SI request ACK subheader.

A MAC PDU subheader corresponding to MAC RAR 1530 consists of at least three header fields E (extension)/T (Type)/RAPID (random access preamble identifier). Reserved fields may be included to octet align the MAC subheader. This can also be referred as RAR subheader which have a corresponding MAC RAR.

A Backoff Indicator subheader 1510 consists of at least three fields E (extension)/T (type)/BI (backoff indicator). Reserved fields may be included to octet align Backoff Indicator subheader. There is no MAC RAR corresponding to this subheader.

A SI request ACK subheader 1520 consists of at least three fields E/T/RAPID (random access preamble identifier). Reserved fields may be included to octet align SI request ACK subheader. There is no MAC RAR corresponding to this subheader. This can also be referred as RAR subheader which does not have a corresponding MAC RAR. SI request ACK subheader and MAC RAR subheader has same fields. Hence they can both be referred as RAR subheader.

The subheader corresponding to MAC RAR 1530 and SI request subheader 1520 has same fields. So some mechanism is needed for receiver to distinguish them.

In an embodiment, type field in MAC subheader can indicate whether MAC subheader is a backoff indicator (or information) subheader i.e. it includes a backoff indicator (BI) (or information) or MAC subheader is a SI request ACK subheader including RAPID or MAC subheader includes RAPID and corresponds to a MAC RAR. Distinct value of type field 'T' are used to indicate backoff indicator subheader, SI request ACK subheader and MAC RAR subheader. An example setting of type field 'T' is shown below.

- T=01 (in binary) may indicate that MAC subheader is backoff indicator (or information) subheader
- T=10 (in binary) may indicates MAC subheader is SI request ACK subheader or RAR subheader which does not have a corresponding MAC RAR
- T=11 (in binary) may indicates MAC subheader is MAC RAR subheader or RAR subheader which have a corresponding MAC RAR In another embodiment, the Type field in MAC subheader only indicates whether the MAC subheader contains a Random Access preamble identifier (ID) or a BI (or information). If the type field indicates that MAC subheader contains a Random Access preamble ID, then UE checks if the RAPID is equal to RAPID of one of random access preambles reserved for SI request. If the RAPID in MAC subheader is equal to RAPID of one of random access preambles reserved for SI request, then this MAC subheader is the MAC subheader for SI request ACK and there is no MAC RAR corresponding to it. Otherwise, this MAC subheader is the MAC subheader for RAR and there is a MAC RAR corresponding to it.

Alternatively, a UE checks if the RAPID is equal to RAPID of one of random access preambles reserved for RA (both contention free and contention based) procedure excluding SI request procedure. If the RAPID in MAC subheader is equal to RAPID of random access preambles reserved for RA (both contention free and contention based) procedure excluding SI request procedure, then this MAC subheader is the MAC subheader for RAR and there is a MAC RAR corresponding to it. Otherwise, this MAC subheader is for SI request ACK and there is no MAC RAR corresponding to it. UE can obtain the information about the random access preambles reserved for RA (both contention free and contention based) procedure excluding SI request procedure from system information (e.g. system information block 1 (SIB1)) transmitted by gNB. For example, GNB can broadcast a parameter TotalNumberOfRAPreambles in system information. Preambles with RAPID less than the TotalNumberOfRAPreambles are used for RA (both contention free and contention based) procedure excluding SI request procedure. In another example where gNB broadcasts multiple synchronization signal (SS) blocks (SSBs), GNB can broadcast a parameter TotalNumberOfRAPreamblesPerSSB in system information. If the number (N, signaled by network) of SSBs per PRACH transmission occasion is greater than 1, for the ith (i=0 to N−1) SSB mapped to a PRACH transmission occasion, preambles from i*(64/N) to [i*(64/N)+TotalNumberOfRAPreamblesPerSSB−1] are used for RA procedure excluding SI request procedure. For example if 2 SSBs are mapped to a PRACH transmission occasion and TotalNumberOfRAPreamblesPerSSB is set to 24, then preambles 0 to 23 and 32 to 55 are for RA procedure excluding SI request procedure. If the number (N) of SSBs per PRACH transmission occasion is preambles from 0 to [TotalNumberOfRAPreamblesPerSSB−1] are used for RA procedure excluding SI request procedure. So UE can know all preambles used for RA procedure excluding SI request procedure. UE can also obtain the information about the random access preambles reserved for SI request procedure from system information (e.g. SIB1) transmitted by gNB.

In another embodiment, the Type field only indicates whether the MAC subheader contains a Random Access preamble ID or a Backoff Indicator (or information). If the type field indicates that MAC subheader contains a Random Access preamble ID, then UE checks if the RA-RNTI is equal to RA-RNTI reserved for SI request ACK or is equal to RA-RNTI corresponding to RACH resource reserved for SI request. If yes, then this MAC subheader is the MAC subheader for SI request ACK and there is no MAC RAR corresponding to it. Otherwise, this MAC subheader is the MAC subheader for RAR and there is a MAC RAR corresponding to it.

Figure 16A:
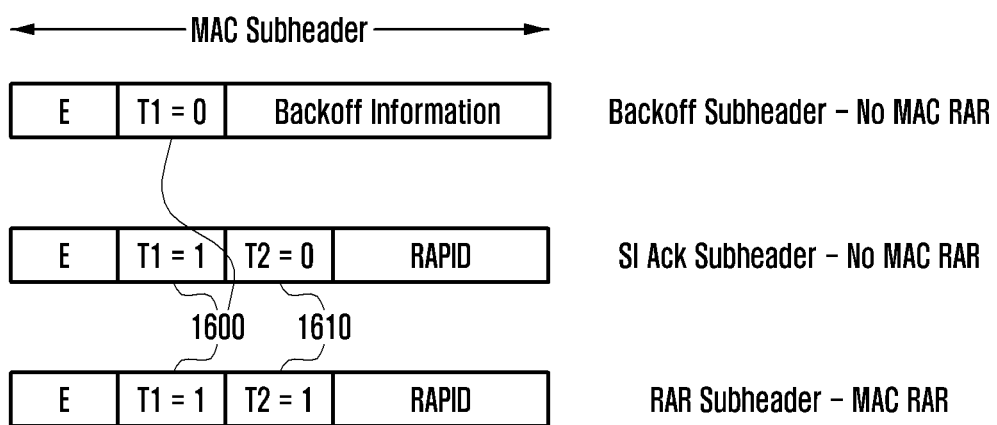
FIGS. 16A and 16B illustrate various embodiments of a type field in a MAC subheader according to various embodiments of the disclosure.
Figure 16B:
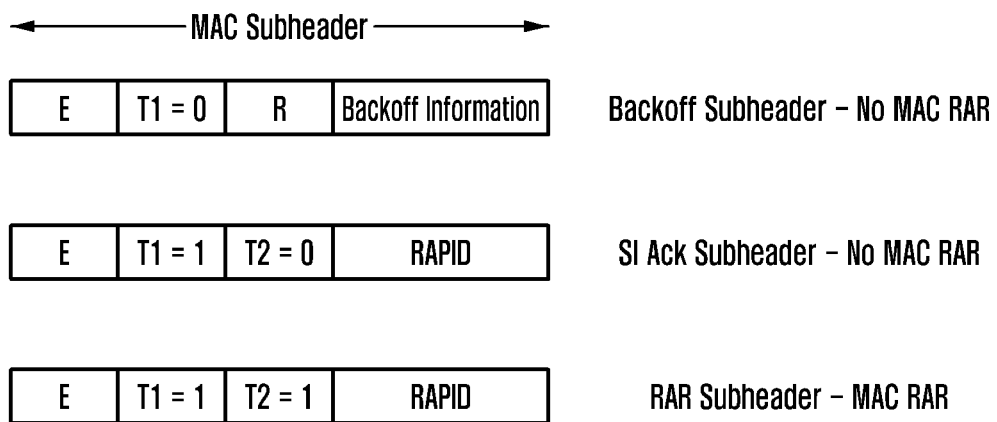

FIGS. 16A and 16B illustrate various embodiments of a type field in a MAC subheader according to various embodiments of the disclosure.

Referring to FIGS. 16A and 16B, the Type (T1) field 1600 only indicates whether the MAC subheader contains a Random Access preamble ID or a BI. If the T1 field 1600 indicates that MAC subheader contains a Random Access preamble identifier, then another type (T2) field 1610 indicates whether this MAC subheader has a corresponding MAC RAR or not. In other words, if the T1 field (T1) 1600 indicates that MAC subheader contains a Random Access preamble ID, then T2 field 1610 indicates whether this MAC subheader is a SI request ACK subheader or is a MAC RAR subheader. The T2 field 1610 is included only when the T1 field 1600 indicates RAPID is included in MAC subheader. So the T2 field 1610 is included only in SI request ACK subheader and RAR subheader. Extension flag E in subheader indicates whether this is the last subheader in MAC header or not. R is the reserved field.

RAR MAC PDU Design 2

Figure 17A:
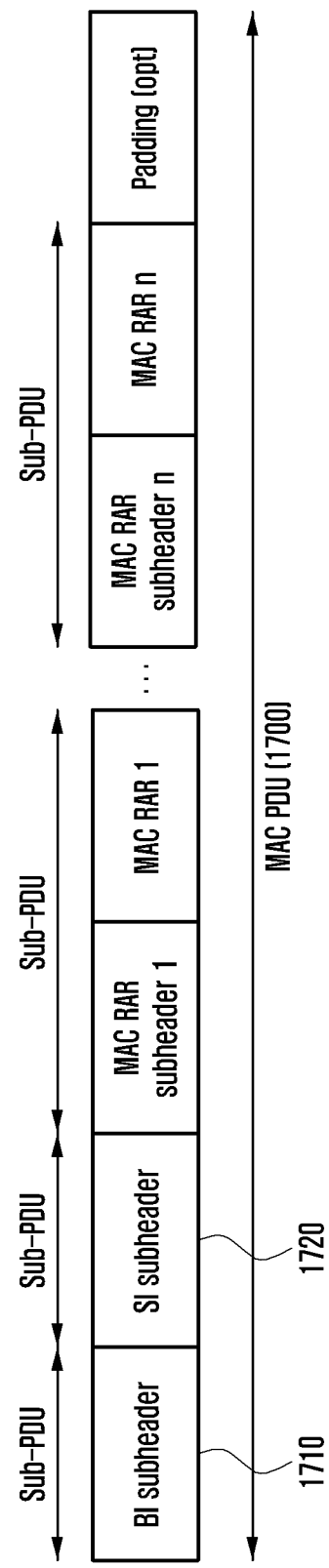
FIG. 17A illustrates another RAR MAC PDU structure according to an embodiment of the disclosure.

FIG. 17A illustrates another RAR MAC PDU structure according to an embodiment of the disclosure.

Referring to FIG. 17, a RAR MAC PDU 1700 consists of one or more MAC sub headers and zero or more MAC Random Access Responses (MAC RAR) and optionally padding. MAC RAR subheader is present before each MAC RAR included in MAC PDU. In an embodiment, BI subheader 1710 and SI subheader 1720 if present may be included in beginning of MAC PDU. There is no MAC RAR corresponding to BI subheader and SI subheader. In an embodiment there can be more than one SI request ACK subheader in MAC PDU.

Figure 17B:
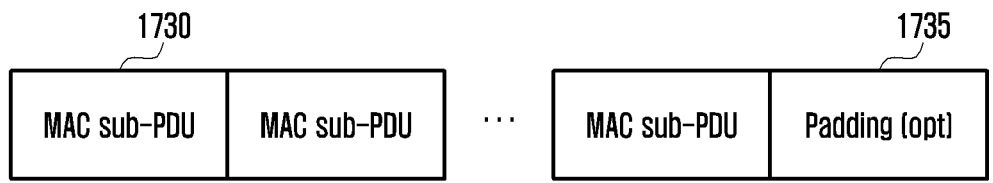
FIG. 17B illustrates another RAR MAC PDU structure according to an embodiment of the disclosure.

FIG. 17B illustrates another RAR MAC PDU structure according to an embodiment of the disclosure.

Referring to FIG. 17B, a MAC PDU consists of one or more MAC sub-PDUs 1730 and optional padding 1735. Each MAC sub-PDU consists one of the following:
 a MAC subheader only
 a MAC subheader with backoff indicator only OR a MAC subheader with RAPID only (i.e. acknowledgement for SI request)
 a MAC subheader with RAPID and MAC RAR A MAC sub-PDU with backoff information if present in the RAR MAC PDU is included at the beginning of the RAR MAC PDU. A MAC sub-PDU(s) for SI request acknowledgement if present in the RAR MAC PDU can be included anywhere in the RAR MAC PDU. In an embodiment, MAC sub-PDU(s) for SI request acknowledgement if present in the RAR MAC PDU can be included at the end of the RAR MAC PDU to facilitate quick processing of MAC sub-PDU with RAR.

In an embodiment, a MAC PDU subheader corresponding to MAC RAR consists of at least three header fields E/T/RAPID. The Extension field 'E' is a flag indicating if the MAC sub-PDU including this MAC subheader is the last MAC sub-PDU or not in the MAC PDU. The E field is set to "1" to indicate at least another MAC sub-PDU follows. The E field is set to "0" to indicate that the MAC sub-PDU including this MAC subheader is the last MAC sub-PDU in the MAC PDU. In an alternate embodiment, a MAC PDU subheader corresponding to MAC RAR consists of at least two header fields T/RAPID. Reserved fields may be included to octet align the MAC subheader. This can also be referred as RAR subheader which have a corresponding MAC RAR. MAC RAR subheader in MAC sub-PDU is followed by MAC RAR.

In an embodiment, a Backoff Indicator (or information) subheader consists of at least three fields E/T/BI. The Extension field 'E' is a flag indicating if the MAC sub-PDU including this MAC subheader is the last MAC sub-PDU or not in the MAC PDU. The E field is set to "1" to indicate at least another MAC sub-PDU follows. The E field is set to "0" to indicate that the MAC sub-PDU including this MAC subheader is the last MAC sub-PDU in the MAC PDU. In an alternate embodiment, a Backoff Indicator (or information) subheader consists of at least two fields T/BI. Reserved fields may be included to octet align Backoff Indicator (or information) subheader. There is no MAC RAR corresponding to this subheader. MAC sub-PDU carrying back information consists of only backoff indicator (or information) subheader. Backoff indicator (or information) subheader in MAC sub-PDU is not followed by MAC RAR.

In an embodiment, a SI request ACK subheader consists of at least three fields E/T/RAPID. The Extension field 'E' is a flag indicating if the MAC sub-PDU including this MAC subheader is the last MAC sub-PDU or not in the MAC PDU. The E field is set to "1" to indicate at least another MAC sub-PDU follows. The E field is set to "0" to indicate that the MAC sub-PDU including this MAC subheader is the last MAC sub-PDU in the MAC PDU. In an alternate embodiment, an SI request ACK subheader consists of at least two fields T/RAPID. Reserved fields may be included to octet align SI request ACK subheader. There is no MAC RAR corresponding to this subheader. This can also be referred as RAR subheader which does not have a corresponding MAC RAR. MAC sub-PDU carrying SI request ACK consists of only SI request ACK subheader. SI request ACK subheader in MAC sub-PDU is not followed by MAC RAR.

The subheader corresponding to MAC RAR and SI request subheader has same fields. So some mechanism is needed for receiver to distinguish them.

In an embodiment, type field in MAC subheader can indicate whether MAC subheader (i.e. BI subheader) includes backoff indicator (or information) or MAC subheader (i.e. SI request ACK subheader) includes RAPID and is not followed by MAC RAR or MAC subheader includes RAPID and is followed by MAC RAR. An example setting of type field is shown below.

T=01 (in binary) or 1 in decimal may indicate MAC subheader (i.e. backoff indicator (or information) subheader) includes indicator (or information)

T=10 (in binary) or 2 in decimal may indicate MAC subheader (i.e. SI request ACK subheader) includes RAPID and is not followed by MAC RAR T=11 (in binary) or 3 may indicate MAC subheader includes RAPID and is followed by MAC RAR In another embodiment, the Type field in MAC subheader indicates whether the MAC subheader contains a Random Access preamble identifier or a Backoff Indicator (or information). If the type field in MAC subheader indicates random access preamble ID, then UE checks if the RAPID is equal to RAPID of one of random access preambles reserved for SI request. If the RAPID in MAC subheader is equal to RAPID of one of random access preambles reserved for SI request, then this MAC subheader is the MAC subheader for SI request ACK and there is no MAC RAR corresponding to it. Otherwise, this MAC subheader is the MAC subheader for RAR and there is a MAC RAR corresponding to it.

Alternately, the UE checks if the RAPID is equal to RAPID of one of random access preambles reserved for RA (both contention free and contention based) procedure excluding SI request procedure. If the RAPID in MAC subheader is equal to RAPID of random access preambles reserved for RA (both contention free and contention based) procedure excluding SI request procedure, then this MAC subheader is the MAC subheader for RAR and there is a MAC RAR corresponding to it. Otherwise, this MAC subheader is for SI request ACK and there is no MAC RAR corresponding to it. UE can obtain the information about the random access preambles reserved for RA (both contention free and contention based) procedure excluding SI request procedure from system information (e.g. SIB1) transmitted by gNB. For example, GNB can broadcast a parameter TotalNumberOfRAPreambles in system information. Preambles with RAPID<TotalNumberOfRAPreambles are used for RA (both contention free and contention based) procedure excluding SI request procedure. In another example where gNB broadcasts multiple SSBs, GNB can broadcast a parameter TotalNumberOfRAPreamblesPerSSB in system information. If the number (N, signaled by network) of SSBs per PRACH transmission occasion is greater than 1, for the ith (i=0 to N−1) SSB mapped to a PRACH transmission occasion, preambles from i*(64/N) to [i*(64/N)+TotalNumberOfRAPreamblesPerSSB−1] are used for RA procedure excluding SI request procedure. For example if 2 SSBs are mapped to a PRACH transmission occasion and TotalNumberOfRAPreamblesPerSSB is set to 24, then preambles 0 to 23 and 32 to 55 are for RA procedure excluding SI request procedure. If the number (N) of SSBs per PRACH transmission occasion is preambles from 0 to [TotalNumberOfRAPreamblesPerSSB−1] are used for RA procedure excluding SI request procedure. So UE can know all preambles used for RA procedure excluding SI request procedure. UE can also obtain the information about the random access preambles reserved for SI request procedure from system information (e.g. SIB1) transmitted by gNB.

In another embodiment, the Type field in MAC subheader indicates whether the MAC subheader contains a Random Access preamble ID or a Backoff Indicator (or information). If the type field in MAC subheader indicates random access preamble ID, then UE checks if the RA-RNTI is equal to RA-RNTI reserved for SI request ACK or is equal to RA-RNTI corresponding to RACH resource reserved for SI request. If yes, then this MAC subheader is the MAC subheader for SI request ACK and there is no MAC RAR corresponding to it. Otherwise, this MAC subheader is the MAC subheader for RAR and there is a MAC RAR corresponding to it.

In another embodiment, the Type (T1) field only indicates whether the MAC subheader contains a Random Access preamble ID or a Backoff Indicator (or information). If the type field (T1) indicates that MAC subheader contains a Random Access preamble ID, then another type field T2 indicates whether this MAC subheader has a corresponding MAC RAR or not. If the type field (T1) indicates that MAC subheader contains a Random Access preamble ID, then another type field T2 indicates whether this MAC subheader is for SI request ACK or is a MAC RAR subheader. T2 field is included only when T1 field indicates RAPID is included in MAC subheader.

Figure 17C:
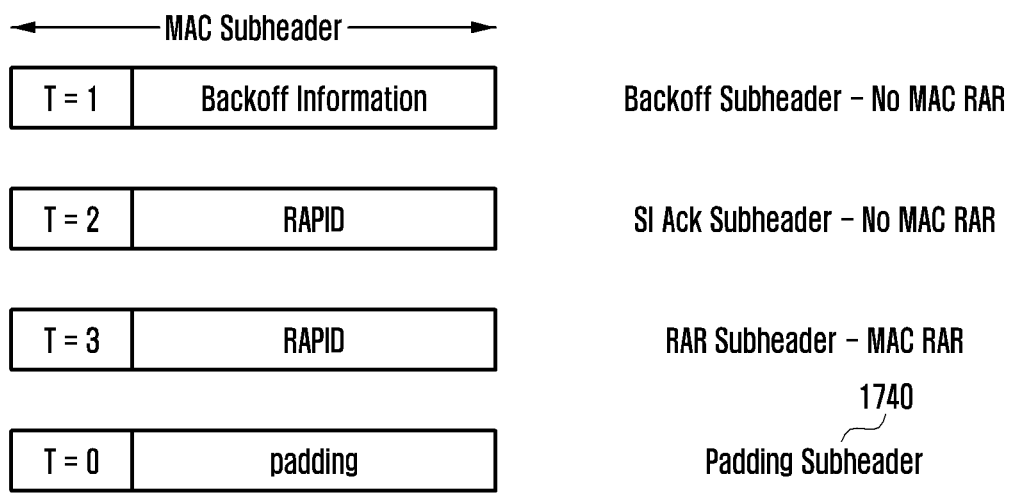
FIG. 17C illustrates a type field in a MAC subheader according to an embodiment of the disclosure.

FIG. 17C illustrates a type field in a MAC subheader according to an embodiment of the disclosure.

Referring to FIG. 17C, a type field T or type field T1 can also indicate padding (or padding starts at the next byte). For example T or T1 in above embodiments can be set to zero to indicate padding or padding subheader 1740. In this case extension field E is not required in MAC subheader. In an alternate embodiment UE can check the whether the byte which it has to process for MAC subheader is zero or not. If zero, padding is there including this byte. If not zero, MAC subheader is present and UE parses the fields of MAC subheader. In an alternate embodiment UE check whether the first byte (or all bytes) of MAC subheader is zero or not. If zero, padding is there. If not zero, MAC subheader is present and UE parses the fields of MAC subheader.

In an embodiment, 'E' field is included in MAC subheader, The Extension field 'E' is a flag indicating if the MAC sub-PDU including this MAC subheader is the last MAC sub-PDU or not in the MAC PDU. The E field is set to "1" to indicate at least another MAC sub-PDU follows. The E field is set to "0" to indicate that the MAC sub-PDU including this MAC subheader is the last MAC sub-PDU in the MAC PDU. Anything left in the RAR MAC PDU after the last MAC sub-PDU is padding.

RAR MAC PDU Design 3

Figure 18:
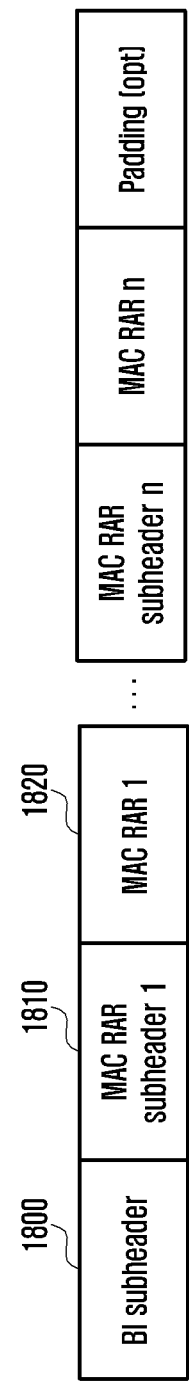
FIG. 18 illustrates another RAR MAC PDU structure according to an embodiment of the disclosure.

FIG. 18 illustrates another RAR MAC PDU structure according to an embodiment of the disclosure.

Referring to FIG. 18, a RAR MAC PDU consists of one or more MAC sub headers and zero or more MAC Random Access Responses (MAC RAR) and optionally padding. MAC RAR subheader 1810 is present before each MAC RAR 1820 included in MAC PDU. In an embodiment, BI subheader 1800 if present may be included in beginning of MAC PDU. There is no MAC RAR corresponding to BI subheader.

A MAC PDU subheader corresponding to MAC RAR consists of at least three header fields E/T/RAPID. In an alternate embodiment, a MAC PDU subheader corresponding to MAC RAR consists of at least two header fields T/RAPID. Reserved fields may be included to octet align the MAC subheader.

A Backoff Indicator subheader consists of at least three fields E/T/BI. In an alternate embodiment, a Backoff Indicator (or information) subheader consists of at least two fields T/BI. Reserved fields may be included to octet align Backoff Indicator subheader. There is no MAC RAR corresponding to this subheader.

In an embodiment type field T can indicate padding (or padding starts at the next byte). For example type field T in above embodiments can be set to zero to indicate padding or padding subheader. In an alternate embodiment UE can check the whether the byte which it has to process for MAC subheader is zero or not. If zero, padding is there including this byte. If not zero, MAC subheader is present and UE parses the fields of MAC subheader. In an alternate embodiment UE check whether the first byte (or all bytes) of MAC subheader is zero or not. If zero, padding is there. If not zero, MAC subheader is present and UE parses the fields of MAC subheader.

MAC RAR Design

MAC RAR Design 1

MAC RAR comprises of timing advance command, UL grant and C-RNTI fields. Reserved fields may be included to octet align MAC RAR. In certain scenarios, some fields such as UL grant and/or C-RNTI may not be present. A type or format field may be included in MAC RAR. The type or format field indicates whether UL grant and/or C-RNTI is present in MAC RAR or not. In alternate embodiment, type or format field indicates which of timing advance command, UL grant and C-RNTI is present in MAC RAR. In an alternative embodiment type or format field may indicate one of the following:

MAC RAR includes timing advance command, UL grant and C-RNTI

MAC RAR includes timing advance command and UL grant

MAC RAR includes only timing advance command

MAC RAR includes timing advance command and C-RNTI

It is to be noted that in a system some of the above combinations or all of the above combinations may be indicated using type or format field. Each of the above can be defined as different MAC RAR format. The type of format field is present in each MAC RAR format at same location. The type of format field indicates MAC RAR format type. For example, type or format field=01 can mean MAC RAR includes timing advance command, UL grant and C-RNTI type or format field=10 can mean MAC RAR includes timing advance command and UL grant type or format field=11 can mean MAC RAR includes only timing advance command Based on type or format field, since UE knows the content of MAC RAR, it also can know the length of MAC RAR as size of each field is pre-defined. In an alternate embodiment, the type/format field to indicate MAC RAR content or format, may be included in MAC subheader.

MAC RAR Design 2

MAC RAR comprises of timing advance command, UL grant and C-RNTI/SI ACK Info fields. Reserved fields may be included to octet align MAC RAR. In certain scenarios, some fields such as UL grant and/or C-RNTI and/or SI ACK Info may not be present. A type or format field may be included in MAC RAR. The type or format field indicates whether UL grant and/or C-RNTI and/or SI ACK Info is present in MAC RAR or not. In alternate embodiment, type or format field indicates which of timing advance command, UL grant, C-RNTI and SI ACK info is present in MAC RAR. In an alternate embodiment type or format field may indicate one of the following:

MAC RAR includes timing advance command, UL grant and C-RNTI

MAC RAR includes timing advance command and UL grant

MAC RAR includes only timing advance command

MAC RAR includes only SI ACK info

It is to be noted that in a system some of the above combinations or all of the above combinations may be indicated using type or format field. Each of the above can be defined as different MAC RAR format. The type of format field is present in each MAC RAR format at same location. The type of format field indicates MAC RAR format type. For example, type or format field=01 can mean MAC RAR includes timing advance command, UL grant and C-RNTI type or format field=10 can mean MAC RAR includes timing advance command and UL grant type or format field=11 can mean MAC RAR includes only timing advance command type or format field=00 means MAC RAR includes only SI ACK info Based on type or format field, since UE knows the content of MAC RAR, it also can know the length of MAC RAR as size of each field is pre-defined. In an alternate embodiment, the type/format field to indicate MAR RAR content or format, may be included in MAC subheader.

MAC RAR Design 3

MAC RAR comprises of timing advance command, UL grant, C-RNTI and SI ACK Info fields. Reserved fields may be included to octet align MAC RAR. In certain scenarios, some fields such as SI ACK Info may not be present. A type or format field may be included in MAC RAR. The type or format field indicates whether SI ACK Info is present in MAC RAR or not. In an alternative embodiment type or format field may indicate one of the following:

MAC RAR includes timing advance command, UL grant and C-RNTI

MAC RAR includes only SI ACK info

Each of the above can be defined as different MAC RAR format. The type of format field is present in each MAC RAR format at same location. The type of format field indicates MAC RAR format type. For example, type or format field=0 can mean MAC RAR includes timing advance command, UL grant and C-RNTI type or format field=1 can mean MAC RAR includes only SI ACK info Based on type or format field, since UE knows the content of MAC RAR, it also can know the length of MAC RAR as size of each field is pre-defined. In an alternate embodiment, the type/format field to indicate MAR RAR content or format, may be included in MAC subheader.

PRACH Transmission Counting

During the random access procedure UE maintains a transmission counter to count the number of PRACH preamble transmissions. The first embodiment for PRACH transmission counting is using Two Counters.

In this approach two counters PREAMBLE_TRANSMISSION_COUNTER and PREAMBLE_POWER_RAMPING_COUNTER can be defined in MAC specification. The PREAMBLE_TRANSMISSION_COUNTER is used to count the number of PRACH transmissions during a random access procedure and to take appropriate actions when the count reaches the maximum value. PREAMBLE_POWER_RAMPING_COUNTER is used in calculating power for PRACH (re-)transmissions. The MAC entity actions for these counters are as follows:

- MAC entity initializes PREAMBLE_TRANSMISSION_COUNTER and PREAMBLE_POWER_RAMPING_COUNTER to 1 when the Random procedure is initiated.
- If RAR reception is not successful or contention resolution is not successful the MAC entity shall:
- increments PREAMBLE_TRANSMISSION_COUNTER by 1;
- increments PREAMBLE_POWER_RAMPING_COUNTER by 1 if UE does not change its beam (or UL transmission (TX) beam) and SS block during PRACH retransmission. OR if beam (or UL TX beam) and SS block for next PRACH transmission is same as previous PRACH transmission, increment PREAMBLE_POWER_RAMPING_COUNTER by 1

In an alternate embodiment, PHY layer may send a notification to MAC layer indicating it to not ramp up power for next PRACH transmission. PHY layer may send this notification if the UL TX beam and/or SS block is changed i.e. if the UL TX beam and/or SS block for next PRACH transmission is different from beam used in previous PRACH transmission. If RAR reception is not successful or contention resolution is not successful, MAC entity shall perform the following operation.

- if MAC layer has received the notification from PHY layer to not ramp up power it shall not increment PREAMBLE_POWER_RAMPING_COUNTER by 1. Otherwise it shall increment PREAMBLE_POWER_RAMPING_COUNTER by 1.

In an alternate embodiment, PHY layer may send a notification i.e. power ramping suspension notification to MAC layer in case UL TX beam for PRACH retransmission is changed. If RAR reception is not successful or contention resolution is not successful, MAC entity shall perform the following operation.

- if RAR reception is not successful or contention resolution is not successful the MAC entity shall:
- increments PREAMBLE_TRANSMISSION_COUNTER by 1;
- if MAC layer has not received the notification for suspending the power ramping and SS block selected for PRACH retransmission is not changed it shall increment PREAMBLE_POWER_RAMPING_COUNTER by 1. Otherwise it shall not increment PREAMBLE_POWER_RAMPING_COUNTER by 1.

In an alternate embodiment, PHY layer may send a notification i.e. power ramping suspension notification to MAC layer in case UL TX beam for PRACH retransmission is changed. UE performs the following operation during preamble transmission:

- if PREAMBLE_TRANSMISSION_COUNTER is greater than one and the notification of suspending power ramping has not been received from lower layers, and SS block selected is not changed (i.e. same as the previous PRACH preamble transmission during the random access procedure):
- increment PREAMBLE_POWER_RAMPING_COUNTER by one In an embodiment, PHY layer may send a power ramping suspension notification to MAC layer if L1 drops the PRACH preamble transmission or transmit PRACH preamble by scaling down the power. The UE operation considering power ramping suspension notification, and SS block is as follows.

If RAR reception is not successful or contention resolution is not successful, MAC entity shall

- If RAR reception is not successful or contention resolution is not successful the MAC entity shall:
- if MAC layer has not received the notification for suspending the power ramping counter and SS block selected for PRACH retransmission is not changed it shall increment PREAMBLE_POWER_RAMPING_COUNTER by 1.

In an embodiment, PHY layer may send a power ramping suspension notification to MAC layer if L1 drops the PRACH preamble transmission or transmit PRACH preamble by scaling down the power. The UE operation considering power ramping suspension notification and SS block is as follows If RAR reception is not successful or contention resolution is not successful, MAC entity shall

- if RAR reception is not successful or contention resolution is not successful the MAC entity shall:
- UE performs the following operation during preamble transmission:
- if PREAMBLE_TRANSMISSION_COUNTER is greater than one and the power ramping suspension notification has not been received from lower layers, and SS block selected is not changed (i.e. it is same as the previous PRACH preamble transmission during the random access procedure):
- increment PREAMBLE_POWER_RAMPING_COUNTER by one.

The second embodiment for PRACH transmission counting is using single counter.

In this approach only one counter PREAMBLE_TRANSMISSION_COUNTER is defined in MAC specification. The PREAMBLE_TRANSMISSION_COUNTER is used to count the number of PRACH transmissions during a random access procedure and to take appropriate actions when the count reaches the maximum value. PREAMBLE_POWER_RAMPING_COUNTER is also used in calculating power for PRACH (re-)transmissions. The MAC entity actions are as follows:

- MAC entity initializes PREAMBLE_TRANSMISSION_COUNTER to 1 when the Random procedure is initiated.
- If RAR reception is not successful or contention resolution is not successful the MAC entity shall
- If UL TX beam is not changed increment PREAMBLE_TRANSMISSION_COUNTER by 1 or if beam (or UL TX beam) for next PRACH transmission is same as previous PRACH transmission, increment PREAMBLE_TRANSMISSION_COUNTER by 1

In an alternate embodiment, PHY layer may send a notification to MAC layer if the UL TX beam for next PRACH transmission is different from beam used in previous PRACH transmission. If RAR reception is not successful or contention resolution is not successful, MAC entity shall perform the following operation:

—If MAC layer has received the notification from PHY layer it shall not increment PREAMBLE_TRANSMISSION_COUNTER by 1. Otherwise it shall increment PREAMBLE_TRANSMISSION_COUNTER by 1.

RA-RNTI Calculation

After transmitting the PRACH preamble, a UE monitors the PDCCH of the special cell (SPCell) for Random Access Response(s) identified by the RA-RNTI(s) during the RAR window. The RA-RNTI is computed as described in further detail below.

Scenario 1: In time domain, only one PRACH transmission occasion is supported in one slot Method 1

In an embodiment of the proposed disclosure, the RA-RNTI associated with the PRACH in which the Random Access Preamble is transmitted, is computed as:

$$RA\text{-}RNTI = 1 + t\_id + X * f\_id \quad \text{(Eq. 1)}$$

In equation 1, $t\_id$ is an index of the first slot of the PRACH transmission occasion ($0 \leq t\_id < X$). In an embodiment, the slots in a radio frame are sequentially numbered starting from zero. Depending on the subcarrier spacing (SCS) for Msg1 (or random access preamble) transmission, number of slots in a radio frame can vary from 10 to 80 as shown in Table 1 below. Maximum number of slots in a radio frame is 80, so X can be equal to 80 if maximum RAR window size is one radio frame i.e., 10 ms.

TABLE 1

| SCS for determining RACH slot | # of slots in a subframe | # of slots in a radio frame |
|---|---|---|
| 15 KHz | 1 | 10 |
| 30 KHz | 2 | 20 |
| 60 KHz | 4 | 40 |
| 120 KHz | 8 | 80 |

Alternately, if PRACH transmission occasion can start only in some slots in a radio frame, X can be smaller than 80. For example, if PRACH transmission occasion can only start in slots 0, 4, 8 and 12, X can be 4 as there are four possible slots where PRACH transmission occasion can start in a radio frame. Each of these slots (0, 4, 8, 12 in the example) where PRACH transmission occasion can start are logically indexed sequentially (i.e. $t\_id$ for PRACH transmission occasion starting in slot 0 is 0, $t\_id$ for PRACH transmission occasion starting in slot 4 is 1, $t\_id$ for PRACH transmission occasion starting in slot 8 is 2 and $t\_id$ for PRACH transmission occasion starting in slot 12 is 3).

In an embodiment, X can be set to a value depending on numerology or SCS. For example for SCS of 15 KHz it can be set to 10 as there are 10 slots in a radio frame in this case. For SCS of 30 KHz it can be set to 20 as there 20 slots in a radio frame in this case. For SCS of 60 KHz it can be set to 40 as there are 40 slots in a radio frame in this case. For SCS of 120 KHz it can be set to 80 as there are 80 slots in a radio frame in this case. The slots in a radio frame are sequentially numbered starting from zero.

Figure 19:
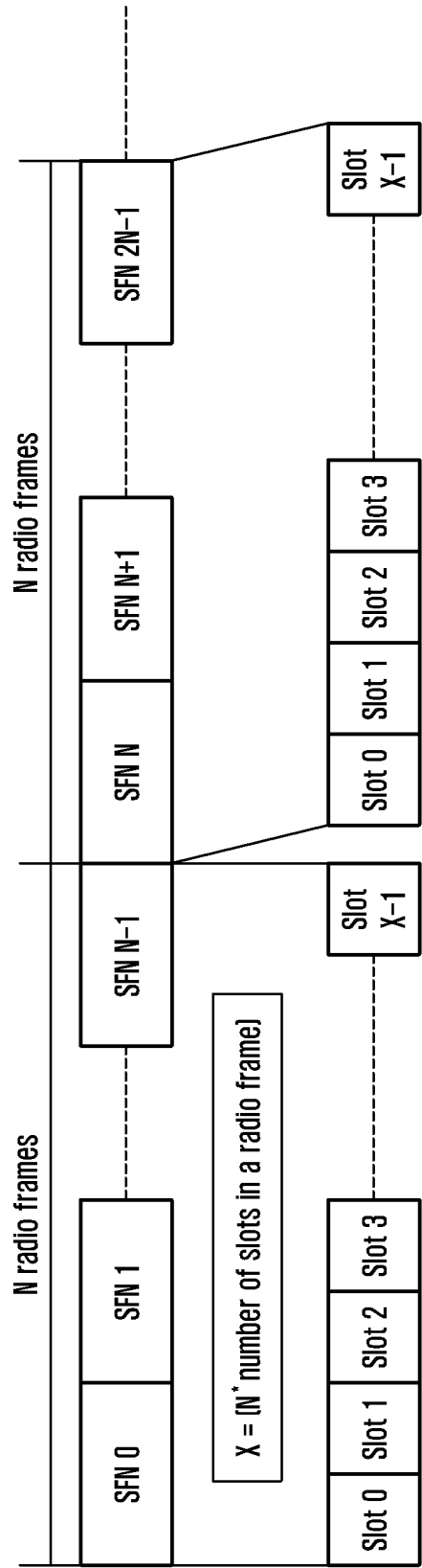
FIG. 19 illustrates an embodiment of indexing slots for computing a RA-radio network temporary identifier (RA-RNTI) according to an embodiment of the disclosure.

FIG. 19 illustrates an embodiment of indexing slots for computing a RA-RNTI according to an embodiment of the disclosure.

Referring to FIG. 19, if maximum size of RAR window is greater than one radio frame called N radio frames, then slots in every N consecutive radio frames starting from radio frame with system frame number (SFN) 0, are indexed sequentially from zero. Slots in SFN 0 to SFN N−1 are indexed sequentially start from zero. Slots in SFN N to SFN 2N−1 are indexed sequentially start from zero and so on. In this case X can be equal to 80*N, as maximum number of slots in radio frame is 80 and maximum number of slots in N radio frames is N*80. The slots are indexed sequentially for N consecutive radio frames starting from first slot of every radio frame with SFN which satisfies equation FIG. 20 illustrates another embodiment of indexing slots for computing a RA-RNTI according to an embodiment of the disclosure.

Figure 20:
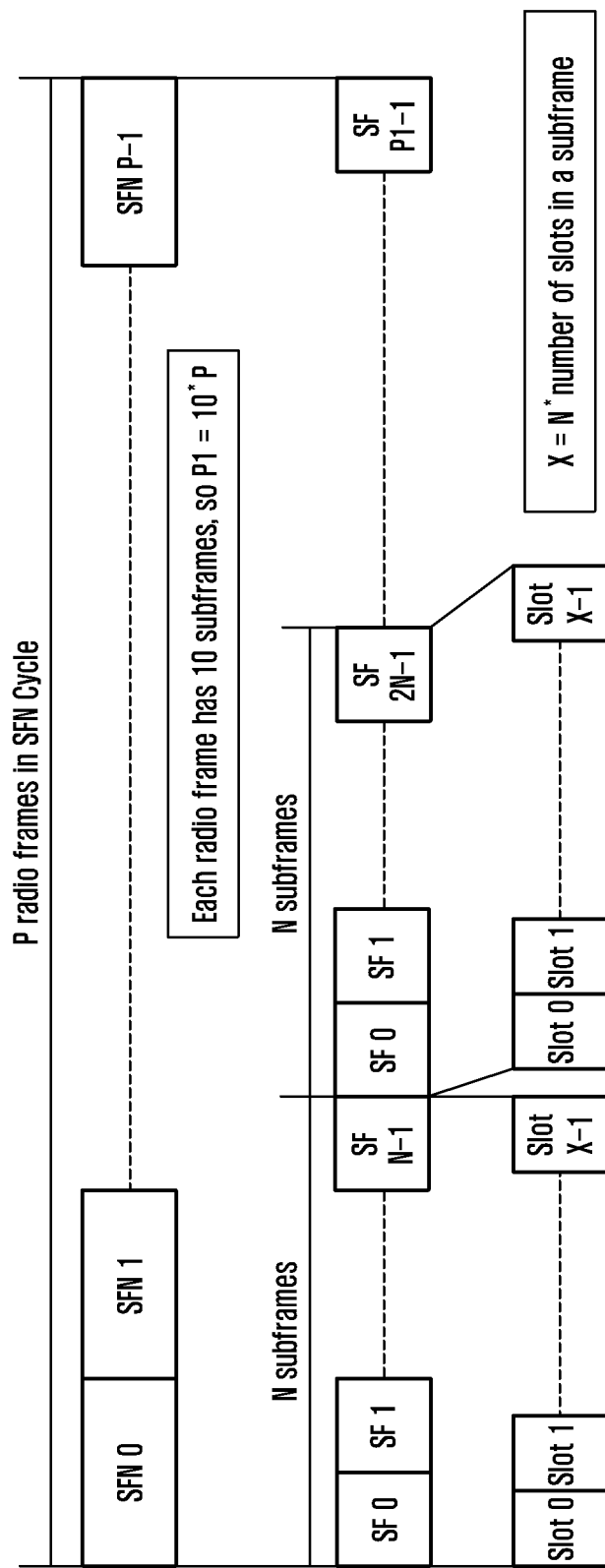
FIG. 20 illustrates another embodiment of indexing slots for computing a RA-RNTI according to an embodiment of the disclosure.

Referring to FIG. 20, if maximum size of RAR window is greater than one radio frame called N sub frames, then slots in N consecutive sub frames starting from 1st subframe in radio frame with SFN 0, are indexed sequentially from zero. Slots in subframe 0 to subframe N−1 are indexed sequentially start from zero. Slots in subframe N to subframe 2N−1 are indexed sequentially starting from zero and so on. In this case X can be equal to 8*N as maximum number of slots in a subframe is 8. The slots are indexed sequentially for N subframes frames starting from first slot of every subframe 'i' in radio frame 'j' which satisfies equation (j*10+i) mod N=0, where 'j' is the SFN of radio frame and 'i' is the subframe index (with radio frame subframes are indexed from 0 to 9 sequentially) of subframe within a radio frame.

Figure 21:
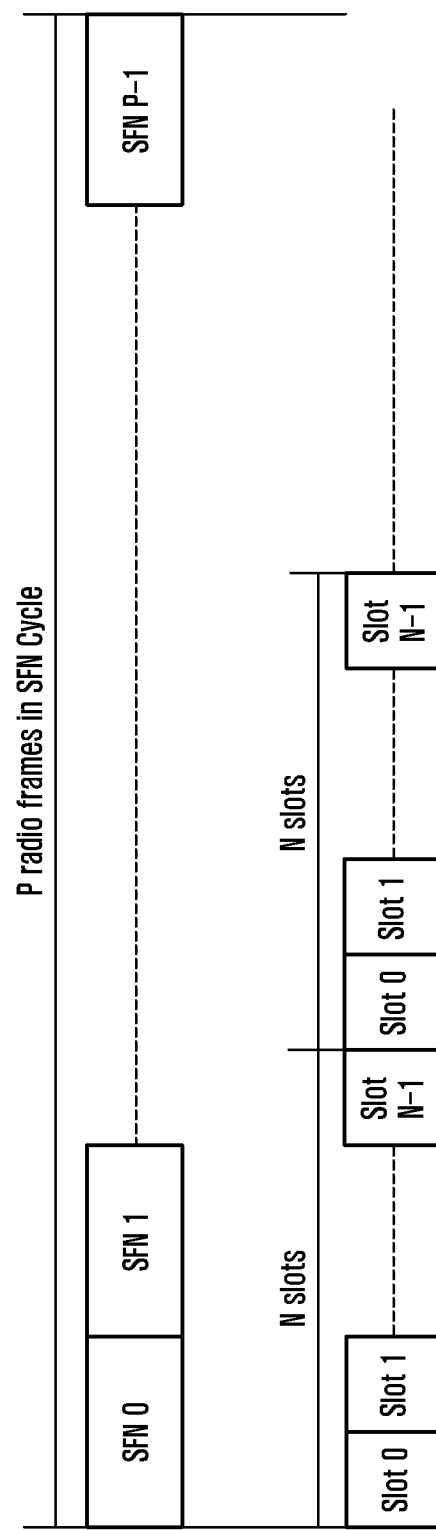
FIG. 21 illustrates another embodiment of indexing slots for computing a RA-RNTI according to an embodiment of the disclosure.

FIG. 21 illustrates another embodiment of indexing slots for computing a RA-RNTI according to an embodiment of the disclosure.

Referring to FIG. 21, if maximum size of RAR window is N slots, then starting from 1st slot of SFN 0, every N consecutive slots are indexed sequentially from zero to N−1. In this case X can be equal to N.

In this example, $f\_id$ is an index of the PRACH transmission occasion, in ascending order of frequency domain; $0 \leq f\_id < Y$; Y depends on number of PRACH transmission occasions supported in frequency domain. In an embodiment, if multiple resource pools (e.g. separate resource pool for beam failure recovery, handover, etc.) for RACH are configured, frequency division multiplexed PRACH transmission occasions in each resource pool can be independently numbered starting from zero. For example, if there are two resource pools, resource pool 1 having two frequency division multiplexed PRACH transmission occasions and resource pool 2 having four frequency division multiplexed PRACH transmission occasions, the frequency division multiplexed PRACH transmission occasions are numbered 0 and 1 in resource pool 1 and the frequency division multiplexed PRACH transmission occasions are numbered 0, 1, 2, and 3 in resource pool 2.

In another embodiment, if multiple resource pools for RACH are configured, frequency division multiplexed PRACH transmission occasions are numbered starting from zero across resource pools. For example, if there are two resource pools. In resource pool 1 there are two frequency division multiplexed PRACH transmission occasions. In resource pool 2 there are four frequency division multiplexed PRACH transmission occasions. The frequency division multiplexed PRACH transmission occasions are numbered 0 and 1 in resource pool 1. The frequency division multiplexed PRACH transmission occasions are numbered 2, 3, 4, and 5. In another embodiment, if multiple resource pools for RACH are configured, network may configure the starting f_id to be used for each resource pool. A frequency division multiplexed (FDMed) PRACH transmission occasions in a resource pool are sequentially numbered starting from f_id indicated by network for that resource pool.

In an embodiment of the proposed disclosure, the RA-RNTI associated with the PRACH in which the Random Access Preamble is transmitted, is computed as:

$$\text{RA-RNTI} = 1 + t\_id + X * f\_id + X * Y * (\text{SFN\_id mod} \\ (W\text{max/Number of slots in a radio frame}))$$

In this example, SFN_id is the index of the first radio frame of the PRACH transmission occasion, and Wmax is maximum RAR window size in slots. t_id and f_id are as defined earlier.

There can be several ways in which RA-RNTI can be computed using t_id and f_id. The various ways of computing RA-RNTI based on t_id and f_id is as follows:

$$\text{RA-RNTI} = 1 + \text{Parameter 1} + C1 * \text{Parameter 2} \quad \text{(Eq. 2)}$$

In equation 2, Parameter 1 is one of t_id or f_id, Parameter 2 is one of [{t_id, f_id}−{Selected Parameter 1}], and C1 is a number of distinct values of selected parameter 1.

If the selected parameter 1 is t_id, then the selected parameter 2 is f_id and C1 equals X as 0≤t_id<X. The RA-RNTI based on Eq. 2 is equal to 1+t_id+C1*f_id. If the selected parameter 1 is f_id, then the selected parameter 2 is t_id and C1 equals Y as 0≤f_id<Y. The RA-RNTI based on Eq. 2 is equal to 1+f_id+C1*t_id. One of the ways of computing RA-RNTI based on the above mechanism can be pre-defined in the system.

In another embodiment, random access preamble can be transmitted on frequency F1 and RAR can be received on frequency F2. In this case information about the carrier on which random access preamble is transmitted can also be included in RA-RNTI computation. For example, serving cell can configure a supplementary uplink (SUL) frequency called Fy. The uplink frequency of serving cell is called Fx. Serving cell configures PRACH resources on frequency Fy and Fx. Based on certain criteria UE selects PRACH resource on either frequency Fy or frequency Fx for random access preamble transmission. If UE transmits random access preamble on frequency Fy, it receives RAR in DL of serving cell. If the UE transmits random access preamble on frequency Fx, it receives RAR in DL of serving cell. The RA-RNTI can be computed as follows:

$$\text{RA-RNTI} = 1 + t\_id + X * f\_id + X * Y * c\_id \quad \text{(Eq. 3)}$$

In Equation 3, t_id, f_id, X, and Y are same as explained earlier, and c_id is set to '1' if UE transmits random access preamble on SUL or else c_id is set to '0.'

In an embodiment, the value of c_id to be used specific to a carrier frequency (or specific to serving cell) on which random access preamble is transmitted can be signaled by network. This can be signaled in system information or in dedicated signaling. A list of mapping between c_id and carrier frequency can be signaled. The UE uses the c_id corresponding to carrier frequency on which it has transmitted random access preamble. In an embodiment value of c_id for PCell and PSCell is zero. The value of c_id for a SCell other than PSCell is signaled by network in SI or dedicated signaling. Alternately, the value of c_id for a SCell other than PSCell is equal to serving cell index.

There can be several ways in which RA-RNTI can be computed using t_id, f_id and c_id. Various ways of computing RA-RNTI based on t_id, f_id and c_id is as follows:

$$\text{RA-RNTI} = 1 + \text{Parameter 1} + C1 * \text{Parameter} \\ 2 + C1 * C2 * \text{Parameter 3} \quad \text{(Eq. 4)}$$

In equation 4, Parameter 1 is one of t_id or f_id or c_id, Parameter 2 is one of [{t_id, f_id, c_id}−{Selected Parameter 1}], Parameter 3 is one of [{t_id, f_id, c_id}−{Selected Parameter 1}−{Selected Parameter 2}], C1 is a number of distinct values of selected parameter 1, and C2 is a number of distinct values of selected parameter 2.

One of the ways of computing RA-RNTI based on the above mechanism can be pre-defined in the system.

Method 2

In an embodiment of the proposed disclosure, RA-RNTI associated with the PRACH in which the Random Access Preamble is transmitted, is computed as:

$$\text{RA-RNTI} = 1 + t\_id1 + X1 * t\_id2 + X1 * X2 * f\_id \quad \text{(Eq. 5)}$$

In equation 5, t_id 1 is an index of the first slot of the PRACH transmission occasion (0≤t_id<X1), and t_id 2 is an index of the subframe in which PRACH transmission occasion starts or subframe in which first slot of PRACH transmission occasion is located (0≤t_id 2<X2). The slots in a subframe are sequentially numbered starting from zero. Depending on the SCS for Msg1 (or PRACH preamble) transmission, the number of slots in a subframe can vary from 1 to 8. The Maximum number of slots in a sub frame is 8, so X1 can be equal to 8. In an embodiment, the subframes in a radio frame are sequentially numbered starting from zero. The Maximum number of subframe in a radio frame is 10, so X2 can be equal to 10 if maximum RAR window size is one radio frame i.e. 10 ms.

Figure 22:
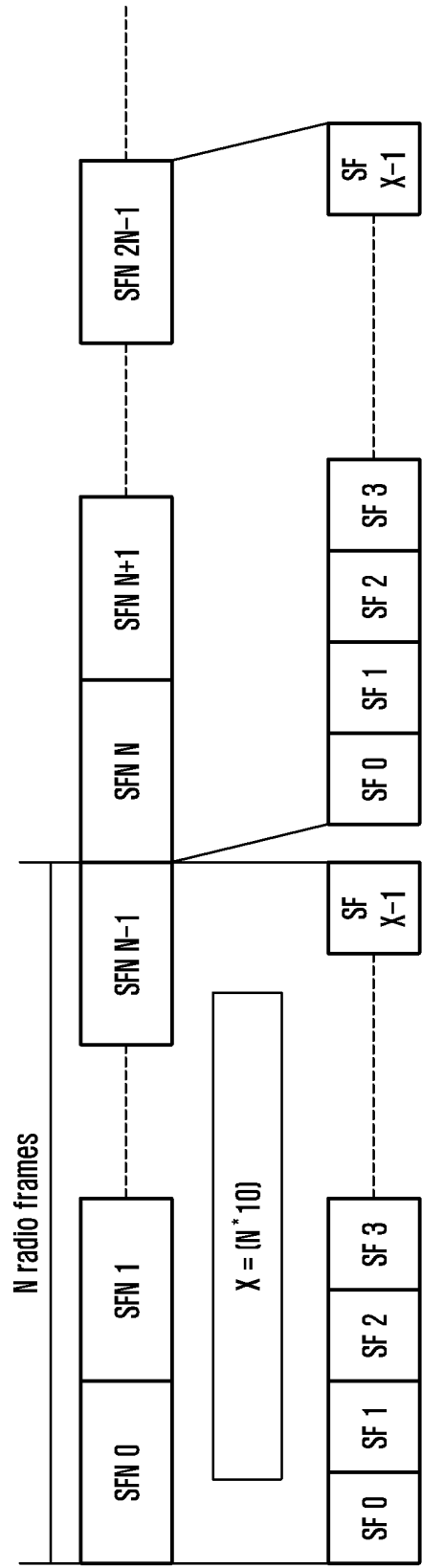
FIG. 22 illustrates another embodiment of indexing slots for computing a RA-RNTI according to various embodiments of the disclosure.

FIG. 22 illustrates an embodiment of indexing slots for computing RA-RNTI based on Method 2 according to an embodiment of the disclosure.

Referring to FIG. 22, if a maximum size of RAR window is greater than one radio frame called N radio frames, then subframes in N consecutive radio frames starting from radio frame with SFN 0 are indexed sequentially from zero. Subframes in SFN 0 to SFN N−1 are indexed sequentially start from zero. Subframes in SFN N to SFN 2N−1 are indexed sequentially start from zero and so on. In this case X2 can be equal to 10*N. The subframes are indexed sequentially for N radio frames starting from first subframe of every radio frame with SFN which satisfies equation SFN mod N=0.

Figure 23:
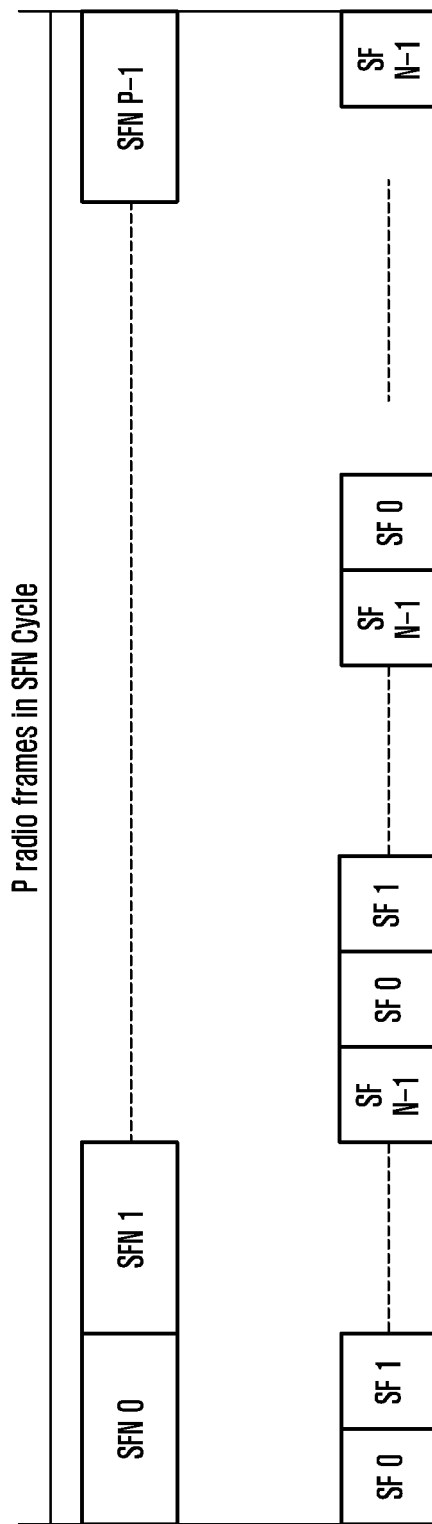
FIG. 23 illustrates another embodiment of indexing slots for computing RA-RNTI according to an embodiment of the disclosure.

FIG. 23 illustrates the other embodiment of indexing slots for computing RA-RNTI based on Method 2 according to an embodiment of the disclosure.

Referring to FIG. 23, In an embodiment, if maximum size of RAR window is greater than one radio frame called N sub frames, then every N consecutive subframes in SFN cycle, starting from the first subframe of radio frame with SFN 0, are indexed sequentially starting from zero. In this case X2 can be equal to N.

In this example, f_id is an index of the PRACH transmission occasion, in ascending order of frequency domain (0≤f_id<Y) and Y depends on number of RACH transmission occasions supported in frequency domain in NR.

In an embodiment of the proposed disclosure, in which RAR window size is greater than one radio frame, the RA-RNTI associated with the PRACH in which the Random Access Preamble is transmitted, can be computed as $$\text{RA-RNTI} = 1 + t\_id1 + X1 * t\_id2 + X1 * X2 * f\_id + \\ X1 * X2 * Y * (\text{SFN\_id mod} (W\text{max/Number of} \\ \text{slots in a radio frame}))$$

In this example, SFN_id is the index of the first radio frame of the PRACH transmission occasion, and Wmax is maximum RAR window size in slots. The values of t_id1, t_id2 and f_id are as described above.

There are various ways in RA-RNTI can be computed based on t_id1, t_id2 and f_id. These ways of computing RA-RNTI is based on t_id1, t_id2 and f_id is as follows:

$$\text{RA-RNTI}=1+\text{Parameter 1}+C1*\text{Parameter 2}+C1*C2*\text{Parameter 3} \quad \text{(Eq. 6)}$$

In equation 6, Parameter 1 is one of t_id1, t_id2, or f_id, Parameter 2 is one of [{t_id1, t_id2, f_id}-{Selected Parameter 1}], Parameter 3 is one of [{t_id1, t_id2, f_id}-{Selected Parameter 1}-{Selected Parameter 2}], C1 is a number of distinct values of selected parameter 1, and C2 is a number of distinct values of selected parameter 2.

In another embodiment, random access preamble can be transmitted on frequency F1 and RAR can be received on frequency F2. In this case information about the carrier on which random access preamble is transmitted can also be included in RA-RNTI computation. For example, serving cell can configure a supplementary uplink (SUL) frequency called Fy. The uplink frequency of serving cell is called Fx. Serving cell configures PRACH resources on frequency Fy and Fx. Based on certain criteria UE selects PRACH resource on either frequency Fy or frequency Fx for random access preamble transmission. If UE transmits random access preamble on frequency Fy, it receives RAR in DL of serving cell. If the UE transmits random access preamble on frequency Fx, it receives RAR in DL of serving cell. The RA-RNTI can be computed as follows:

$$\text{RA-RNTI}=1+t\_id1+X1*t\_id2+X1*X2*f\_id+X1*X2*Y*c\_id \quad \text{(Eq. 7)}$$

In equation 7, t_id1, t_id2, f_id, X1, X2 and Y are same as explained earlier, and c_id is set to '1' if UE transmits random access preamble on SUL or else c_id is set to '0.'

In an embodiment, the value of c_id to be used specific to a carrier frequency (or specific to serving cell) on which random access preamble is transmitted can be signaled by network. This can be signaled in system information or in dedicated signaling. A list of mapping between c_id and carrier frequency can be signaled. The UE uses the c_id corresponding to carrier frequency on which it has transmitted random access preamble. In an embodiment, value of c_id for PCell and PSCell is zero. The value of c_id for a SCell other than PSCell is signaled by network in SI or dedicated signaling. Alternatively, the value of c_id for a SCell other than PSCell is equal to serving cell index.

In an embodiment of the proposed disclosure, RA-RNTI associated with the PRACH in which the Random Access Preamble is transmitted, is computed as:

$$\text{RA-RNTI}=1+t\_id1+X1*t\_id2+X1*X2*f\_id+X1*X2*Y*c\_id+X1*X2*Y*Z*(\text{SFN\_id mod} (W\text{max/Number of slots in a radio frame}))$$

In this example, SFN_id is the index of the first radio frame of the PRACH transmission occasion, and Wmax is maximum RAR window size in slots. The values of t_id1, t_id2, f_id, c_id are as defined earlier and 0<=c_id<Z.

Note that other combinations, with respect to position of t_id1, t_id2, f_id and c_id in RA-RNTI equation are also possible. There are various ways in RA-RNTI can be computed based on t_id1, t_id2, f_id and c_id. Various ways of computing RA-RNTI based on t_id1, t_id2, f_id and c_id is as follows:

$$\text{RA-RNTI}=1+\text{Parameter 1}+C1*\text{Parameter 2}+C1*C2*\text{Parameter 3}+C1*C2*C3*\text{Parameter 4} \quad \text{(Eq. 8)}$$

In equation 8, Parameter 1 is one of t_id1, t_id2, f_id, or c_id, Parameter 2 is one of [{t_id1, t_id2, f_id, c_id}-{Selected Parameter 1}], Parameter 3 is one of [{t_id1, t_id2, f_id, c_id}-{Selected Parameter 1}-{Selected Parameter 2}], Parameter 3 is one of [{t_id1, t_id2, f_id, c_id}-{Selected Parameter 1}-{Selected Parameter 2}-{Selected Parameter 3}], C1 is a number of distinct values of selected parameter 1, C2 is a number of distinct values of selected parameter 2, and C3 is a number of distinct values of selected parameter 3.

Scenario 2: In time domain, multiple PRACH transmission occasions are supported in one slot Method 1

In this scenario, each orthogonal frequency division multiplexing (OFDM) symbol can be a PRACH transmission occasion in a slot. The RA-RNTI associated with the PRACH in which the Random Access Preamble is transmitted, is computed as:

$$\text{RA-RNTI}=1+t\_id1+X1*t\_id2+X1*X2*f\_id \quad \text{(Eq. 9)}$$

In equation 9, t_id1 is an index of the first OFDM symbol of the PRACH transmission occasion (0≤t_id1<X1) and X1 can be 14, since each slot has 14 OFDM symbols and PRACH transmission occasion can start in any symbol, and t_id2 is an index of the first slot of the PRACH transmission occasion (0≤t_id2<X2). The OFDM symbols in a slot are indexed sequentially starting from zero. If PRACH transmission occasion can start only in some symbols in a slot, X1 can be smaller than 14. For example, if PRACH transmission occasion can only start in symbols 0, 4, 8 and 12, X1 can be 4. Each of these symbols (e.g. 0, 4, 8, 12) where PRACH transmission occasion can start can be logically indexed sequentially i.e., t_id1 for RACH transmission occasion starting in symbol 0 is 0, t_id1 for RACH transmission occasion starting in symbol 4 is 1, t_id1 for RACH transmission occasion starting in symbol 8 is 2 and t_id1 for RACH transmission occasion starting in symbol 12 is 3.

In an embodiment, slots in radio frame are indexed sequentially starting from zero. The maximum number of slots in a radio frame is 80, so X2 can be equal to 80 if maximum size of RAR window is one radio frame.

Alternatively, if PRACH transmission occasion can start only in some slots in a radio frame, X2 can be smaller than 80. For example, if PRACH transmission occasion can only start in slot 0, 4, 8, and 12, X2 can be 4. Each of these slots (e.g. 0, 4, 8, 12) where PRACH transmission occasion can start can be logically indexed sequentially (i.e. T_id2 for RACH transmission occasion starting in slot 0 is 0, T_id2 for RACH transmission occasion starting in slot 4 is 1, T_id2 for RACH transmission occasion starting in slot 8 is 2 and T_id2 for RACH transmission occasion starting in slot 12 is 3).

In an embodiment, X2 can be set to a value depending on numerology or SCS. For example for SCS of 15 KHz it can be set to 10 as there are 10 slots in a radio frame in this case. For SCS of 30 KHz it can be set to 20 as there 20 slots in a radio frame in this case. For SCS of 60 KHz it can be set to 40 as there are 40 slots in a radio frame in this case. For SCS of 120 KHz it can be set to 80 as there are 80 slots in a radio frame in this case.

In an embodiment, if maximum size of RAR window is greater than one radio frame called N radio frames, then slots in every N consecutive radio frames starting from radio frame with SFN 0, are indexed sequentially from zero. Slots in SFN 0 to SFN N−1 are indexed sequentially start from zero. Slots in SFN N to SFN 2N−1 are indexed sequentially start from zero and so on as shown in FIG. 19 below. In this case X2 can be equal to 80*N, as maximum number of slots in radio frame is 80 and maximum number of slots in N radio frames is N*80. The slots are indexed sequentially for N consecutive radio frames starting from first slot of every radio frame with SFN which satisfies equation SFN mod N=0.

In another embodiment, if maximum size of RAR window is greater than one radio frame called N sub frames, then slots in N consecutive sub frames starting from 1st subframe in radio frame with SFN 0, are indexed sequentially from zero. Slots in subframe 0 to subframe N−1 are indexed sequentially start from zero. Slots in subframe N to subframe 2N−1 are indexed sequentially starting from zero and so on as shown in FIG. 20 below. In this case X2 can be equal to 8*N as maximum number of slots in a subframe is 8. The slots are indexed sequentially for N subframes frames starting from first slot of every subframe 'i' in radio frame 'j' which satisfies equation (j*10+i) mod N=0, where 'j' is the SFN of radio frame and 'i' is the subframe index (with radio frame subframes are indexed from 0 to 9 sequentially) of subframe within a radio frame.

In another embodiment, if maximum size of RAR window is called N slots, then starting from 1st slot of SFN 0, every N consecutive slots are indexed sequentially from zero to N−1 as shown in FIG. 21. In this case X2 can be equal to N.

The value of f_id is an index of the PRACH transmission occasion, in ascending order of frequency domain; 0≤f_id<Y; Y depends on number of RACH transmission occasions supported in frequency domain in NR.

In an embodiment of the proposed disclosure, in which RAR window size is greater than one radio frame, RA-RNTI associated with the PRACH in which the Random Access Preamble is transmitted, can be computed as:

$$\text{RA-RNTI}=1+t\_id1+X1*t\_id2+X1*X2*f\_id+ \\ X1*X2*Y*(\text{SFN\_id mod }(W\text{max/Number of slots in a radio frame}))$$

In this example, SFN_id is the index of the first radio frame of the PRACH transmission occasion, and Wmax is maximum RAR window size in slots. t_id1, t_id2 and f_id are as defined earlier.

Note that other combinations, with respect to position of t_id1, t_id2 and f_id in RA-RNTI equation are also possible. There are various ways in RA-RNTI can be computed based on t_id1, t_id2 and f_id. Various ways of computing RA-RNTI based on t_id1, t_id2, f_id is as follows:

$$\text{RA-RNTI}=1+\text{Parameter }1+C1*\text{Parameter} \\ 2+C1*C2*\text{Parameter }3 \quad\quad (\text{Eq. 10})$$

In equation 10, Parameter 1 is one of t_id1, t_id2, or f_id, Parameter 2 is one of [{t_id1, t_id2, f_id}−{Selected Parameter 1}], Parameter 3 is one of [{t_id1, t_id2, f_id}−{Selected Parameter 1}−{Selected Parameter 2}], C1 is a number of distinct values of selected parameter 1, and C2 is a number of distinct values of selected parameter 2.

In another embodiment, random access preamble can be transmitted on frequency F1 and RAR can be received on frequency F2. In this case information about the carrier on which random access preamble is transmitted can also be included in RA-RNTI computation. For example, serving cell can configure a supplementary uplink (SUL) frequency called Fy. The uplink frequency of serving cell is called Fx. Serving cell configures PRACH resources on frequency Fy and Fx. Based on certain criteria UE selects PRACH resource on either frequency Fy or frequency Fx for random access preamble transmission. If UE transmits random access preamble on frequency Fy, it receives RAR in DL of serving cell. If the UE transmits random access preamble on frequency Fx, it receives RAR in DL of serving cell. The RA-RNTI can be computed as follows:

$$\text{RA-RNTI}=1+t\_id1+X1*t\_id2+X1*X2*f\_id+ \\ X1*X2*Y*c\_id \quad\quad (\text{Eq. 11})$$

In equation 11, t_id1, t_id2, f_id, X1, X2 and Y are same as explained earlier. The value of c_id is set to '1' if UE transmits random access preamble on SUL or else c_id is set to '0.' In an embodiment, the value of c_id to be used specific to a carrier frequency (or specific to serving cell) on which random access preamble is transmitted can be signaled by network. This can be signaled in system information or in dedicated signaling. A list of mapping between c_id and carrier frequency can be signaled. The UE uses the c_id corresponding to carrier frequency on which it has transmitted random access preamble. In an embodiment value of c_id for PCell and PSCell is zero. The value of c_id for a SCell other than PSCell is signaled by network in SI or dedicated signaling. Alternatively, the value of c_id for a SCell other than PSCell is equal to serving cell index.

In an embodiment of the proposed disclosure, in which RAR window size is greater than one radio frame, RA-RNTI associated with the PRACH in which the Random Access Preamble is transmitted, can be computed as:

$$\text{RA-RNTI}=\text{RA-RNTI}=1+t\_id1+X1*t\_id2+ \\ X1*X2*f\_id+X1*X2*Y*c\_id+X1*X2*Y*Z* \\ (\text{SFN\_id mod}(W\text{max/Number of slots in a radio frame}))$$

In this example, SFN_id is the index of the first radio frame of the PRACH transmission occasion, and Wmax is maximum RAR window size in slots. t_id1, t_id2 c_id and f_id are as defined earlier and 0<=c_id<Z.

Note that other combinations, with respect to position of t_id1, t_id2, f_id, c_id in RA-RNTI equation are also possible. There are various ways in RA-RNTI can be computed based on t_id1, t_id2, f_id and c_id. Various ways of computing RA-RNTI based on t_id1, t_id2, f_id and c_id is as follows:

$$\text{RA-RNTI}=1+\text{Parameter }1+C1*\text{Parameter} \\ 2+C1*C2*\text{Parameter }3+C1*C2*C3*\text{Parameter }4 \quad\quad (\text{Eq. 12})$$

In equation 12, Parameter 1 is one of t_id1, t_id2, f_id, or c_id, Parameter 2 is one of [{t_id1, t_id2, f_id, c_id}−{Selected Parameter 1}], Parameter 3 is one of [{t_id1, t_id2, f_id, c_id}−{Selected Parameter 1}−{Selected Parameter 2}], Parameter 4 is one of [{t_id1, t_id2, f_id, c_id}−{Selected Parameter 1}−{Selected Parameter 2}−{Selected Parameter 3}], C1 is a number of distinct values of selected parameter 1, C2 is a number of distinct values of selected parameter 2, and C3 is a number of distinct values of selected parameter 3.

Method 2

In this scenario, each OFDM symbol can be a PRACH transmission occasion in a slot. The RA-RNTI associated with the PRACH in which the Random Access Preamble is transmitted, is computed as:

$$\text{RA-RNTI}=1+t\_id1+X1*t\_id2+X1*X2*t\_id3+ \\ X1*X2*X3*f\_id \quad\quad (\text{Eq. 13})$$

In equation 13, t_id1 is an index of the first OFDM symbol of the PRACH transmission occasion (0≤t_id1<X1) and t_id2 is an index of the first slot of the PRACH transmission occasion, i.e., a slot in which RACH transmission occasion starts (0≤t_id2<X2) The value of X1 can be 14, since each slot has 14 OFDM symbols and PRACH transmission occasion can start in any symbol. OFDM symbols in a slot are indexed sequentially starting from zero. If PRACH transmission occasion can start only in some symbols in a slot, X1 can be smaller than 14. For example, if PRACH transmission occasion can only start in symbols 0, 4, 8 and 12, X1 can be 4. Each of these symbols (e.g. 0, 4, 8, 12) where PRACH transmission occasion can start can be logically indexed sequentially i.e. T_id1 for RACH transmission occasion starting in symbol 0 is 0, T_id1 for RACH transmission occasion starting in symbol 4 is 1, T_id1 for RACH transmission occasion starting in symbol 8 is 2 and T_id1 for RACH transmission occasion starting in symbol 12 is 3.

The maximum number of slots in a subframe is 8, so X2 can be equal to 8; slots in subframe are indexed sequentially starting from zero.

Alternately, if PRACH transmission occasion can start only in some slots in a sub frame, X2 can be smaller than 8. For example, if PRACH transmission occasion can only start in slot 0 and 4, X2 can be 4. Each of these slots (e.g. 0, 4) where PRACH transmission occasion can start can be logically indexed sequentially (i.e. T_id2 for RACH transmission occasion starting in slot 0 is 0, T_id2 for RACH transmission occasion starting in slot 4 is 1).

In an embodiment, X2 can be set to a value depending on numerology or SCS. For example for SCS of 15 KHz it can be set to 1 as there is 1 slots in a sub frame in this case. For SCS of 30 KHz it can be set to 2 as there 2 slots in a sub frame in this case. For SCS of 60 KHz it can be set to 4 as there are 4 slots in a sub frame in this case. For SCS of 120 KHz it can be set to 8 as there are 8 slots in a sub frame in this case.

t_id 3 is an index of the subframe in which PRACH transmission occasion starts or subframe in which first slot of PRACH transmission occasion is located; $0 \leq t\_id\ 3 < X3$; In an embodiment, the subframes in a radio frame are sequentially numbered starting from zero. Maximum number of subframe in a radio frame is 10, so X3 can be equal to 10 if the maximum RAR window size is one radio frame;

In another embodiment, if maximum size of RAR window is greater than one radio frame called N radio frames, then subframes in N consecutive radio frames starting from radio frame with SFN 0 are indexed sequentially from zero. Subframes in SFN 0 to SFN N−1 are indexed sequentially start from zero. Subframes in SFN N to SFN 2N−1 are indexed sequentially start from zero and so on as shown in FIG. 21 below. In this case X3 can be equal to 10*N. The subframes are indexed sequentially for N radio frames starting from first subframe of every radio frame with SFN which satisfies equation SFN mod N=0.

In an embodiment, if maximum size of RAR window is greater than one radio frame called N sub frames, then every N consecutive subframes in SFN cycle, starting from the first subframe of radio frame with SFN 0, are indexed sequentially starting from zero as shown in FIG. 23. In this case X3 can be equal to N.

The value of f_id is an index of the PRACH transmission occasion, in ascending order of frequency domain; $0 \leq f\_id < Y$; Y depends on number of RACH transmission occasions supported in frequency domain. In an embodiment, if multiple resource pools (e.g. separate resource pool for beam failure recovery, handover, etc.) for RACH are configured, frequency division multiplexed PRACH transmission occasions in each resource pool can be independently numbered starting from zero. For example, if there are two resource pools, resource pool 1 having two frequency division multiplexed PRACH transmission occasions and resource pool 2 having four frequency division multiplexed PRACH transmission occasions, the frequency division multiplexed PRACH transmission occasions are numbered 0 and 1 in resource pool 1 and the frequency division multiplexed PRACH transmission occasions are numbered 0, 1, 2, and 3 in resource pool 2.

In another embodiment, if multiple resource pools for RACH are configured, frequency division multiplexed PRACH transmission occasions are numbered starting from zero across resource pools. For example, let us say there are two resource pools. In resource pool 1 there are two frequency division multiplexed PRACH transmission occasions. In resource pool 2 there are four frequency division multiplexed PRACH transmission occasions. The frequency division multiplexed PRACH transmission occasions are numbered 0 and 1 in resource pool 1. The frequency division multiplexed PRACH transmission occasions are numbered 2, 3, 4, and 5. In another embodiment, if multiple resource pools for RACH are configured, network may configure the starting f_id to be used for each resource pool. The FDM PRACH transmission occasions in a resource pool are sequentially numbered starting from f_id indicated by network for that resource pool.

In an embodiment of the proposed disclosure, in which RAR window size is greater than one radio frame, RA-RNTI associated with the PRACH in which the Random Access Preamble is transmitted, can be computed as:

$$\text{RA-RNTI}=1+t\_id1+X1*t\_id2+X1*X2*t\_id3+ \\ X1*X2*X3*f\_id+X1*X2*X3*Y*(\text{SFN\_id mod} \\ (W\text{max/Number of slots in a radio frame}))$$

In this example, SFN_id is the index of the first radio frame of the PRACH transmission occasion, and Wmax is maximum RAR window size in slots. t_id1, t_id2, t_id3 and f_id are as defined earlier.

Note that other combinations, with respect to position of t_id1, t_id2, t_id3 and f_id in RA-RNTI equation are also possible. There are various ways in RA-RNTI can be computed based on t_id1, t_id2, t_id3 and f_id. Various ways of computing RA-RNTI based on t_id1, t_id2, t_id3 and f_id is as follows:

$$\text{RA-RNTI}=1+\text{Parameter 1}+C1*\text{Parameter} \\ 2+C1*C2*\text{Parameter 3}+C1*C2*C3*\text{Parameter 4} \quad \text{(Eq. 14)}$$

In equation 14, Parameter 1 is one of id1, t_id2, t_id3, or f_id, Parameter 2 is one of [{t_id1, t_id2, t_id3, f_id}−{Selected Parameter 1}], Parameter 3 is one of [{t_id1, t_id2, t_id3, f_id}−{Selected Parameter 1}−{Selected Parameter 2}], Parameter 4 is one of [{t_id1, t_id2, t_id3, f_id}−{Selected Parameter 1}−{Selected Parameter 2}−{Selected Parameter 3}], C1: is a number of distinct values of selected parameter 1, C2 is a number of distinct values of selected parameter 2, and C3 is a number of distinct values of selected parameter 3.

In another embodiment, random access preamble can be transmitted on frequency F1 and RAR can be received on frequency F2. In this case information about the carrier on which random access preamble is transmitted can also be included in RA-RNTI computation. For example, serving cell can configure a supplementary uplink (SUL) frequency called Fy. The uplink frequency of serving cell is called Fx. Serving cell configures PRACH resources on frequency Fy and Fx. Based on certain criteria UE selects PRACH resource on either frequency Fy or frequency Fx for random access preamble transmission. If UE transmits random access preamble on frequency Fy, it receives RAR in DL of serving cell. If the UE transmits random access preamble on frequency Fx, it receives RAR in DL of serving cell. The RA-RNTI can be computed as follows:

$$\text{RA-RNTI}=1+t\_id1+X1*t\_id2+X1*X2*t\_id3+ \\ X1*X2*X3*f\_id+X1*X2*X3*Y*c\_id \quad \text{(Eq. 15)}$$

In equation 15, t_id1, t_id2, f_id, X1, X2, X3 and Y are same as explained earlier, and c_id is set to '1' if UE transmits random access preamble on SUL or else c_id is set to '0.'

In an embodiment, the value of c_id to be used specific to a carrier frequency (or specific to serving cell) on which random access preamble is transmitted can be signaled by network. This can be signaled in system information or in dedicated signaling. A list of mapping between c_id and carrier frequency can be signaled. The UE uses the c_id corresponding to carrier frequency on which it has transmitted random access preamble. In an embodiment, value of c_id for PCell and PSCell is zero. The value of c_id for a SCell other than PSCell is signaled by network in SI or dedicated signaling. Alternatively, the value of c_id for a SCell other than PSCell is equal to serving cell index.

Note that other combinations, with respect to position of t_id1, t_id2, t_id3, f_id, c_id in RA-RNTI equation are also possible. There are various ways in RA-RNTI can be computed based on t_id1, t_id2, t_id3, f_id and c_id. Various ways of computing RA-RNTI based on t_id1, t_id2, t_id3, f_id and c_id is as follows:

$$RA\text{-}RNTI = 1 + \text{Parameter 1} + C1*\text{Parameter 2} + C1*C2*\text{Parameter 3} + C1*C2*C3*\text{Parameter 4} + C1*C2*C3*C4*\text{Parameter 5} \quad \text{(Eq. 16)}$$

In equation 16, Parameter 1 is one of t_id1, t_id2, t_id3, f_id, or c_id, Parameter 2 is one of [{t_id1, t_id2, t_id3, f_id, c_id}–{Selected Parameter 1}], Parameter 3 is one of [{t_id1, t_id2, t_id3, f_id, c_id}–{Selected Parameter 1}–{Selected Parameter 2}], Parameter 4 is one of [{t_id1, t_id2, t_id3, f_id, c_id}–{Selected Parameter 1}–{Selected Parameter 2}–{Selected Parameter 3}], Parameter 5 is one of [{t_id1, t_id2, t_id3, f_id, c_id}–{Selected Parameter 1}–{Selected Parameter 2}–{Selected Parameter 3}–{Selected Parameter 4}], C1 is a number of distinct values of selected parameter 1, C2 is a n umber of distinct values of selected parameter 2, C3 is a n umber of distinct values of selected parameter 3, and C4 is a number of distinct values of selected parameter 4.

SUL Indication Method

In an embodiment, instead of updating the RA-RNTI calculation to include the SUL indication, SUL indication can be indicated in RAR. The indication can be in MAC subheader with RAPID or can be included in MAC RAR. SUL indication is set to one by gNB for PRACH preamble received on SUL frequency or carrier. Otherwise, it is set to zero. RAR is considered as successful in following manner If a downlink assignment has been received on the NR-PDCCH for the RA-RNTI and the received TB is successfully decoded:
  If the UE has transmitted RACH on SUL:
    if the Random Access Response contains a Random Access Preamble identifier corresponding to the transmitted Random Access Preamble and SUL indication in Random Access Response is set to ' 1,' RAR is considered as successfully received.
  else (If the UE has not transmitted RACH on SUL):
    if the Random Access Response contains a Random Access Preamble identifier corresponding to the transmitted Random Access Preamble and SUL indication in Random Access Response is set to '0,' RAR is considered as successfully received.

In an embodiment, instead of updating the RA-RNTI calculation to include the SUL indication, SUL indication can be indicated in DCI transmitted on NR-PDCCH for RAR. SUL indication is set to one in DCI transmitted on NR-PDCCH gNB if RAR is corresponding to PRACH preamble transmitted on SUL. Otherwise it is set to zero. RAR is considered as successful in following manner If the UE has transmitted RACH on SUL:
  If a downlink assignment including SUL indication set to one has been received on the NR-PDCCH for the RA-RNTI and the received TB is successfully decoded:
    And if the Random Access Response contains a Random Access Preamble identifier corresponding to the transmitted Random Access Preamble, RAR is considered as successfully received
  else if the UE has not transmitted RACH on SUL:
    If a downlink assignment including SUL indication set to zero has been received on the NR-PDCCH for the RA-RNTI and the received TB is successfully decoded:
    And if the Random Access Response contains a Random Access Preamble identifier corresponding to the transmitted Random Access Preamble, RAR is considered as successfully received Preamble ID Extension Mechanism There are 64 unique random access preamble sequences wherein each random access preamble sequence is uniquely identified by 6 bit random access preamble index or random access preamble identifier. In next generation wireless communication system, random access preambles are used for various purposes such as, to identify the Msg3 sizes, to identify the on demand SI requests, to identify the DL TX beams and so on. So 64 random access preamble sequences are not enough. In case the number of random access preamble sequences is increased, more bits are needed to uniquely identify each random access preamble sequence. For example, if random access preamble sequences are increased to 256 then 8 bits are needed to uniquely identify each random access preamble sequence. If random access preamble sequences are increased to 1024 then 10 bits are needed to uniquely identify each random access preamble sequence.

The RAPID field in a RAR identifies the transmitted random access preamble. The RAPID field is 6 bits and is included in MAC subheader. In case the number of random access preambles is increased, 6 bits cannot uniquely identify the transmitted random access preamble. One straightforward method to overcome this problem is to increase the RAPID field size. However this would lead to increase in the header overhead as MAC subheader size will be doubled from 1 byte to 2 bytes.

For RAR, gNB first transmits scheduling assignment (DCI) on NR-PDCCH. NR-PDCCH is addressed to RA-RNTI. The Transport block including the RAR is then transmitted over NR-PDSCH. The scheduling assignment on NR-PDCCH indicates scheduling information about the TB transmitted over NR-PDSCH.

Figure 24:
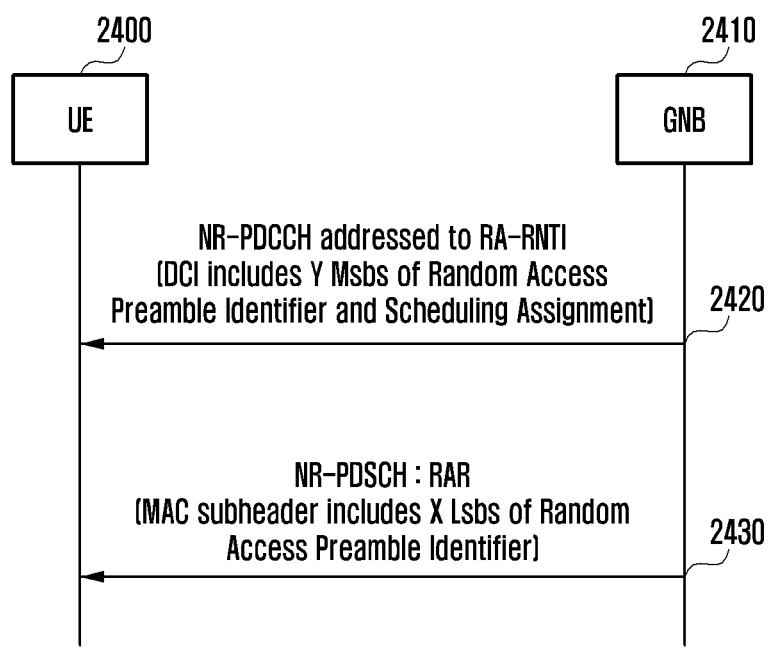
FIG. 24 illustrates transmitting a random access preamble identifier to a UE according to an embodiment of the disclosure.

FIG. 24 illustrates transmitting a random access preamble identifier to a UE according to an embodiment of the disclosure.

Referring to FIG. 24, it is proposed that 'X' Least significant bits (Lsbs) of random access preamble identifier or index is included in MAC subheader. For example, X equals 6 bits, if the length of RAPID field in MAC subheader is 6 bits. The remaining or Y Most significant bits (Msbs) of random access preamble identifier or index is included in scheduling assignment (DCI) which is transmitted on NR-PDCCH for RAR. As shown in FIG. 24, a UE 2400 receives NR-PDCCH addressed to RA-RNTI from gNB 2410 in operation 2420. After operation 2420, the UE 2400 receives NR-PDSCH including RAR from the gNB 2410 in operation 2430. On receiving the RAR, UE will obtain the 'X' Lsbs of random access preamble identifier or index from MAC subheader. The remaining or Y Msbs of random access preamble identifier or index are obtained from the scheduling assignment (DCI) which is received on NR-PDCCH for RA-RNTI. If the 'X' Lsbs of random access preamble identifier or index from MAC subheader is equal to 'X' Lsbs of random access preamble identifier or index corresponding to the transmitted random access preamble and remaining or Y Msbs of random access preamble identifier or index obtained from the scheduling assignment is equal to remaining 'Y' Lsbs of random access preamble identifier or index corresponding to the transmitted random access preamble then UE considers that random access preamble corresponding to received RAR and random access preamble transmitted by it is same.

Figure 25:
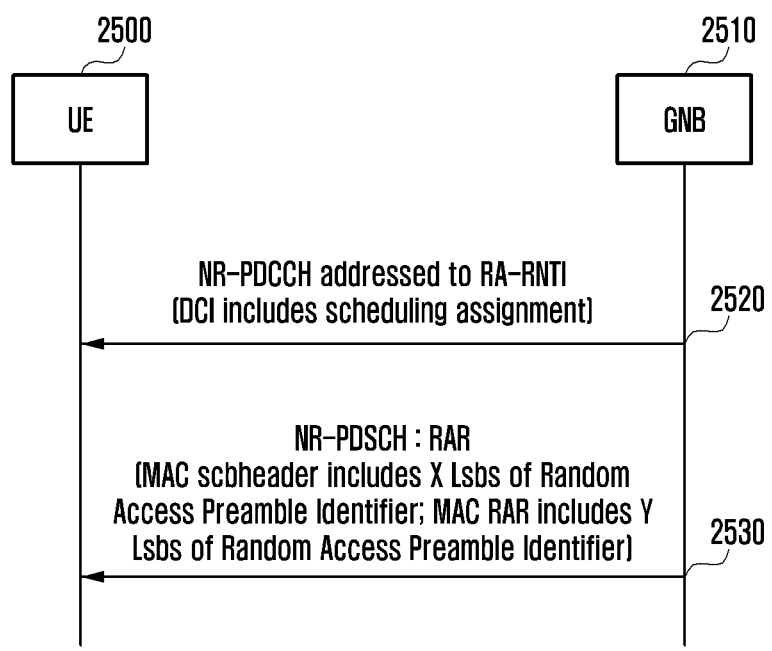
FIGS. 25 and 26 illustrate transmitting a random access preamble identifier to UE according to an embodiment of the disclosure.
Figure 26:
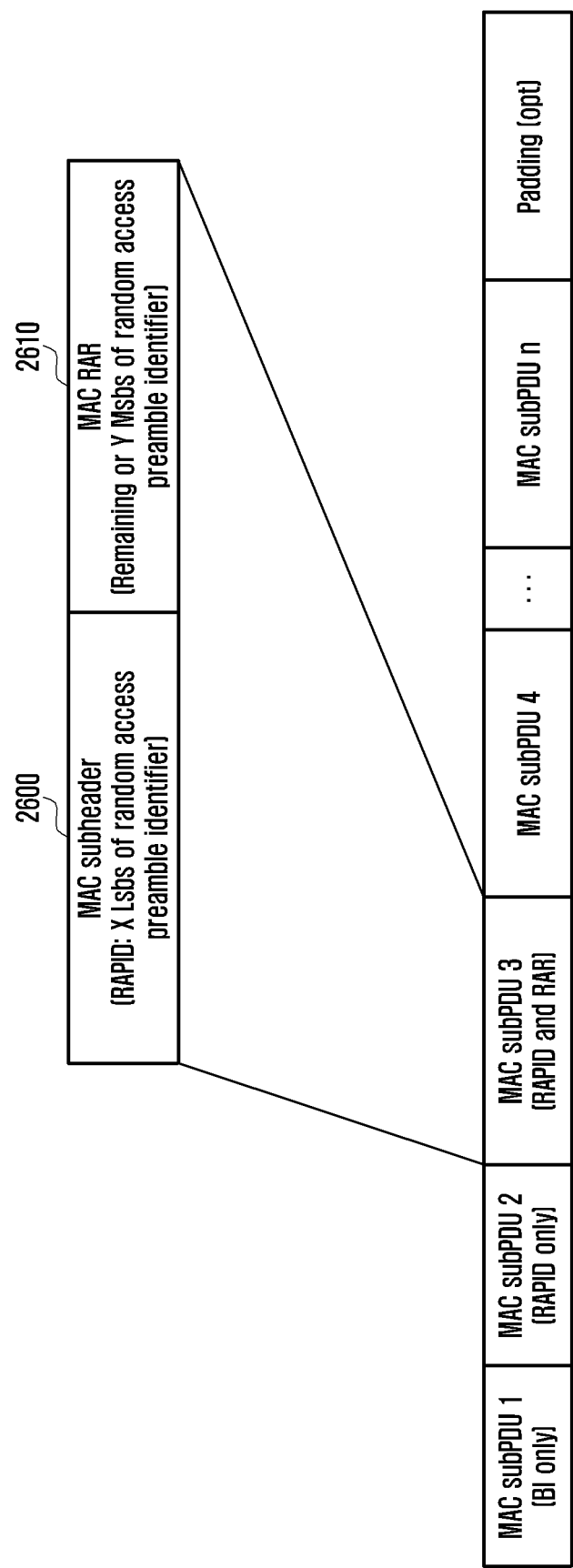

FIGS. 25 and 26 illustrate transmitting a random access preamble identifier to UE according to an embodiment of the disclosure.

Referring to FIGS. 25 and 26, it is proposed that 'X' Lsbs of random access preamble identifier or index is included in MAC subheader. The remaining or Y Msbs of random access preamble identifier or index is included in MAC RAR. Referring to FIG. 25, a UE 2500 receives NR-PDCCH addressed to RA-RNTI from gNB 2510 in operation 2520. After operation 2520, the UE 2500 receives NR-PDSCH including RAR from the gNB 2510 in operation 2530. On receiving the RAR, UE will obtain the 'X' Lsbs of random access preamble identifier or index from MAC subheader 2600 and remaining or Y Msbs of random access preamble identifier or index from the MAC RAR 2610. If the 'X' Lsbs of random access preamble identifier or index from MAC subheader is equal to 'X' Lsbs of random access preamble identifier or index corresponding to the transmitted random access preamble and remaining or Y Msbs of random access preamble identifier or index obtained from the MAC RAR is equal to remaining 'Y' Lsbs of random access preamble identifier or index corresponding to the transmitted random access preamble then UE considers that random access preamble corresponding to received RAR and random access preamble transmitted by it is same.

In an alternate embodiment, it is proposed that 'X' Lsbs (Least significant bits) of random access preamble identifier or index is included in MAC subheader. The remaining or Z Msbs (Most significant bits) of random access preamble identifier or index is included in RA-RNTI calculation. On receiving the RAR, UE will obtain the 'X' Lsbs of random access preamble identifier or index from MAC subheader. If the 'X' Lsbs of random access preamble identifier or index from MAC subheader is equal to 'X' Lsbs of random access preamble identifier or index corresponding to the transmitted random access preamble then UE considers that random access preamble corresponding to receive RAR and random access preamble transmitted by it is same.

RA-RNTI Calculation with Preamble Info

After transmitting the PRACH preamble, UE monitors the PDCCH of the SPCell for Random Access Response(s) identified by the RA-RNTI(s) during the RAR window. The RA-RNTI is computed as described in further detail below.

Scenario 1: In time domain, only one PRACH transmission occasion is supported in one slot Method 1

In this scenario, the RA-RNTI associated with the PRACH in which the Random Access Preamble is transmitted, is computed as:

$$RA\text{-}RNTI = 1 + t\_id + X^* f\_id + X^* Y^* P\_id$$

OR $$RA\text{-}RNTI = 1 + t\_id + X^* P\_id + X^* 2Z^* f\_id$$

OR $$RA\text{-}RNTI = 1 + P\_id + 2Z^* t\_id + + X^* 2Z^* f\_id$$

In this example, t_id is an index of the first slot of the PRACH transmission occasion; $0 \leq t\_id < X$; the slots in a radio frame are sequentially numbered starting from zero. Depending on the SCS for Msg1 (or PRACH preamble) transmission, number of slots in a radio frame can vary from 10 to 80 as shown in Table 2 below. The maximum number of slots in a radio frame is 80, so X can be equal to 80 if maximum RAR window size is one radio frame i.e. 10 ms.

TABLE 2

| SCS for determining RACH slot | # of slots in a subframe | # of slots in a radio frame |
| --- | --- | --- |
| 15 KHz | 1 | 10 |
| 30 KHz | 2 | 20 |
| 60 KHz | 4 | 40 |
| 120 KHz | 8 | 80 |

Alternately, if PRACH transmission occasion can start only in some slots in a radio frame, X can be smaller than 80. For example, if PRACH transmission occasion can only start in slots 0, 4, 8 and 12, X can be 4 as there are four possible slots where PRACH transmission occasion can start. Each of these slots (0, 4, 8, 12 in the example) where PRACH transmission can start are logically numbered sequentially (i.e. T_id for RACH transmission occasion starting in slot 0 is 0, T_id for RACH transmission occasion starting in slot 4 is 1, T_id for RACH transmission occasion starting in slot 8 is 2 and T_id for RACH transmission occasion starting in slot 12 is 3.

In an embodiment, X can be set to a value depending on numerology or SCS. For example for SCS of 15 KHz it can be set to 10 as there are 10 slots in a radio frame in this case. For SCS of 30 KHz it can be set to 20 as there 20 slots in a radio frame in this case. For SCS of 60 KHz it can be set to 40 as there are 40 slots in a radio frame in this case. For SCS of 120 KHz it can be set to 80 as there are 80 slots in a radio frame in this case. The slots in a radio frame are sequentially numbered starting from zero.

In an embodiment, if maximum size of RAR window is greater than one radio frame called N radio frames, then slots in every N consecutive radio frames starting from radio frame with SFN 0, are indexed sequentially from zero. Slots in SFN 0 to SFN N−1 are indexed sequentially start from zero. Slots in SFN N to SFN 2N−1 are indexed sequentially start from zero and so on as shown in FIG. 19 below. In this case X can be equal to 80*N, as maximum number of slots in radio frame is 80 and maximum number of slots in N radio frames is N*80. The slots are indexed sequentially for N consecutive radio frames starting from first slot of every radio frame with SFN which satisfies equation SFN mod N=0.

In another embodiment, if the maximum size of a RAR window is greater than one radio frame called N sub frames, then slots in N consecutive sub frames starting from 1st subframe in radio frame with SFN 0, are indexed sequentially from zero. Slots in subframe 0 to subframe N−1 are indexed sequentially start from zero. Slots in subframe N to subframe 2N−1 are indexed sequentially starting from zero and so on as shown in FIG. 20 below. In this case X can be equal to 8*N as maximum number of slots in a subframe is 8. The slots are indexed sequentially for N subframes frames starting from first slot of every subframe 'i' in radio frame 'j' which satisfies equation (j*10+i) mod N=0, where 'j' is the SFN of radio frame and 'i' is the subframe index (with radio frame subframes are indexed from 0 to 9 sequentially) of subframe within a radio frame.

In another embodiment, if the maximum size of a RAR window is called N slots, then starting from 1st slot of SFN 0, every N consecutive slots are indexed sequentially from zero to N−1 as shown in FIG. 21. In this case X can be equal to N.

In this example, f_id is an index of the PRACH transmission occasion, in ascending order of frequency domain; 0≤f_id<Y; and Y depends on number of RACH transmission occasions supported in frequency domain in NR. In an embodiment, if multiple resource pools (e.g. separate resource pool for beam failure recovery, handover, etc.) for RACH are configured, frequency division multiplexed PRACH transmission occasions in each resource pool can be independently numbered starting from zero. For example, if there are two resource pools, resource pool 1 having two frequency division multiplexed PRACH transmission occasions and resource pool 2 having four frequency division multiplexed PRACH transmission occasions, the frequency division multiplexed PRACH transmission occasions are numbered 0 and 1 in resource pool 1 and the frequency division multiplexed PRACH transmission occasions are numbered 0, 1, 2, and 3 in resource pool 2.

In another embodiment, if multiple resource pools for RACH are configured, frequency division multiplexed PRACH transmission occasions are numbered starting from zero across resource pools. For example, let us say there are two resource pools. In resource pool 1 there are two frequency division multiplexed PRACH transmission occasions. In resource pool 2 there are four frequency division multiplexed PRACH transmission occasions. The frequency division multiplexed PRACH transmission occasions are numbered 0 and 1 in resource pool 1. The frequency division multiplexed PRACH transmission occasions are numbered 2, 3, 4, and 5. In another embodiment, if multiple resource pools for RACH are configured, network may configure the starting f_id to be used for each resource pool. The FDM PRACH transmission occasions in a resource pool are sequentially numbered starting from f_id indicated by network for that resource pool.

In this example, P_id is a value of Z Msbs of Random Access Preamble Identifier of Random access preamble transmitted by UE. Z is pre-defined. For example if Z is 2 bits, then P_id is 0 (if 2 Msbs of Random Access Preamble Identifier are '00') or 1 (if 2 Msbs of Random Access Preamble Identifier are '01') or 2 (if 2 Msbs of Random Access Preamble Identifier are '10') or 3 (if 2 Msbs of Random Access Preamble Identifier are '11').

Note that other combinations, with respect to position of t_id, f_id and P_id in RA-RNTI equation are also possible. Various ways of computing RA-RNTI based on t_id, f_id and P_id is as follows:

$$RA\text{-}RNTI = 1 + Parameter\ 1 + C1*Parameter\ 2 + C1*C2*Parameter\ 3.$$

In this example, Parameter 1 is one of t_id, f_id, or P_id, Parameter 2 is one of [{t_id, f_id, P_id}−{Selected Parameter 1}], Parameter 3 is one of [{t_id, f_id, P_id}−{Selected Parameter 1}−{Selected Parameter 2}], C1 is a number of distinct values of selected parameter 1, C2 is a number of distinct values of selected parameter 2.

In another embodiment, random access preamble can be transmitted on frequency F1 and RAR can be received on frequency F2. In this case information about the carrier on which random access preamble is transmitted can also be included in RA-RNTI computation. For example, serving cell can configure a supplementary uplink (SUL) frequency called Fy. The uplink frequency of serving cell is called Fx. Serving cell configures PRACH resources on frequency Fy and Fx. Based on certain criteria UE selects PRACH resource on either frequency Fy or frequency Fx for random access preamble transmission. If UE transmits random access preamble on frequency Fy, it receives RAR in DL of serving cell. If the UE transmits random access preamble on frequency Fx, it receives RAR in DL of serving cell. The RA-RNTI can be computed as follows:

$$RA\text{-}RNTI = 1 + t\_id + X*f\_id + X*Y*P\_id + X*Y*2Z*c\_id$$

OR $$RA\text{-}RNTI = 1 + t\_id + X*f\_id + X*Y*c\_id + X*Y*2*P\_id$$

OR $$RA\text{-}RNTI = 1 + t\_id + X*P\_id + X*2Z*f\_id + X*Y*2Z*c\_id$$

OR $$RA\text{-}RNTI = 1 + P\_id + 2Z*t\_id + + X*2Z*f\_id + X*Y*2Z*c\_id$$

The values of t_id, f_id, P_id, X, Z and Y are explained. The value c_id is set to '1' if UE transmits random access preamble on SUL or else c_id is set to '0.' In an embodiment, the value of c_id to be used specific to a carrier frequency (or specific to serving cell) on which random access preamble is transmitted can be signaled by network. This can be signaled in system information or in dedicated signaling. A list of mapping between c_id and carrier frequency can be signaled. The UE uses the c_id corresponding to carrier frequency on which it has transmitted random access preamble. In an embodiment value of c_id for PCell and PSCell is zero. The value of c_id for a SCell other than PSCell is signaled by network in SI or dedicated signaling. Alternatively, the value of c_id for a SCell other than PSCell is equal to serving cell index.

Note that other combinations, with respect to position of t_id, f_id, P_id and c_id in RA-RNTI equation are also possible. Various ways of computing RA-RNTI based on t_id, f_id, P_id and c_id are as follows:

$$RA\text{-}RNTI = 1 + Parameter\ 1 + C1*Parameter\ 2 + C1*C2*Parameter\ 3 + C1*C2*C3*Parameter\ 4$$

In this example, Parameter 1 is one of t_id, f_id, P_id, or c_id, Parameter 2 is one of [{t_id, f_id, P_id, c_id}−{Selected Parameter 1}], Parameter 3 is one of [{t_id, f_id, P_id, c_id}−{Selected Parameter 1}−{Selected Parameter 2}], Parameter 4 is one of [{t_id, f_id, P_id, c_id}−{Selected Parameter 1}−{Selected Parameter 2}−{Selected Parameter 3}], C1 is a number of distinct values of Selected parameter 1, C2 is a number of distinct values of Selected parameter 2, C3 is a number of distinct values of Selected parameter 3.

Method 2

In this scenario, the RA-RNTI associated with the PRACH in which the Random Access Preamble is transmitted, is computed as:

$$RA\text{-}RNTI = 1 + t\_id1 + X1*t\_id2 + X1*X2*f\_id + X1*X2*Y*P\_id$$

OR $$RA\text{-}RNTI = 1 + P\_id + 2Z*t\_id1 + X1*2Z*t\_id2 + X1*2Z*X2*f\_id$$

OR $$RA\text{-}RNTI = 1 + t\_id1 + X1*P\_id + X1*2Z*t\_id2 + X1*2Z*X2*f\_id$$

OR $$RA\text{-}RNTI = 1 + t\_id1 + X1*t\_id2 + X1*X2*P\_id + X1*X2*2Z*f\_id$$

In this example, t_id 1 is an index of the first slot of the PRACH transmission occasion ($0 \leq t\_id < X1$) and t_id 2 is an index of the subframe in which PRACH transmission occasion starts or subframe in which first slot of PRACH transmission occasion is located ($0 \leq t\_id\ 2 < X2$. The slots in a subframe frame are sequentially numbered starting from zero. Depending on the SCS for Msg1 (or PRACH preamble) transmission, number of slots in a subframe frame can vary from 1 to 8. Maximum number of slots in a sub frame is 8, so X1 can be equal to 8;

The subframes in a radio frame are sequentially numbered starting from zero. Maximum number of subframe in a radio frame is 10, so X2 can be equal to 10 if maximum RAR window size is one radio frame i.e. 10 ms.

In another embodiment, if maximum size of RAR window is greater than one radio frame called N radio frames, then subframes in N consecutive radio frames starting from radio frame with SFN 0 are indexed sequentially from zero. Subframes in SFN 0 to SFN N−1 are indexed sequentially start from zero. Subframes in SFN N to SFN 2N−1 are indexed sequentially start from zero and so on as shown in FIG. 21 below. In this case X2 can be equal to 10*N. The subframes are indexed sequentially for N radio frames starting from first subframe of every radio frame with SFN which satisfies equation SFN mod N=0.

In an embodiment, if maximum size of RAR window is greater than one radio frame called N sub frames, then every N consecutive subframes in SFN cycle, starting from the first subframe of radio frame with SFN 0, are indexed sequentially starting from zero as shown in FIG. 23. In this case X2 can be equal to N.

The value of f_id is an index of the PRACH transmission occasion, in ascending order of frequency domain; $0 \leq f\_id < Y$; Y depends on number of RACH transmission occasions supported in frequency domain in NR.

In this example, P_id is a value of Z Msbs of Random Access Preamble Identifier of Random access preamble transmitted by UE. Z is pre-defined. For example if Z is 2 bits, then P_id is 0 (if 2 Msbs of Random Access Preamble Identifier are '00') or 1 (if 2 Msbs of Random Access Preamble Identifier are '01') or 2 (if 2 Msbs of Random Access Preamble Identifier are '10') or 3 (if 2 Msbs of Random Access Preamble Identifier are '11').

Note that other combinations, with respect to position of t_id1, t_id2, f_id, P_id in RA-RNTI equation are also possible. Various ways of computing RA-RNTI based on t_id1, t_id2, f_id and P_id are as follows:

$$RA\text{-}RNTI = 1 + \text{Parameter 1} + C1*\text{Parameter 2} + C1*C2*\text{Parameter 3} + C1*C2*C3*\text{Parameter 4}$$

In this example, Parameter 1 is one of t_id1, t_id2, f_id, or P_id, Parameter 2 is one of [{t_id1, t_id2, f_id, P_id}−{Selected Parameter 1}], Parameter 3 is one of [{t_id1, t_id2, f_id, P_id}−{Selected Parameter 1}−{Selected Parameter 2}], Parameter 4 is one of [{t_id1, t_id2, f_id, P_id}−{Selected Parameter 1}−{Selected Parameter 2}−{Selected Parameter 3}], C1 is a number of distinct values of selected parameter 1, C2 is a number of distinct values of selected parameter 2, and C3 is a number of distinct values of selected parameter 3.

In another embodiment, random access preamble can be transmitted on frequency F1 and RAR can be received on frequency F2. In this case information about the carrier on which random access preamble is transmitted can also be included in RA-RNTI computation. For example, serving cell can configure a supplementary uplink (SUL) frequency called Fy. The uplink frequency of serving cell is called Fx. Serving cell configures PRACH resources on frequency Fy and Fx. Based on certain criteria UE selects PRACH resource on either frequency Fy or frequency Fx for random access preamble transmission. If UE transmits random access preamble on frequency Fy, it receives RAR in DL of serving cell. If the UE transmits random access preamble on frequency Fx, it receives RAR in DL of serving cell. The RA-RNTI can be computed as follows:

$$RA\text{-}RNTI = 1 + t\_id1 + X1*t\_id2 + X1*X2*f\_id + X1*X2*Y*ID + X1*X2*Y*2*P\_id$$

OR $$RA\text{-}RNTI = 1 + t\_id1 + X1*t\_id2 + X1*X2*f\_id + X1*X2*Y*P\_id + X1*X2*Y*2Z*ID$$

OR $$RA\text{-}RNTI = 1 + P\_id + 2Z*t\_id1 + X1*2Z*t\_id2 + X1*2Z*X2*f\_id + X1*X2*Y*2Z*ID$$

OR $$RA\text{-}RNTI = 1 + t\_id1 + X1*P\_id + X1*2Z*t\_id2 + X1*2Z*X2*f\_id + X1*X2*Y*2Z*ID$$

OR $$RA\text{-}RNTI = 1 + t\_id1 + X1*t\_id2 + X1*X2*P\_id + X1*X2*2Z*f\_id + X1*X2*Y*2Z*ID$$

The values of t_id1, t_id2, f_id, P_id, X1, X2, Z and Y are explained earlier. The value of c_id is set to '1' if UE transmits random access preamble on SUL or else c_id is set to '0.' In an embodiment, the value of c_id to be used specific to a carrier frequency (or specific to serving cell) on which random access preamble is transmitted can be signaled by network. This can be signaled in system information or in dedicated signaling. A list of mapping between c_id and carrier frequency can be signaled. The UE uses the c_id corresponding to carrier frequency on which it has transmitted random access preamble. In an embodiment value of c_id for PCell and PSCell is zero. The value of c_id for a SCell other than PSCell is signaled by network in SI or dedicated signaling. Alternatively, the value of c_id for a SCell other than PSCell is equal to serving cell index.

Note that other combinations, with respect to position of t_id1, t_id2, f_id, P_id and c_id in RA-RNTI equation are also possible. Various ways of computing RA-RNTI based on t_id1, t_id2, f_id, P_id and c_id are as follows:

$$RA\text{-}RNTI = 1 + \text{Parameter 1} + C1*\text{Parameter 2} + C1*C2*\text{Parameter 3} + C1*C2*C3*\text{Parameter 4} + C1*C2*C3*C4*\text{Parameter 5}$$

In this example, Parameter 1 is one of t_id1, t_id2, f_id, P_id, or c_id, Parameter 2 is one of [{t_id1, t_id2, f_id, P_id, c_id}−{Selected Parameter 1}], Parameter 3 is one of

[{t_id1, t_id2, f_id, P_id, c_id}-{Selected Parameter 1}-{Selected Parameter 2}], Parameter 4 is one of [{t_id1, t_id2, f_id, P_id, c_id}-{Selected Parameter 1}-{Selected Parameter 2}-{Selected Parameter 3}], Parameter 5 is one of [{t_id1, t_id2, f_id, P_id, c_id}-{Selected Parameter 1}-{Selected Parameter 2}-{Selected Parameter 3}-{Selected Parameter 4}], C1 is a number of distinct values of Selected parameter 1, C2 is a number of distinct values of Selected parameter 2, C3 is a number of distinct values of Selected parameter 3, and C4 is a number of distinct values of Selected parameter 4.

Scenario 2: In time domain, multiple PRACH transmission occasions are supported in one slot Method 1

In this scenario, each OFDM symbol can be a transmission occasion in a slot. The RA-RNTI associated with the PRACH in which the Random Access Preamble is transmitted, is computed as:

$$RA\text{-}RNTI = 1 + t\_id1 + X1 * t\_id2 + X1 * X2 * f\_id + X1 * X2 * Y * P\_id$$

OR $$RA\text{-}RNTI = 1 + P\_id + 2Z * t\_id1 + X1 * 2Z * t\_id2 + X1 * 2Z * X2 * f\_id$$

OR $$RA\text{-}RNTI = 1 + t\_id1 + X1 * P\_id + X1 * 2Z * t\_id2 + X1 * 2Z * X2 * f\_id$$

OR $$RA\text{-}RNTI = 1 + t\_id1 + X1 * t\_id2 + X1 * X2 * P\_id + X1 * X2 * 2Z * f\_id$$

In this example, t_id1 is an index of the first OFDM symbol of the PRACH transmission occasion ($0 \leq t\_id1 < X1$), and t_id2 is an index of the first slot of the PRACH transmission occasion ($0 \leq t\_id2 < X2$). In this example, X1 can be 14, since each slot has 14 OFDM symbols and PRACH transmission occasion can start in any symbol. OFDM symbols in a slot are indexed sequentially starting from zero. If PRACH transmission occasion can start only in some symbols in a slot, X1 can be smaller than 14. For example, if PRACH transmission occasion can only start in symbols 0, 4, 8, and 12, X1 can be 4. Each of these symbols (e.g. 0, 4, 8, 12) where PRACH transmission occasion can start are logically indexed sequentially i.e. In this example, t_id1 for RACH transmission occasion starting in symbol 0 is 0, t_id1 for RACH transmission occasion starting in symbol 4 is 1, t_id1 for RACH transmission occasion starting in symbol 8 is 2 and t_id1 for RACH transmission occasion starting in symbol 12 is 3.

In an embodiment, slots in radio frame are indexed sequentially starting from zero. The maximum number of slots in a radio frame is 80, so X2 can be equal to 80 if maximum size of RAR window is one radio frame.

Alternately, if PRACH transmission occasion can start only in some slots in a radio frame, X2 can be smaller than 80. For example, if PRACH transmission occasion can only start in slot 0, 4, 8, and 12, X2 can be 4. Each of these slots (e.g. 0, 4, 8, 12) where PRACH transmission occasion can start can be logically indexed sequentially (i.e. T_id2 for RACH transmission occasion starting in slot 0 is 0, t_id2 for RACH transmission occasion starting in slot 4 is 1, t_id2 for RACH transmission occasion starting in slot 8 is 2 and t_id2 for RACH transmission occasion starting in slot 12 is 3).

In an embodiment, X2 can be set to a value depending on numerology or SCS. For example for SCS of 15 KHz it can be set to 10 as there are 10 slots in a radio frame in this case. For SCS of 30 KHz it can be set to 20 as there 20 slots in a radio frame in this case. For SCS of 60 KHz it can be set to 40 as there are 40 slots in a radio frame in this case. For SCS of 120 KHz it can be set to 80 as there are 80 slots in a radio frame in this case.

In an embodiment, if maximum size of RAR window is greater than one radio frame called N radio frames, then slots in every N consecutive radio frames starting from radio frame with SFN 0, are indexed sequentially from zero. Slots in SFN 0 to SFN N−1 are indexed sequentially start from zero. Slots in SFN N to SFN 2N−1 are indexed sequentially start from zero and so on as shown in FIG. 19 below. In this case X2 can be equal to 80*N, as maximum number of slots in radio frame is 80 and maximum number of slots in N radio frames is N*80. The slots are indexed sequentially for N consecutive radio frames starting from first slot of every radio frame with SFN which satisfies equation SFN mod N=0.

In another embodiment, if maximum size of RAR window is greater than one radio frame called N sub frames, then slots in N consecutive sub frames starting from 1st subframe in radio frame with SFN 0, are indexed sequentially from zero. Slots in subframe 0 to subframe N−1 are indexed sequentially start from zero. Slots in subframe N to subframe 2N−1 are indexed sequentially starting from zero and so on as shown in FIG. 20 below. In this case X2 can be equal to 8*N as maximum number of slots in a subframe is 8. The slots are indexed sequentially for N subframes frames starting from first slot of every subframe 'i' in radio frame 'j' which satisfies equation (j*10+i) mod N=0, where 'j' is the SFN of radio frame and 'i' is the subframe index (with radio frame subframes are indexed from 0 to 9 sequentially) of subframe within a radio frame.

In another embodiment, if maximum size of RAR window is called N slots, then starting from 1st slot of SFN 0, every N consecutive slots are indexed sequentially from zero to N−1 as shown in FIG. 21. In this case X2 can be equal to N.

In this example, f_id is an index of the PRACH transmission occasion, in ascending order of frequency domain; $0 \leq f\_id < Y$; and Y depends on number of RACH transmission occasions supported in frequency domain in NR. In an embodiment, if multiple resource pools (e.g. separate resource pool for beam failure recovery, handover, etc.) for RACH are configured, frequency division multiplexed PRACH transmission occasions in each resource pool can be independently numbered starting from zero. For example, if there are two resource pools, resource pool 1 having two frequency division multiplexed PRACH transmission occasions and resource pool 2 having four frequency division multiplexed PRACH transmission occasions, the frequency division multiplexed PRACH transmission occasions are numbered 0 and 1 in resource pool 1 and the frequency division multiplexed PRACH transmission occasions are numbered 0, 1, 2, and 3 in resource pool 2.

In another embodiment, if multiple resource pools for RACH are configured, frequency division multiplexed PRACH transmission occasions are numbered starting from zero across resource pools. For example, let us say there are two resource pools. In resource pool 1 there are two frequency division multiplexed PRACH transmission occasions. In resource pool 2 there are four frequency division multiplexed PRACH transmission occasions. The frequency division multiplexed PRACH transmission occasions are numbered 0 and 1 in resource pool 1. The frequency division multiplexed PRACH transmission occasions are numbered 2, 3, 4, and 5. In another embodiment, if multiple resource pools for RACH are configured, network may configure the starting f_id to be used for each resource pool. The FDM PRACH transmission occasions in a resource pool are sequentially numbered starting from f_id indicated by network for that resource pool.

In this example, P_id is a value of Z Msbs of Random Access Preamble Identifier of Random access preamble transmitted by UE. Z is pre-defined. For example if Z is 2 bits, then P_id is 0 (if 2 Msbs of Random Access Preamble Identifier are '00') or 1 (if 2 Msbs of Random Access Preamble Identifier are '01') or 2 (if 2 Msbs of Random Access Preamble Identifier are '10') or 3 (if 2 Msbs of Random Access Preamble Identifier are '11').

Note that other combinations, with respect to position of t_id1, t_id2, f_id and P_id in RA-RNTI equation are also possible. Various ways of computing RA-RNTI based on t_id1, t_id2, f_id and P_id are as follows:

$$RA\text{-}RNTI = 1 + \text{Parameter } 1 + C1 * \text{Parameter } 2 + C1 * C2 * \text{Parameter } 3 + C1 * C2 * C3 * \text{Parameter } 4$$

In this example, Parameter 1 is one of t_id1, t_id2, f_id, or P_id, Parameter 2 is one of [{t_id 1, t_id2, f_id, P_id}−{Selected Parameter 1}], Parameter 3 is one of [{t_id1, t_id2, f_id, P_id}−{Selected Parameter 1}−{Selected Parameter 2}], Parameter 4 is one of [{t_id1, t_id2, f_id, P_id}−{Selected Parameter 1}−{Selected Parameter 2}−{Selected Parameter 3}], C1 is a number of distinct values of Selected parameter 1, C2 is a number of distinct values of Selected parameter 2, and C3 is a number of distinct values of Selected parameter 3.

In another embodiment, random access preamble can be transmitted on frequency F1 and RAR can be received on frequency F2. In this case information about the carrier on which random access preamble is transmitted can also be included in RA-RNTI computation. For example, serving cell can configure a supplementary uplink (SUL) frequency called Fy. The uplink frequency of serving cell is called Fx. Serving cell configures PRACH resources on frequency Fy and Fx. Based on certain criteria UE selects PRACH resource on either frequency Fy or frequency Fx for random access preamble transmission. If UE transmits random access preamble on frequency Fy, it receives RAR in DL of serving cell. If the UE transmits random access preamble on frequency Fx, it receives RAR in DL of serving cell. The RA-RNTI can be computed as follows:

$$RA\text{-}RNTI = 1 + t\_id1 + X1 * t\_id2 + X1 * X2 * f\_id + X1 * X2 * Y * c\_id + X1 * X2 * Y * 2 * P\_id$$

OR $$RA\text{-}RNTI = 1 + t\_id1 + X1 * t\_id2 + X1 * X2 * f\_id + X1 * X2 * Y * P\_id + X1 * X2 * Y * 2Z * c\_id$$

OR $$RA\text{-}RNTI = 1 + P\_id + 2Z * t\_id1 + X1 * 2Z * t\_id2 + X1 * 2Z * X2 * f\_id + X1 * X2 * Y * 2Z * c\_id$$

OR $$RA\text{-}RNTI = 1 + t\_id1 + X1 * P\_id + X1 * 2Z * t\_id2 + X1 * 2Z * X2 * f\_id + X1 * X2 * Y * 2Z * c\_id$$

OR $$RA\text{-}RNTI = 1 + t\_id1 + X1 * t\_id2 + X1 * X2 * P\_id + X1 * X2 * 2Z * f\_id + X1 * X2 * Y * 2Z * c\_id$$

In this example, the values of t_id1, t_id2, f_id, P_id, X1, X2, Z and Y are explained earlier. The value of c_id is set to '1' if UE transmits random access preamble on SUL or else c_id is set to '0.' In an embodiment, the value of c_id to be used specific to a carrier frequency (or specific to serving cell) on which random access preamble is transmitted can be signaled by network. This can be signaled in system information or in dedicated signaling. A list of mapping between c_id and carrier frequency can be signaled. The UE uses the c_id corresponding to carrier frequency on which it has transmitted random access preamble. In an embodiment value of c_id for PCell and PSCell is zero. The value of c_id for a SCell other than PSCell is signaled by network in SI or dedicated signaling. Alternatively, the value of c_id for a SCell other than PSCell is equal to serving cell index.

Note that other combinations, with respect to position of t_id1, t_id2, f_id, P_id and c_id in RA-RNTI equation are also possible. Various ways of computing RA-RNTI based on t_id1, t_id2, f_id, P_id and c_id are as follows:

$$RA\text{-}RNTI = 1 + \text{Parameter } 1 + C1 * \text{Parameter } 2 + C1 * C2 * \text{Parameter } 3 + C1 * C2 * C3 * \text{Parameter } 4 + C1 * C2 * C3 * C4 * \text{Parameter } 5$$

In this example, Parameter 1 is one of t_id1, t_id2, f_id, P_id, or c_id, Parameter 2 is one of [{t_id1, t_id2, f_id, P_id, c_id}−{Selected Parameter 1}], Parameter 3 is one of [{t_id1, t_id2, f_id, P_id, c_id}−{Selected Parameter 1}−{Selected Parameter 2}], Parameter 4 is one of [{t_id1, t_id2, f_id, P_id, c_id}−{Selected Parameter 1}−{Selected Parameter 2}−{Selected Parameter 3}], Parameter 5 is one of [{t_id1, t_id2, f_id, P_id, c_id}−{Selected Parameter 1}−{Selected Parameter 2}−{Selected Parameter 3}−{Selected Parameter 4}], C1 is a number of distinct values of Selected parameter 1, C2 is a number of distinct values of Selected parameter 2, C3 is a number of distinct values of Selected parameter 3, and C4 is a number of distinct values of Selected parameter 4.

Method 2

In this scenario, each OFDM symbol can be a transmission occasion in a slot. The RA-RNTI associated with the PRACH in which the Random Access Preamble is transmitted, is computed as:

$$RA\text{-}RNTI = 1 + t\_id1 + X1 * t\_id2 + X1 * X2 * t\_id3 + X1 * X2 * X3 * f\_id + X1 * X2 * X3 * Y * P\_id$$

In this example, t_id1 is an index of the first OFDM symbol of the PRACH transmission occasion ($0 \leq t\_id1 < X1$) and t_id2 is an index of the first slot of the PRACH transmission occasion, i.e., a slot in which RACH transmission occasion starts ($0 \leq t\_id2 < X2$). The value of X1 can be 14, since each slot has 14 OFDM symbols and PRACH transmission occasion can start in any symbol. OFDM symbols in a slot are indexed sequentially starting from zero. If PRACH transmission occasion can start only in some symbols in a slot, X1 can be smaller than 14. For example, if PRACH transmission occasion can only start in symbols 0, 4, 8 and 12, X1 can be 4. Each of these symbols (e.g. 0, 4, 8, 12) where PRACH transmission occasion can start are logically indexed sequentially i.e. T_id1 for RACH transmission occasion starting in symbol 0 is 0, T_id1 for RACH transmission occasion starting in symbol 4 is 1, T_id1 for RACH transmission occasion starting in symbol 8 is 2 and T_id1 for RACH transmission occasion starting in symbol 12 is 3.

The maximum number of slots in a subframe is 8, so X2 can be equal to 8; slots in subframe are indexed sequentially starting from zero.

Alternately, if PRACH transmission occasion can start only in some slots in a sub frame, X2 can be smaller than 8. For example, if PRACH transmission occasion can only start in slot 0 and 4, X2 can be 4. Each of these slots (e.g. 0, 4) where PRACH transmission occasion can start can be logically indexed sequentially (i.e. T_id2 for RACH transmission occasion starting in slot 0 is 0, T_id2 for RACH transmission occasion starting in slot 4 is 1).

In an embodiment, X2 can be set to a value depending on numerology or SCS. For example for SCS of 15 KHz it can be set to 1 as there is 1 slots in a sub frame in this case. For SCS of 30 KHz it can be set to 2 as there 2 slots in a sub frame in this case. For SCS of 60 KHz it can be set to 4 as there are 4 slots in a sub frame in this case. For SCS of 120 KHz it can be set to 8 as there are 8 slots in a sub frame in this case.

t_id 3 is an index of the subframe in which PRACH transmission occasion starts or subframe in which first slot of PRACH transmission occasion is located; $0<t\_id\ 3<X3$; The subframes in a radio frame are sequentially numbered starting from zero. Maximum number of subframe in a radio frame is 10, so X3 can be equal to 10 if the maximum RAR window size is one radio frame;

In this example, f_id is an index of the PRACH transmission occasion, in ascending order of frequency domain; $0 \leq f\_id < Y$; Y depends on number of RACH transmission occasions supported in frequency domain in NR. In an embodiment, if multiple resource pools (e.g. separate resource pool for beam failure recovery, handover, etc.) for RACH are configured, frequency division multiplexed PRACH transmission occasions in each resource pool can be independently numbered starting from zero. For example, if there are two resource pools, resource pool 1 having two frequency division multiplexed PRACH transmission occasions and resource pool 2 having four frequency division multiplexed PRACH transmission occasions, the frequency division multiplexed PRACH transmission occasions are numbered 0 and 1 in resource pool 1 and the frequency division multiplexed PRACH transmission occasions are numbered 0, 1, 2, and 3 in resource pool 2.

In another embodiment, if multiple resource pools for RACH are configured, frequency division multiplexed PRACH transmission occasions are numbered starting from zero across resource pools. For example, let us say there are two resource pools. In resource pool 1 there are two frequency division multiplexed PRACH transmission occasions. In resource pool 2 there are four frequency division multiplexed PRACH transmission occasions. The frequency division multiplexed PRACH transmission occasions are numbered 0 and 1 in resource pool 1. The frequency division multiplexed PRACH transmission occasions are numbered 2, 3, 4, and 5. In another embodiment, if multiple resource pools for RACH are configured, network may configure the starting f_id to be used for each resource pool. The FDM PRACH transmission occasions in a resource pool are sequentially numbered starting from f_id indicated by network for that resource pool.

In another embodiment, if maximum size of RAR window is greater than one radio frame called N radio frames, then subframes in N consecutive radio frames starting from radio frame with SFN 0 are indexed sequentially from zero. Subframes in SFN 0 to SFN N−1 are indexed sequentially start from zero. Subframes in SFN N to SFN 2N−1 are indexed sequentially start from zero and so on as shown in FIG. 21 below. In this case X3 can be equal to 10*N. The subframes are indexed sequentially for N radio frames starting from first subframe of every radio frame with SFN which satisfies equation SFN mod N=0.

In an embodiment, if maximum size of RAR window is greater than one radio frame called N sub frames, then every N consecutive subframes in SFN cycle, starting from the first subframe of radio frame with SFN 0, are indexed sequentially starting from zero as shown in FIG. 23. In this case X3 can be equal to N.

P_id is a value of Z Msbs of Random Access Preamble Identifier of Random access preamble transmitted by UE. Z is pre-defined. For example if Z is 2 bits, then P_id is 0 (if 2 Msbs of Random Access Preamble Identifier are '00') or 1 (if 2 Msbs of Random Access Preamble Identifier are '01') or 2 (if 2 Msbs of Random Access Preamble Identifier are '10') or 3 (if 2 Msbs of Random Access Preamble Identifier are '11').

Note that other combinations, with respect to position of t_id1, t_id2, t_id3, f_id and P_id in RA-RNTI equation are also possible. Various ways of computing RA-RNTI based on t_id1, t_id2, t_id3, f_id and P_id are as follows:

$$RA\text{-}RNTI = 1 + \text{Parameter 1} + C1 * \text{Parameter 2} + C1*C2*\text{Parameter 3} + C1*C2*C3*\text{Parameter 4} + C1*C2*C3*C4*\text{Parameter 5}$$

In this example, Parameter 1 is one of t_id1, t_id2, t_id3, f_id, or P_id, Parameter 2 is one of [{t_id1, t_id2, t_id3, f_id, P_id}−{Selected Parameter 1}], Parameter 3 is one of [{t_id1, t_id2, t_id3, f_id, P_id}−{Selected Parameter 1}−{Selected Parameter 2}], Parameter 4 is one of [{t_id1, t_id2, t_id3, f_id, P_id}−{Selected Parameter 1}−{Selected Parameter 2}−{Selected Parameter 3}], Parameter 5 is one of [{t_id1, t_id2, t_id3, f_id, P_id}−{Selected Parameter 1}−{Selected Parameter 2}−{Selected Parameter 3}−{Selected Parameter 4}], C1 is a number of distinct values of Selected parameter 1, C2 is a number of distinct values of Selected parameter 2, C3 is a number of distinct values of Selected parameter 3, and C4 is a number of distinct values of Selected parameter 4

In another embodiment, random access preamble can be transmitted on frequency F1 and RAR can be received on frequency F2. In this case information about the carrier on which random access preamble is transmitted can also be included in RA-RNTI computation. For example, serving cell can configure a supplementary uplink (SUL) frequency called Fy. The uplink frequency of serving cell is called Fx. Serving cell configures PRACH resources on frequency Fy and Fx. Based on certain criteria UE selects PRACH resource on either frequency Fy or frequency Fx for random access preamble transmission. If UE transmits random access preamble on frequency Fy, it receives RAR in DL of serving cell. If the UE transmits random access preamble on frequency Fx, it receives RAR in DL of serving cell. The RA-RNTI can be computed as follows:

$$RA\text{-}RNTI = 1 + t\_id1 + X1*t\_id2 + X1*X2*t\_id3 + X1*X2*X3*f\_id + X1*X2*X3*Y*P\_id + X1*X2*X3*Y*2Z*c\_id$$

In this example, t_id1, t_id2, t_id3, f_id, P_id, X1, X2, X3, Z and Y are same as explained earlier. The value of c_id is set to '1' if UE transmits random access preamble on SUL or else c_id is set to '0.'

In an embodiment, the value of c_id to be used specific to a carrier frequency (or specific to serving cell) on which random access preamble is transmitted can be signaled by network. This can be signaled in system information or in dedicated signaling. A list of mapping between c_id and carrier frequency can be signaled. The UE uses the c_id corresponding to carrier frequency on which it has transmitted random access preamble. In an embodiment, value of c_id for PCell and PSCell is zero. The value of c_id for a SCell other than PSCell is signaled by network in SI or dedicated signaling. Alternatively, the value of c_id for a SCell other than PSCell is equal to serving cell index.

Note that other combinations, with respect to position of t_id1, t_id2, t_id3, f_id, P_id and c_id in RA-RNTI equation are also possible. Various ways of computing RA-RNTI based on t_id1, t_id2, t_id3, f_id, P_id and c_id are as follows:

$$RA\text{-}RNTI=1+\text{Parameter } 1+C1*\text{Parameter } 2+C1*C2*\text{Parameter } 3+C1*C2*C3*\text{Parameter } 4+C1*C2*C3*C4*\text{Parameter } 5+C1*C2*C3*C4*C5*\text{Parameter } 6$$

In this example, Parameter 1 is one of t_id1, t_id2, t_id3, f_id, P_id, or c_id, Parameter 2 is one of [{t_id1, t_id2, t_id3, f_id, P_id, c_id}−{Selected Parameter 1}], Parameter 3 is one of [{t_id1, t_id2, t_id3, f_id, P_id, c_id}−{Selected Parameter 1}−{Selected Parameter 2}], Parameter 4 is one of [{t_id1, t_id2, t_id3, f_id, P_id, c_id}−{Selected Parameter 1}−{Selected Parameter 2}−{Selected Parameter 3}], Parameter 5 is one of [{t_id1, t_id2, t_id3, f_id, P_id, c_id}−{Selected Parameter 1}−{Selected Parameter 2}−{Selected Parameter 3}−{Selected Parameter 4}], Parameter 6 is one of [{t_id1, t_id2, t_id3, f_id, P_id, c_id}−{Selected Parameter 1}−{Selected Parameter 2}−{Selected Parameter 3}−{Selected Parameter 4}−{Selected Parameter 5}], C1 is a number of distinct values of Selected parameter 1, C2 is a number of distinct values of Selected parameter 2, C3 is a number of distinct values of Selected parameter 3, C4 is a number of distinct values of Selected parameter 4, and C5 is a number of distinct values of Selected parameter 5.

Figure 27:
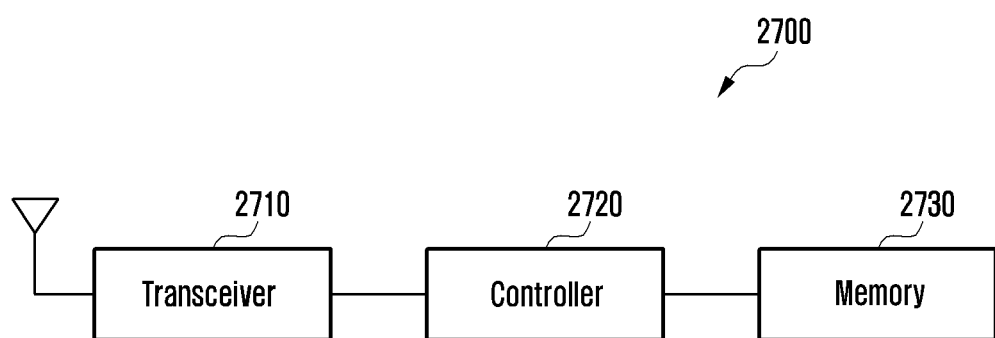
FIG. 27 illustrates an evolved Node B (eNB) according to an embodiment of the disclosure.

FIG. 27 illustrates an eNB apparatus according to an embodiment to the disclosure.

Referring to FIG. 27, the eNB 2700 includes a transceiver 2710, a controller 2720 and a memory 2730. Alternatively, the transceiver may be implemented as a transmitter and a receiver, and each component may be implemented through one or more processors. The transceiver can receive random access preamble and scheduled transmission from a UE and transmit NR-PDCCH addressed to RA-RNTI and NR-PDSCH including random access response to the UE. The memory can store information associated with random access procedure. The controller is configured to identify RA-RNTI and generate random access response based on received random access preamble and control the transceiver and the memory according to embodiments of the disclosure.

Figure 28:
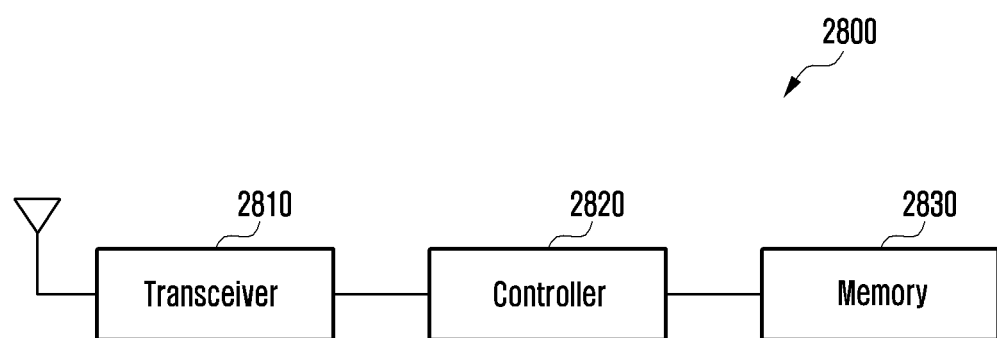
FIG. 28 illustrates a UE according to an embodiment of the disclosure.

FIG. 28 illustrates a UE according to an embodiment of the disclosure.

Referring to FIG. 28, the UE 2800 includes a transceiver 2810, a controller 2820 and a memory 2830. Alternatively, the transceiver may be implemented as a transmitter and a receiver, and each component may be implemented through one or more processors. The transceiver can receive random access response and transmit random access preamble and scheduled transmission. The memory can store information associated with random access procedure. The controller is configured to identify RA-RNTI based on transmitted random access preamble and information included in random access response and control the transceiver and the memory according to embodiments of the disclosure.

The above-described embodiments of the disclosure and the accompanying drawings have been provided only as specific examples in order to assist in understanding the disclosure and do not limit the scope of the disclosure. Accordingly, those skilled in the art to which the disclosure pertains will understand that other change examples based on the technical idea of the disclosure may be made without departing from the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   transmitting a random access preamble to a base station;
   receiving a random access response (RAR) medium access control (MAC) protocol data unit (PDU) including a plurality of MAC subPDUs from the base station, wherein one or more subPDUs among the plurality of MAC subPDUs include a MAC RAR and preceding MAC subheader corresponding to the MAC RAR, respectively;
   identifying whether a first MAC subPDU among the plurality of MAC subPDUs includes a random access preamble identifier (RAPID) which corresponds to the transmitted random access preamble;
   in case that the RAPID in the first MAC subPDU does not correspond to the RAPID of the transmitted random access preamble, identifying whether the RAPID in the first MAC subPDU corresponds to one of RAPIDs for system information (SI) request; and
   identifying a presence of a MAC RAR in the first MAC subPDU based on whether the RAPID in the first MAC subPDU corresponds to one of the RAPIDs for SI request or not,
   wherein the MAC RAR is not included in the first MAC subPDU and only a first MAC subheader is included in the first MAC subPDU, and next MAC subPDU follows the first MAC subheader, in case that the RAPID in the first MAC subheader corresponds to one of the RAPIDs for SI request, and
   wherein the first MAC subheader and the MAC RAR are included in the first MAC subPDU and the next MAC subPDU follows the MAC RAR, in case that the RAPID in the first MAC subheader does not correspond to one of the RAPIDs for SI request.

2. The method of claim 1,
   wherein the next MAC subPDU is present after the first MAC subPDU in case that extension information in the first MAC subPDU is set to 1.

3. The method of claim 1, further comprising:
   identifying whether the first MAC subPDU includes a backoff indicator or the RAPID based on type information in the first MAC subPDU.

4. The method of claim 1, wherein one or more RAPIDs for SI request are signaled by the base station.

5. The method of claim 1, wherein the plurality of MAC subPDUs include one of a backoff indicator subheader, a RAPID subheader for SI request acknowledgement or a RAPID subheader and corresponding MAC RAR.

6. The method of claim 5, wherein a backoff indicator is included in a beginning of the RAR MAC PDU.

7. The method of claim 5, wherein the RAPID subheader for SI request acknowledgement includes extension information, type information and the RAPID indicating the transmitted random access preamble from the terminal.

8. A terminal in a wireless communication system, the terminal comprising:
a transceiver; and
a controller coupled with the transceiver and configured to:
  transmit a random access preamble to a base station,
  receive a random access response (RAR) medium access control (MAC) protocol data unit (PDU) including a plurality of MAC subPDUs from the base station, wherein one or more subPDUs among the plurality of MAC subPDUs include a MAC RAR and preceding MAC subheader corresponding to the MAC RAR, respectively,
  identify whether a first MAC subPDU among the plurality of MAC subPDUs includes a random access preamble identifier (RAPID) which corresponds to the transmitted random access preamble,
  in case that the RAPID in the first MAC subPDU does not correspond to the RAPID of the transmitted random access preamble, identify whether the RAPID in the first MAC subPDU corresponds to one of RAPIDs for system information (SI) request, and
  identify a presence of a MAC RAR in the first MAC subPDU based on whether the RAPID in the first MAC subPDU corresponds to one of the RAPIDs for SI request or not,
wherein the MAC RAR is not included in the first MAC subPDU and only a first MAC subheader is included in the first MAC subPDU, and a next MAC subPDU follows the first MAC subheader, in case that the RAPID in the first MAC subheader corresponds to one of the RAPIDs for SI request, and
wherein the first MAC subheader and the MAC RAR are included in the first MAC subPDU and the next MAC subPDU follows the MAC RAR, in case that the RAPID in the first MAC subheader does not correspond to one of the RAPIDs for SI request.

9. The terminal of claim 8,
wherein the next MAC subPDU is present after the first MAC subPDU in case that extension information in the first MAC subPDU is set to 1.

10. The terminal of claim 8, further comprising:
identifying whether the first MAC subPDU includes a backoff indicator or the RAPID based on type information in the first MAC subPDU.

11. The terminal of claim 8, wherein one or more RAPIDs for SI request are signaled by the base station.

12. The terminal of claim 8, wherein the plurality of MAC subPDUs include one of a backoff indicator subheader, a RAPID subheader for SI request acknowledgement or a RAPID subheader and corresponding MAC RAR.

13. The terminal of claim 12, wherein a backoff indicator is included in a beginning of the RAR MAC PDU.

14. The terminal of claim 12, wherein the RAPID subheader for SI request acknowledgement includes extension information, type information and the RAPID indicating the transmitted random access preamble from the terminal.

* * * * *